US012674274B2

(12) United States Patent
Sights et al.

(10) Patent No.: US 12,674,274 B2
(45) Date of Patent: Jul. 7, 2026

(54) 3D DIGITAL IMAGING TECHNOLOGY FOR APPAREL SALES AND MANUFACTURE

(71) Applicant: Levi Strauss & Co., San Francisco, CA (US)

(72) Inventors: James Barton Sights, San Francisco, CA (US); Benjamin Bell, San Francisco, CA (US); Debdulal Mahanty, Fremont, CA (US); Ozgur Taylan Kuzucu, Walnut Creek, CA (US); Inci Bayraktar Arican, San Francisco, CA (US); Aykut Aygun, San Francisco, CA (US)

(73) Assignee: Levi Strauss & Co., San Francisco, CA (US)

( * ) Notice: Subject to any disclaimer, the term of this patent is extended or adjusted under 35 U.S.C. 154(b) by 344 days.

(21) Appl. No.: 17/818,307

(22) Filed: Aug. 8, 2022

(65) Prior Publication Data

US 2023/0051783 A1 Feb. 16, 2023

Related U.S. Application Data

(60) Provisional application No. 63/260,060, filed on Aug. 6, 2021.

(51) Int. Cl.
*G06Q 30/00* (2023.01)
*D06M 10/00* (2006.01)
(Continued)

(52) U.S. Cl.
CPC ........... *D06M 10/005* (2013.01); *G06F 30/12* (2020.01); *G06Q 30/0621* (2013.01);
(Continued)

(58) Field of Classification Search
CPC ...... D06M 10/005; G06F 30/00; G06F 30/17; G06F 30/18; G06F 30/12; G06F 2113/12;
(Continued)

(56) References Cited

U.S. PATENT DOCUMENTS 3,883,298 A 5/1975 Platt
3,983,132 A 9/1976 Strobel
(Continued)

FOREIGN PATENT DOCUMENTS

CA 2066978 A1 6/1993
CN 101187640 A 5/2008
(Continued)

OTHER PUBLICATIONS

Levi Strauss issued patent titled "Laser finishing design tool with damage assets" News Bites—Private Companies [Melbourne] Jul. 16, 2020; Dialog #2423824113 11pgs. (Year: 2020).*
(Continued)

*Primary Examiner* — Robert M Pond
(74) *Attorney, Agent, or Firm* — Aka Chan LLP

(57) ABSTRACT

A manufacturing flow of apparel such as jeans uses a laser to finish the products. The products are designed using a digital design tool, where photorealistic previews are generated in three dimensions and two dimensions. Imagery of the products are sent to retailers where customers can order the products, such as online orders. Imagery of the products are sent to factories where the products are finished. Based on the imagery, the factories make adjustments to the processes as needed so that the actual products will have an appearance as in the received imagery. As orders are received by the retailers, the factories can manufacture the desired products on demand, and the products can be delivered to customers.

20 Claims, 83 Drawing Sheets

(51) Int. Cl.

| | |
|---|---|
| *G06F 30/12* | (2020.01) |
| *G06Q 30/0601* | (2023.01) |
| *G06T 15/04* | (2011.01) |
| *G06T 17/10* | (2006.01) |
| *G06T 19/20* | (2011.01) |
| *A41D 1/06* | (2006.01) |
| *G06F 113/12* | (2020.01) |
| *G06T 15/50* | (2011.01) |

(52) U.S. Cl.
CPC ......... *G06Q 30/0643* (2013.01); *G06T 15/04* (2013.01); *G06T 17/10* (2013.01); *G06T 19/20* (2013.01); *A41D 1/06* (2013.01); *A41D 2500/00* (2013.01); *G06F 2113/12* (2020.01); *G06T 15/503* (2013.01); *G06T 2200/24* (2013.01); *G06T 2219/2012* (2013.01)

(58) Field of Classification Search
CPC ....... G06Q 30/06211; G06Q 30/06212; G06Q 30/0641; G06Q 30/06431; G06Q 30/06432; G06Q 30/06433; G06Q 30/06434; G06Q 30/06435; G06Q 30/0644; G06Q 30/06442; G06Q 40/06443; G06Q 30/06444; G06Q 30/0621; G06Q 30/0643; G06T 15/04; G06T 17/10; A41D 1/06; A41D 2500/00
See application file for complete search history.

(56) References Cited

U.S. PATENT DOCUMENTS

| | | | |
|---|---|---|---|
| 4,527,383 | A | 7/1985 | Bingham |
| 5,015,849 | A | 5/1991 | Gilpatrick |
| 5,185,511 | A | 2/1993 | Yabu |
| 5,201,027 | A | 4/1993 | Casini |
| 5,367,141 | A | 11/1994 | Piltch |
| 5,537,939 | A | 7/1996 | Horton |
| 5,567,207 | A | 10/1996 | Lockman et al. |
| 5,573,851 | A | 11/1996 | Lengers et al. |
| 5,605,641 | A | 2/1997 | Chiba et al. |
| 5,839,380 | A | 11/1998 | Muto |
| 5,880,430 | A | 3/1999 | Wein |
| 5,916,461 | A | 6/1999 | Costin et al. |
| 5,990,444 | A | 11/1999 | Costin |
| 6,002,099 | A | 12/1999 | Martin et al. |
| 6,004,018 | A | 12/1999 | Kawasato et al. |
| 6,086,966 | A | 7/2000 | Gundjian et al. |
| 6,140,602 | A | 10/2000 | Costin |
| 6,192,292 | B1 | 2/2001 | Taguchi |
| 6,252,196 | B1 | 6/2001 | Costin et al. |
| 6,315,202 | B2 | 11/2001 | Costin et al. |
| 6,356,648 | B1 | 3/2002 | Taguchi |
| 6,407,361 | B1 | 6/2002 | Williams |
| 6,465,046 | B1 | 10/2002 | Hansson et al. |
| 6,495,237 | B1 | 12/2002 | Costin |
| 6,548,428 | B1 | 4/2003 | Lanitz et al. |
| 6,576,862 | B1 | 6/2003 | Costin et al. |
| 6,616,710 | B1 | 9/2003 | Costin et al. |
| 6,664,505 | B2 | 12/2003 | Martin |
| 6,685,868 | B2 | 2/2004 | Costin |
| 6,689,517 | B1 | 2/2004 | Kaminsky et al. |
| 6,706,785 | B1 | 3/2004 | Fu |
| 6,726,317 | B2 | 4/2004 | Codos |
| 6,753,501 | B1 | 6/2004 | Costin, Sr. et al. |
| 6,765,608 | B1 | 7/2004 | Himeda et al. |
| 6,807,456 | B1 | 10/2004 | Costin, Jr. et al. |
| 6,819,972 | B1 | 11/2004 | Martin et al. |
| 6,832,125 | B2 | 12/2004 | Sonnenberg et al. |
| 6,836,694 | B1 | 12/2004 | Podubrin |
| 6,836,695 | B1 | 12/2004 | Goldman |
| 6,858,815 | B1 | 2/2005 | Costin |
| 6,956,596 | B2 | 10/2005 | Kataoka et al. |
| 6,962,609 | B2 | 11/2005 | Rogers et al. |
| 6,974,366 | B1 | 12/2005 | Johnson |
| 7,005,603 | B2 | 2/2006 | Addington et al. |
| 7,054,043 | B2 | 5/2006 | Mengel et al. |
| 7,057,756 | B2 | 6/2006 | Ogasahara et al. |
| 7,072,733 | B2 | 7/2006 | Magee et al. |
| 7,100,341 | B2 | 9/2006 | McIlvaine |
| 7,240,408 | B2 | 7/2007 | Latos et al. |
| 7,260,445 | B2 | 8/2007 | Weiser et al. |
| 7,324,867 | B2 | 1/2008 | Dinauer et al. |
| 7,699,896 | B1 | 4/2010 | Colwell |
| 7,708,483 | B2 | 5/2010 | Samii et al. |
| 7,728,931 | B2 | 6/2010 | Hoffmuller |
| 7,863,584 | B2 | 1/2011 | Tardif et al. |
| 7,916,346 | B2 | 3/2011 | Matsuzaki et al. |
| 7,937,173 | B2 | 5/2011 | Weill et al. |
| 8,048,608 | B2 | 11/2011 | Jarvis et al. |
| 8,278,244 | B2 | 10/2012 | Stubbs et al. |
| 8,296,648 | B2 | 10/2012 | Tirrella |
| 8,360,323 | B2 | 1/2013 | Widzinski, Jr. et al. |
| 8,405,885 | B2 | 3/2013 | Shah et al. |
| 8,453,253 | B2 | 5/2013 | Strong et al. |
| 8,460,566 | B2 | 6/2013 | Costin, Jr. |
| 8,529,775 | B2 | 9/2013 | Costin et al. |
| 8,556,319 | B2 | 10/2013 | Petouhoff et al. |
| 8,581,142 | B2 | 11/2013 | Colico et al. |
| 8,585,956 | B1 | 11/2013 | Pagryzinski et al. |
| 8,734,679 | B2 | 5/2014 | Marguerettaz et al. |
| 8,794,724 | B2 | 8/2014 | Costin, Sr. et al. |
| 8,849,444 | B2 | 9/2014 | George |
| 8,883,293 | B2 | 11/2014 | Weedlun et al. |
| 8,921,732 | B2 | 12/2014 | Costin et al. |
| 8,974,016 | B2 | 3/2015 | Costin, Sr. et al. |
| 9,034,089 | B2 | 5/2015 | Jarvis et al. |
| 9,050,686 | B2 | 6/2015 | Costin, Sr. et al. |
| 9,126,423 | B2 | 9/2015 | Costin, Sr. et al. |
| 9,213,929 | B2 | 12/2015 | Tazaki et al. |
| 9,213,991 | B2 | 12/2015 | Bhardwaj et al. |
| 9,333,787 | B2 | 5/2016 | Cape et al. |
| 9,364,920 | B2 | 6/2016 | Costin et al. |
| 9,542,069 | B2 * | 1/2017 | Mulligan ........... G06Q 30/0621 |
| 9,971,854 | B1 | 5/2018 | Bowen |
| 10,687,573 | B2 * | 6/2020 | Schultz .................. D06C 23/02 |
| 10,712,922 | B2 * | 7/2020 | Schultz ............. G06Q 30/0627 |
| 10,883,223 | B2 * | 1/2021 | Schultz ................. D06M 23/16 |
| 2002/0137417 | A1 | 9/2002 | Tebbe |
| 2002/0179580 | A1 | 12/2002 | Costin |
| 2003/0012454 | A1 | 1/2003 | Manico et al. |
| 2003/0089782 | A1 | 5/2003 | Reed |
| 2004/0067706 | A1 | 4/2004 | Woods |
| 2005/0131571 | A1 | 6/2005 | Costin |
| 2006/0014099 | A1 | 1/2006 | Faler et al. |
| 2006/0090868 | A1 | 5/2006 | Brownfield et al. |
| 2007/0161304 | A1 | 7/2007 | Wangbunyen |
| 2007/0205541 | A1 | 9/2007 | Allen et al. |
| 2007/0227332 | A1 | 10/2007 | Causse et al. |
| 2008/0023169 | A1 | 1/2008 | Fernandes et al. |
| 2008/0138543 | A1 | 6/2008 | Hoshino et al. |
| 2008/0153374 | A1 | 6/2008 | Thiriot |
| 2008/0280107 | A1 | 11/2008 | Katschorek et al. |
| 2009/0112353 | A1 | 4/2009 | Kirefu et al. |
| 2009/0144173 | A1 | 6/2009 | Mo et al. |
| 2009/0162621 | A1 | 6/2009 | Craamer et al. |
| 2009/0222127 | A1 | 9/2009 | Lind |
| 2009/0266804 | A1 | 10/2009 | Costin et al. |
| 2010/0119282 | A1 | 5/2010 | Olsen et al. |
| 2010/0183822 | A1 | 7/2010 | Ruggie et al. |
| 2010/0217427 | A1 | 8/2010 | Gray et al. |
| 2010/0217719 | A1 | 8/2010 | Olsen et al. |
| 2010/0279079 | A1 | 11/2010 | Campbell et al. |
| 2011/0101088 | A1 | 5/2011 | Marguerettaz et al. |
| 2011/0187025 | A1 | 8/2011 | Costin, Sr. |
| 2011/0261141 | A1 | 10/2011 | Costin, Sr. et al. |
| 2011/0295410 | A1 | 12/2011 | Yamada et al. |
| 2012/0061470 | A1 | 3/2012 | Marguerettaz et al. |
| 2012/0182375 | A1 | 7/2012 | Shourvarzi et al. |
| 2012/0197429 | A1 | 8/2012 | Nykyforov |
| 2012/0229450 | A1 | 9/2012 | Kim et al. |
| 2012/0323738 | A1 | 12/2012 | Gokturk et al. |
| 2014/0260854 | A1 | 9/2014 | Tokura |

(56) References Cited

U.S. PATENT DOCUMENTS

| | | | |
|---|---|---|---|
| 2014/0342903 | A1 | 11/2014 | Jarvis et al. |
| 2015/0030821 | A1 | 1/2015 | Costin, Sr. et al. |
| 2015/0066189 | A1 | 3/2015 | Mulligan et al. |
| 2015/0079359 | A1 | 3/2015 | Costin, Jr. |
| 2015/0106993 | A1 | 4/2015 | Hoffman et al. |
| 2015/0119238 | A1 | 4/2015 | Pretsch et al. |
| 2015/0121965 | A1 | 5/2015 | Costin et al. |
| 2015/0153278 | A1 | 6/2015 | Erkelenz et al. |
| 2015/0183231 | A1 | 7/2015 | Costin, Sr. et al. |
| 2015/0258699 | A1 | 9/2015 | Vander Woude |
| 2015/0298253 | A1 | 10/2015 | Constin, Jr. et al. |
| 2015/0343568 | A1 | 12/2015 | Constin, Jr. et al. |
| 2015/0361597 | A1 | 12/2015 | Candrian |
| 2016/0016879 | A1 | 1/2016 | Bertin et al. |
| 2016/0060807 | A1 | 3/2016 | Tharpe et al. |
| 2016/0251782 | A1 | 9/2016 | Liao et al. |
| 2016/0263928 | A1 | 9/2016 | Costin, Jr. et al. |
| 2016/0361937 | A1 | 12/2016 | Costin, Sr. et al. |
| 2016/0362820 | A1 | 12/2016 | Livecchi |
| 2017/0309075 | A1 | 10/2017 | Watts et al. |
| 2017/0352092 | A1 | 12/2017 | Mitchell et al. |
| 2018/0020752 | A1 | 1/2018 | Peshek et al. |
| 2018/0197331 | A1 | 7/2018 | Chen et al. |
| 2018/0240280 | A1 | 8/2018 | Chen et al. |
| 2019/0026393 | A1 | 1/2019 | Barnes et al. |
| 2019/0050427 | A1 | 2/2019 | Wiesel et al. |
| 2019/0129604 | A1* | 5/2019 | Schultz ............... G06T 11/60 |
| 2019/0177895 | A1 | 6/2019 | Rahim et al. |
| 2019/0236222 | A1 | 8/2019 | Allen et al. |
| 2019/0264361 | A1 | 8/2019 | Oden et al. |
| 2020/0048825 | A1* | 2/2020 | Schultz ............. D06B 11/0096 |
| 2021/0025094 | A1 | 1/2021 | Bell et al. |
| 2021/0027352 | A1 | 1/2021 | Bell et al. |
| 2023/0334772 | A1* | 10/2023 | Cirio ...................... G06F 30/20 |

FOREIGN PATENT DOCUMENTS

| | | | |
|---|---|---|---|
| CN | 102371830 | A | 3/2012 |
| CN | 102704215 | A | 10/2012 |
| CN | 104687695 | A | 6/2015 |
| CN | 204398442 | U | 6/2015 |
| CN | 204653890 | U | 9/2015 |
| CN | 104983103 | A | 10/2015 |
| DE | 1965103 | A1 | 7/1971 |
| DE | 3916126 | A1 | 11/1990 |
| EP | 0328320 | A1 | 8/1989 |
| EP | 1279460 | A1 | 1/2003 |
| EP | 1459836 | A2 | 9/2004 |
| ES | 2147473 | A1 | 9/2000 |
| GB | 1259530 | A | 1/1972 |
| GB | 1294116 | A | 10/1972 |
| GB | 2199462 | A | 7/1988 |
| GB | 2294656 | A | 5/1996 |
| GB | 2448763 | A | 10/2008 |
| JP | 11291368 | A | 10/1999 |
| TW | M276842 | U | 5/1994 |
| WO | 8202689 | A1 | 8/1982 |
| WO | WO/2001/025824 | | 4/2001 |
| WO | 0214077 | A1 | 2/2002 |
| WO | 2004045857 | A2 | 6/2004 |
| WO | 2008072853 | A1 | 6/2008 |
| WO | 2010017648 | A1 | 2/2010 |
| WO | 2011143471 | A1 | 11/2011 |
| WO | 2012016316 | A1 | 2/2012 |
| WO | 2013137836 | A1 | 9/2013 |
| WO | WO/2015/042441 | | 3/2015 |
| WO | 2016065134 | A1 | 4/2016 |
| WO | WO/2018/035538 | | 2/2018 |
| WO | WO/2018/112110 | | 6/2018 |
| WO | WO/2018/112113 | | 6/2018 |
| WO | 2019169054 | A1 | 9/2019 |
| WO | 2021016497 | A1 | 1/2021 |

OTHER PUBLICATIONS

Sturgell, Bruce: "Getwear Lets You Design the Perfect Pair of Jeans in Any Size," Chubstr.com, Sep. 16, 2013, 5pgs (Year: 2013).*

Jeanologia, S.L., "GFK Laser System Easy Mar. 2011," 2011, 72 pages, ELRev 2.1, Jeanologia The Science of Finishing.

"Golden Laser Sep. 2016 part 1 captured on Oct. 24, 2019_11-51-54".pdf, Golden Laser Sep. 3, 2016, website captured from archive.org. URL:"https://web.archive.org/web/20160903184306/https://www.goldenlaser.cc/jeans-laser-engraving-machine.html".

Golden Laser Oct. 18, 2014 http:www.youtube.com/watch?v=RHe32gwa7rA.

Jeanologia S.L., "Jeanologia The Science of Finishing Design Manual English Version," 2009, 73 p. 1st Edition, Jeanologia S.L.

Video (screenshots/captures): "Lightelier," uploaded on Oct. 1, 2013 by user Jose Carlos Rodriguez, 12 pages, URL: https://www.youtube.com/watch?v=FkyVvFx9X67.

Video (screenshots/captures): "e-Mark 3.0," uploaded on Apr. 7, 2016 by user Jeanologia, 24 pages, URL: https://www.youtube.com/watch?v=2y26Oqu5fiA&feature-youtu.be.

Jeanologia, "Jeanologia e-Mark Laser Software Manual," 2015, 88 pages, Emark 2.0 Software Manual Rev. A.22.

Jeanologia S.L., "GFK Laser System Easy Mar. 2012 Software Manual," 2012, 41 pages, EM2012 Ver. 1.5.

Video (screenshots/captures): "Lasers! Gas! Water-Proof Pants! How Levi Strauss & Co. Keeps Improving Jeans," uploaded Mar. 1, 2015 by user Fast Company, 14 pages, URL: https://www.youtube.com/watch?v=nkMwmf57APU&t=151s.

International Search Report and the Written Opinion of the International Searching Authority for International Application PCT/US2022/039743, dated Nov. 21, 2022, 16 pages.

* cited by examiner

326

WARPS — 335

WEFTS — 337

HOW THE LASER REMOVES COLOR

407

INDIGO FIBERS 418

413

WHITE CORE FIBERS 422

RING-DYED YARN

WHITE FIBERS REMAIN COVERED

NO COLOR CHANGE

INCREASE LASER

WHITE FIBERS ARE EXPOSED

SUBTLE HIGHLIGHT

INCREASE LASER

MORE WHITE FIBERS EXPOSED

BRIGHTER HIGHLIGHT

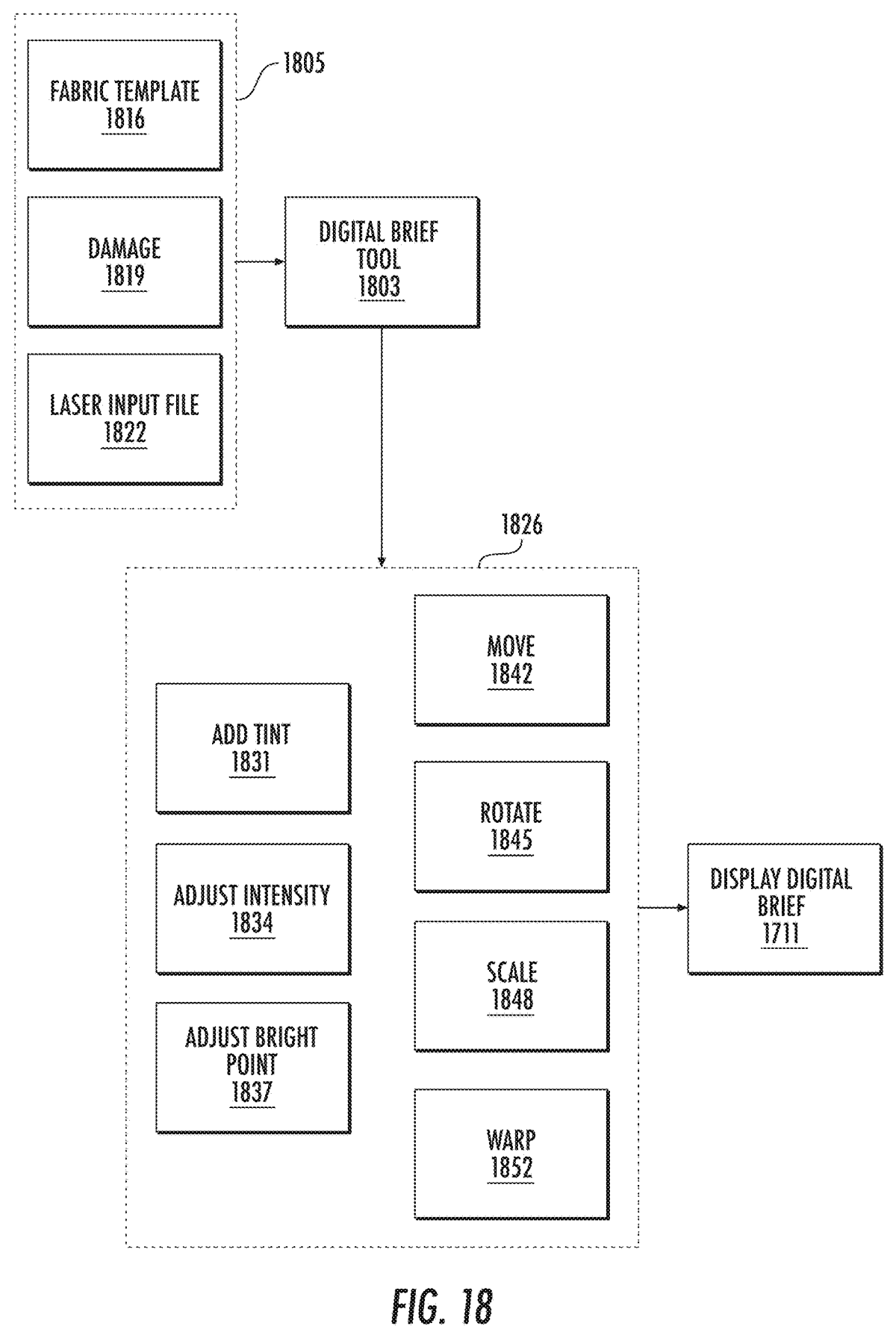

FABRIC TEMPLATE
1816

DAMAGE
1819

LASER INPUT FILE
1822

1805

DIGITAL BRIEF
TOOL
1803

1826

MOVE
1842

ADD TINT
1831

ADJUST INTENSITY
1834

ADJUST BRIGHT
POINT
1837

ROTATE
1845

SCALE
1848

WARP
1852

DISPLAY DIGITAL
BRIEF
1711

FIG. 18

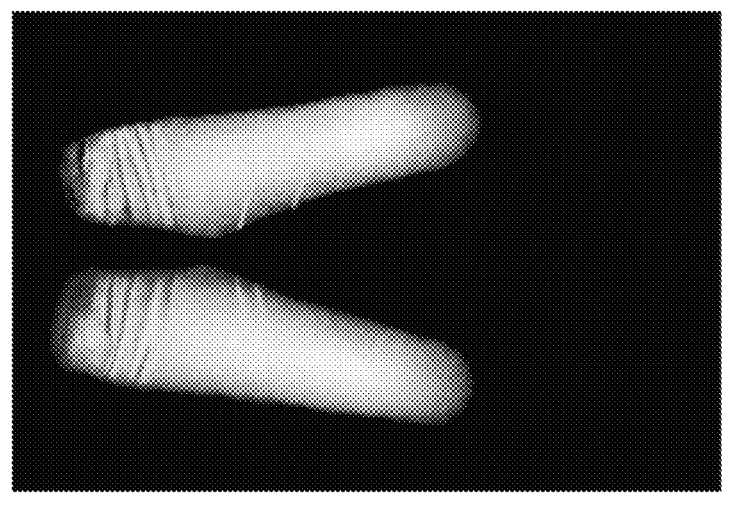
PREPPED
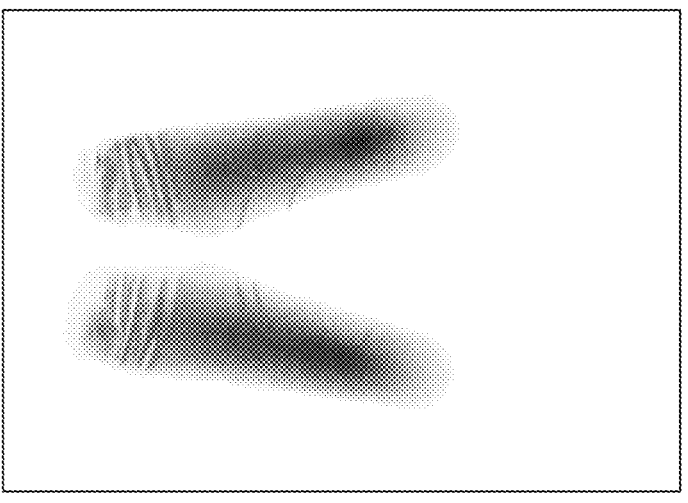
ORIGINAL
FIG. 20

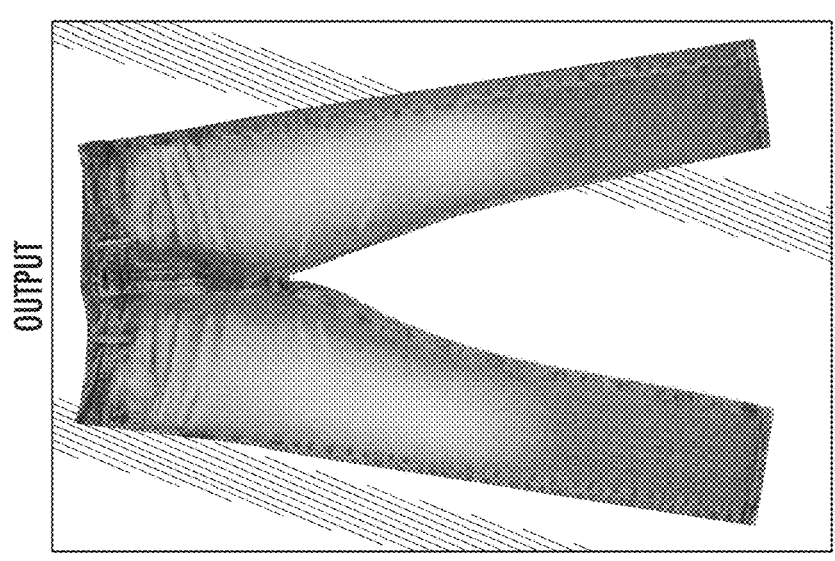
OUTPUT
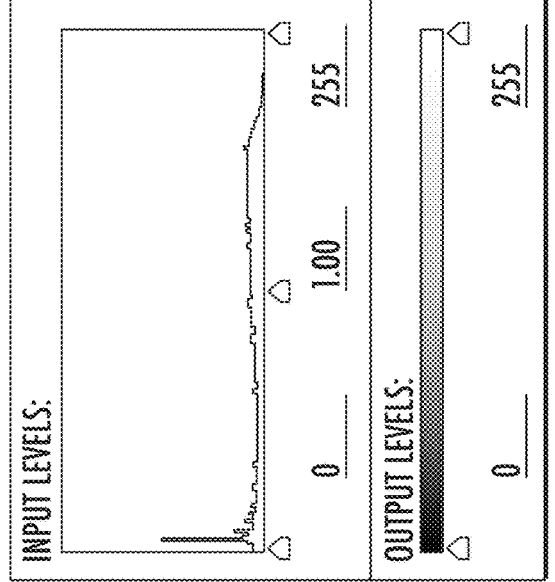
INPUT LEVELS:
0     1.00     255
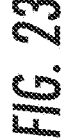
OUTPUT LEVELS:
0     255
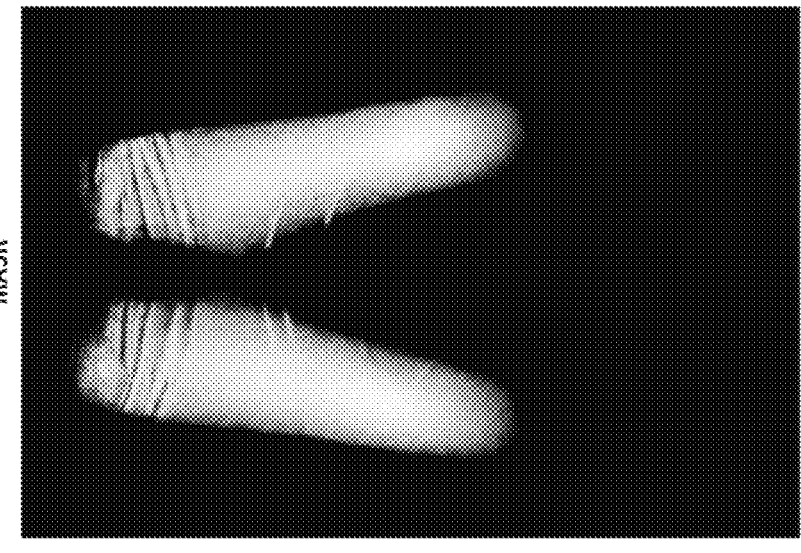
MASK
FIG. 23

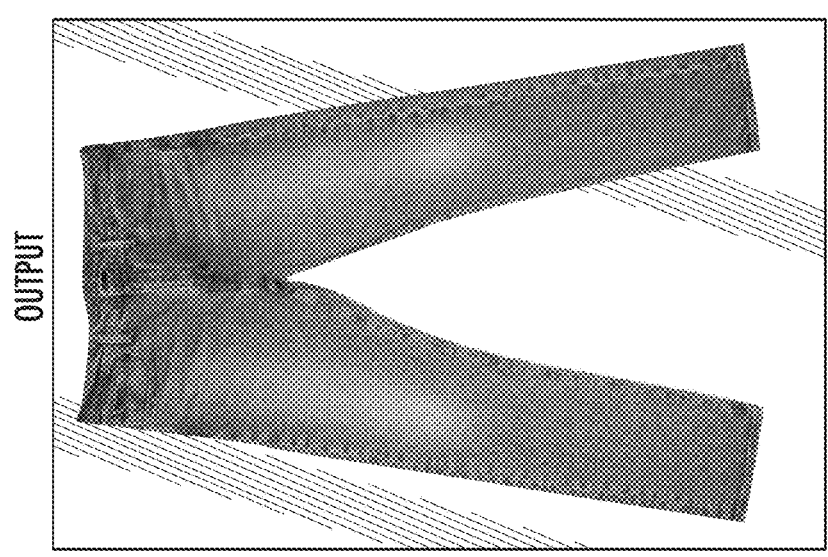
OUTPUT
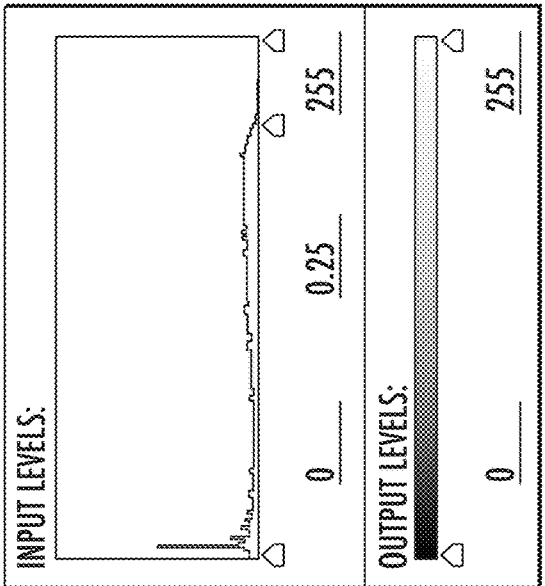
INPUT LEVELS:
0     0.25     255
OUTPUT LEVELS:
0     255
*FIG. 24*
MASK

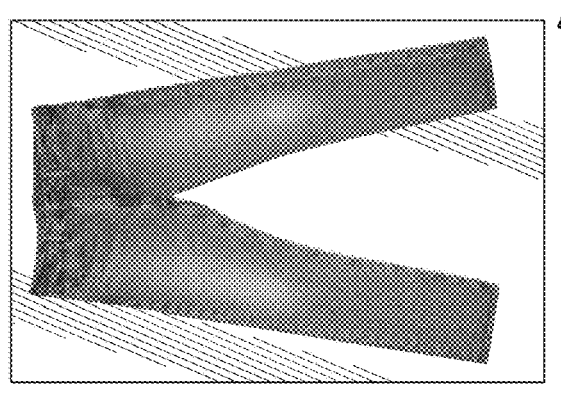
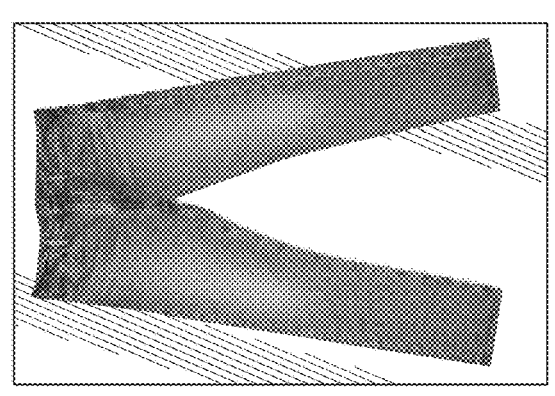
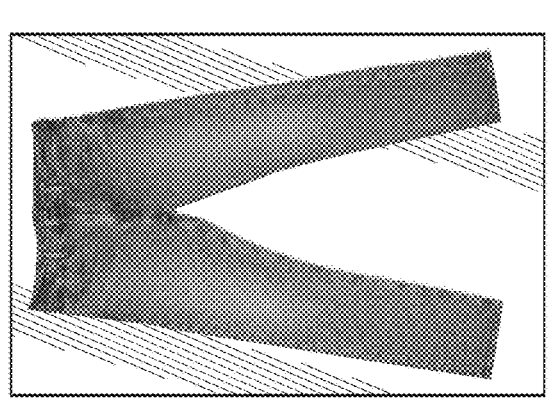
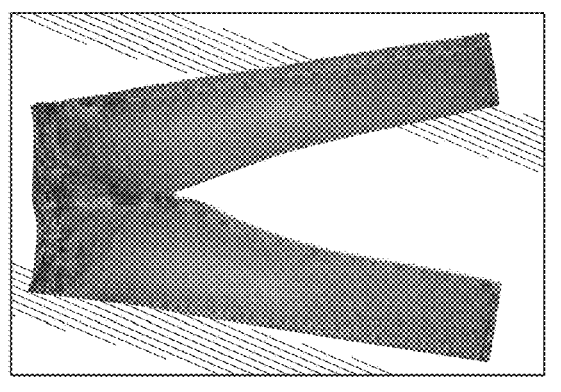
OPACITY
100%
40%
*FIG. 25*

6202

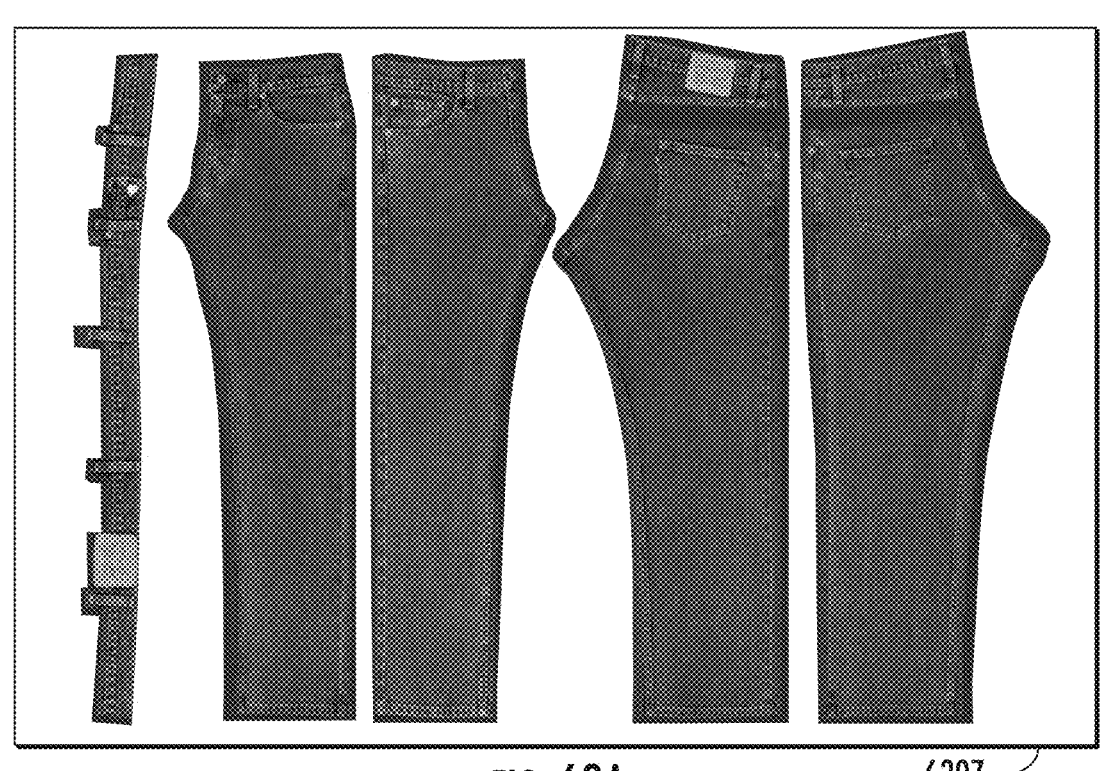
FIG. 63A    6307
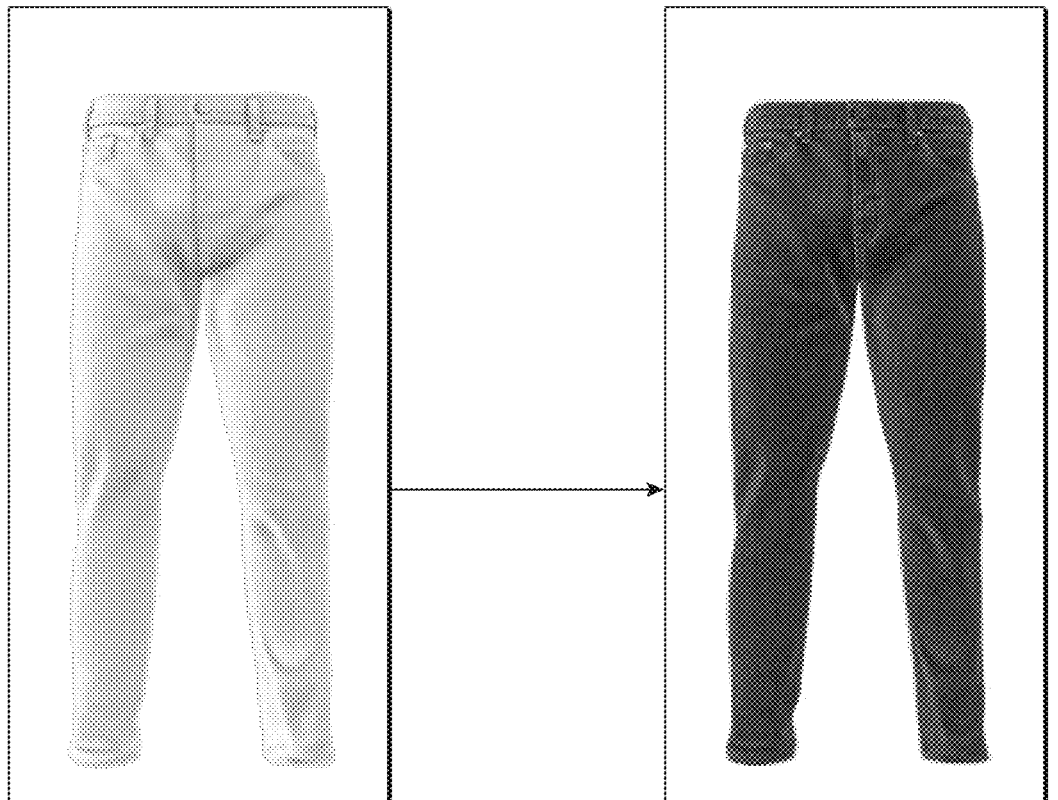
FIG. 63B                    FIG. 63C

FIG. 63D                    FIG. 63E

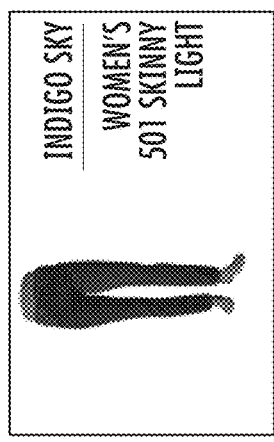
INDIGO SKY
WOMEN'S
501 SKINNY
LIGHT
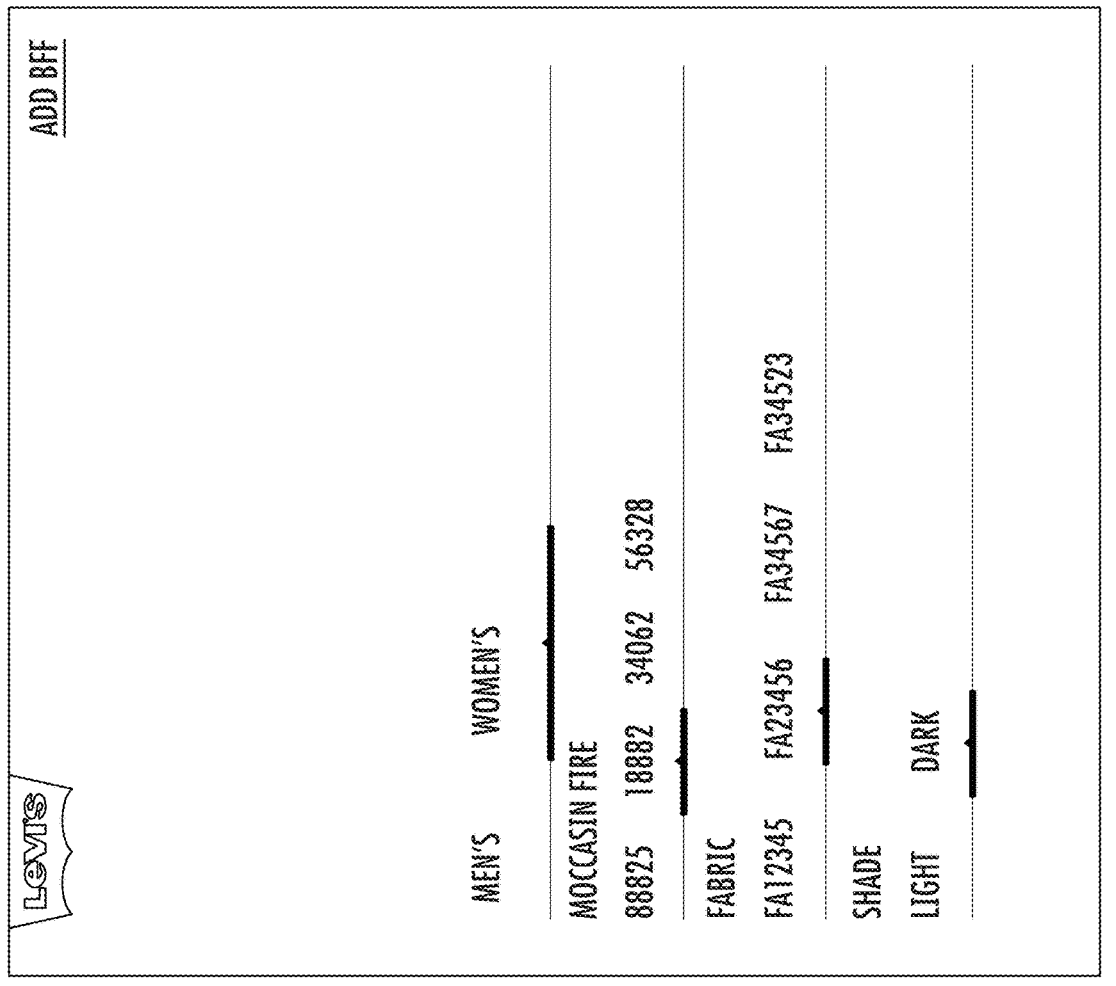
Levi's
ADD BFF
MEN'S        WOMEN'S
MOCCASIN FIRE
88825   18882   34062   56328
FABRIC
FA12345   FA23456   FA34567   FA34523
SHADE
LIGHT   DARK
FIG. 68

3D DIGITAL IMAGING TECHNOLOGY FOR APPAREL SALES AND MANUFACTURE

CROSS REFERENCE TO RELATED APPLICATIONS

This patent application claims the benefit of U.S. patent application 63/260,060, filed Aug. 6, 2021, which is incorporated by reference along with all other references.

DESCRIPTION

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to apparel manufacturing and, more specifically, to manufacturing using a mobile finishing center finishing center for finishing garments to have a faded, distressed, washed, or worn finish or desired appearance. The mobile finishing center can be driven to a location such as sporting events (e.g., Super Bowl), concerts (e.g., Coachella), or other special event, at which garments can be processed on site.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co. or LS&Co.

Though jeans at the time of the Gold Rush were used as work clothes, jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with a variety of wear patterns. The wear patterns have become part of the jeans style and fashion. Some examples of wear patterns include combs or honeycombs, whiskers, stacks, crackle, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take about 20 to 60 liters of water to finish each pair of jeans.

Therefore, there is a need for a technique for finishing garments that also reduces environmental impact, processing time, and processing costs, while maintaining the look and style of traditional finishing techniques.

BRIEF SUMMARY OF THE INVENTION

A manufacturing flow of apparel such as jeans uses a laser to finish the products. The products are designed using a digital design tool, where photorealistic previews are generated in three dimensions and two dimensions. Imagery of the products are sent to retailers where customers can order the products, such as online orders. Imagery of the products are sent to factories where the products are finished. Based on the imagery, the factories make adjustments to the processes as needed so that the actual products will have an appearance as in the received imagery. As orders are received by the retailers, the factories can manufacture the desired products on demand, and the products can be delivered to customers.

In an implementation, a method includes: providing a garment design tool that is capable of showing a three-dimensional preview image of a garment design (e.g., pair of jeans) on a screen as customized by a user with a finishing pattern (e.g., wear pattern with whiskers, damage assets, and other); in the garment design tool, providing an option for the user to select a garment base and upon the user's selection, showing in the screen a first preview image of the selected garment template (e.g., base template according to wash recipe such a dark, medium, or light fabric templates); in the garment design tool, providing an option for the user to select a finishing pattern from a two or more finishing patterns and upon the user's selection, showing on the screen a second preview image of the selected garment template with the selected finishing pattern, where each finishing pattern is associated with a digital input file; combining a digital input file (e.g., laser input file) associated with the selected finishing pattern with a image of the selected garment template to generate a combined image; and performing a texture mapping of the combined image on a first three-dimensional model to obtain the first three-dimensional model with textures to be the three-dimensional preview image.

The combined image can be generated by: generating an adjusted base image from the image of the selected garment template without the selected finishing pattern; generating a pattern mask based on the digital input file associated with the selected finishing pattern; for a pixel at a pixel location of the combined image, obtaining a first contribution for the pixel location of the combined image by combining a first value for a pixel corresponding to the pixel location for the pattern mask and a pixel corresponding to the pixel location for the image of the selected garment template without the selected finishing pattern; for the pixel at the pixel location of the combined image, obtaining a second contribution at the pixel location for the combined image by combining a second value for a pixel corresponding to the pixel location for the pattern mask and a pixel corresponding to the pixel location for the adjusted base image; combining the first contribution and second contribution to obtain a color value for a pixel at the pixel location for the second preview image; and using the color value for the pixel at the pixel location in the combined image.

In an implementation, a method includes: providing a garment design tool that shows a preview image of a garment design on a screen as customized by a user with a finishing pattern; in the garment design tool, providing an option for the user to select a garment base and upon the user's selection, showing in the screen a first preview image of the selected garment template; in the garment design tool, providing an option for the user to select a finishing pattern from a two or more finishing patterns and upon the user's selection, showing on the screen a second preview image of the selected garment template with the selected finishing pattern, wherein each finishing pattern is associated with a digital input file; combining a digital input file associated with the selected finishing pattern with a image of the selected garment template to generate a combined image; performing a texture mapping of the combined image onto a first three-dimensional model to obtain a first texture-mapped model; performing a texture mapping of the combined image onto a second three-dimensional model to obtain a second texture-mapped model, wherein the second three-dimensional model is different from the first three-dimensional model; generating a plurality of two-dimensional first images from the first texture-mapped model; and generating a plurality of two-dimensional second images from the second texture-mapped model.

In an implementation, a system includes a digital design tool, generating at least a digital input file including a finishing pattern, wherein the digital design tool generates a three-dimensional photorealistic visualization of a finishing pattern of a garment on a computer screen and allows editing of the finishing pattern. The editing permitted by the digital design tool includes selecting a first combination of a garment template and a first finishing pattern from plurality of finishing patterns, and saving the first combination as the first apparel design. A three-dimensional photorealistic visualization of the first apparel design includes displaying on a screen a three-dimensional model with textures of the first apparel design. A first three-dimensional model with textures of the first apparel design is obtained by performing a texture mapping of the first apparel design onto the first three-dimensional model. A second three-dimensional model with textures of the first apparel design is obtained by performing a texture mapping of the first apparel design onto the second three-dimensional model. The second three-dimensional model is different from the first three-dimensional model. A set of two-dimensional first images is generated from the first three-dimensional model with textures of the first apparel design. A set of two-dimensional second images is generated from the second three-dimensional model with textures of the first apparel design.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 18 shows a block diagram of a digital brief tool that provides a real-time preview of an appearance of pair of jeans when a finishing pattern is applied by burning or ablating using a laser input file.

FIG. 20 shows a laser pattern mask that is created from a laser input file.

FIGS. 23-24 shows examples of two different adjustments or settings for a bright point operation.

FIG. 25 shows adjustment of intensity.

FIG. 31 shows a screen showing additional patterns or artwork, in addition to, for example, logos, the user can select from.

FIG. 35 shows a screen showing back of a trucker jacket, where an option for overdye is turned off and post-wash bleach is turned on.

FIG. 63A shows a created shadow neutral texture.

FIG. 63B shows a front view of a three-dimensional model, which the shadow neutral texture will be applied or mapped to.

FIG. 63C shows a result of mapping the shadow neutral texture to the three-dimensional model.

FIG. 63D shows a back or rear view of the three-dimensional model, which the shadow neutral texture will be applied or mapped to.

FIG. 63E shows a result of mapping the shadow neutral texture to the three-dimensional model.

FIG. 68 shows an initial screen of a digital design tool.

FIG. 72 shows a screen with wear patterns the user can select from.

FIG. 74 shows a screen with some damage assets the user can select from.

FIG. 80 shows a front flat view of a pair of jeans. FIG. 81 shows a back flat view of the jeans.

DETAILED DESCRIPTION OF THE INVENTION

Figure 1:
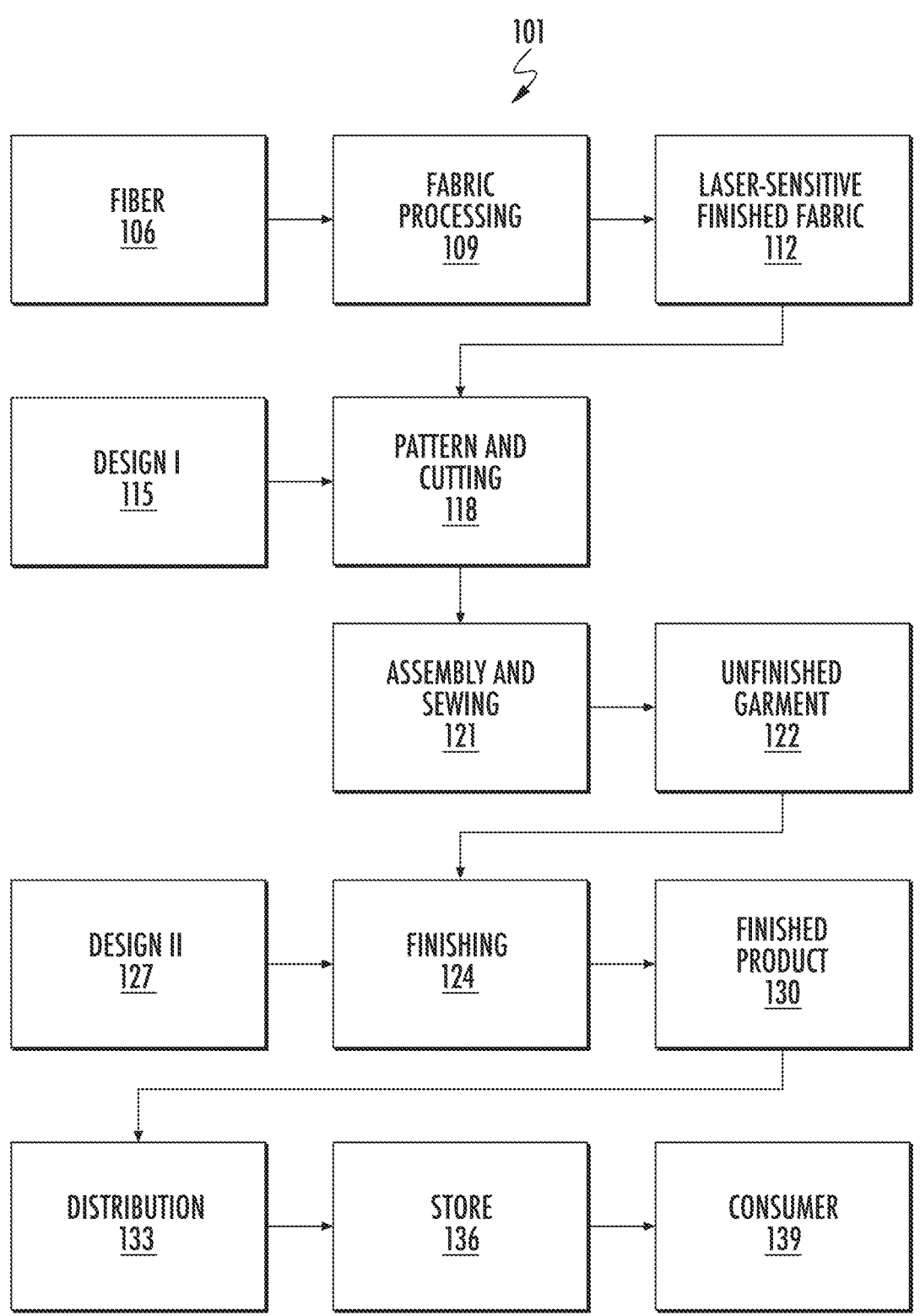
FIG. 1 shows a process flow for manufacturing apparel such as jeans, where garments are finished using a laser.

FIG. 1 shows a process flow 101 for manufacturing apparel such as jeans, where garments are finished using a laser. The fabric or material for various apparel including jeans is made from natural or synthetic fibers 106, or a combination of these. A fabric mill takes fibers and processes 109 these fibers to produce a laser-sensitive finished fabric 112, which has enhanced response characteristics for laser finishing.

Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandex), or a blend of natural and semisynthetic fibers, or any combination of these or other fibers.

For jeans, the fabric is typically a denim, which is a sturdy cotton warp-faced textile in which a weft passes under two or more warp threads. This twill weaving produces a diagonal ribbing. The yarns (e.g., warp yarns) are dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including non-denim products and products made from knit materials. Some examples include T-shirts, sweaters, coats, sweatshirts (e.g., hoodies), casual wear, athletic wear, outerwear, dresses, eveningwear, sleepwear, loungewear, underwear, socks, bags, backpacks, uniforms, umbrellas, swimwear, bed sheets, scarves, and many others.

A manufacturer creates a design 115 (design I) of its product. The design can be for a particular type of clothing or garment (e.g., men's or women's jean, or jacket), sizing of the garment (e.g., small, medium, or large, or waist size and inseam length), or other design feature. The design can be specified by a pattern or cut used to form pieces of the pattern. A fabric is selected and patterned and cut 118 based on the design. The pattern pieces are assembled together 121 into the garment, typically by sewing, but can be joined together using other techniques (e.g., rivets, buttons, zipper, hoop and loop, adhesives, or other techniques and structures to join fabrics and materials together).

Some garments can be complete after assembly and ready for sale. However, other garments are unfinished 122 and receive additional finishing 124. The additional finishing may include laser finishing, tinting, washing, softening, and fixing. For distressed denim products, the laser finishing can include using a laser to produce a wear pattern according to a design 127 (design II). Some additional details of laser finishing are described in U.S. patent application 62/377,447, filed Aug. 19, 2016, and Ser. No. 15/682,507, filed Aug. 21, 2017, issued as U.S. Pat. No. 10,051,905 on Aug. 21, 2018, are incorporated by reference along with all other references cited in this application. U.S. patent applications 62/636,108, filed Feb. 27, 2018, and 62/715,788, filed Aug. 7, 2018, describe some specific implementations of a brief builder application and are incorporated by reference.

Design 127 (design II) is for post-assembly aspects of a garment while design 115 is for preassembly aspects of a garment. After finishing 124, a finished product 130 (e.g., a pair of jeans) is complete and ready for sale. The finished product can be inventoried and distributed 133, delivered to stores 136, and sold to consumers or customers 139. The finished product can alternatively be sold to a customer at a mobile finishing center where the customer orders the jeans and selects a laser finishing pattern for application for the jeans at the mobile finishing center and delivery at the center. Laser finishing facilitates the consumer buying and wearing worn blue jeans without having to wear the jeans themselves to achieve the worn blue jeans appearance. Achieving a worn blue jeans appearance through wear usually takes significant time and effort.

Traditionally, to produce distressed denim products, finishing techniques include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit).

These traditional finishing approaches take time, incur expense, and impact the environment by utilizing resources and producing waste. It is desirable to reduce water and chemical usage, which can include eliminating the use agents such as potassium permanganate and pumice. An alternative to these traditional finishing approaches is laser finishing.

Figure 2:
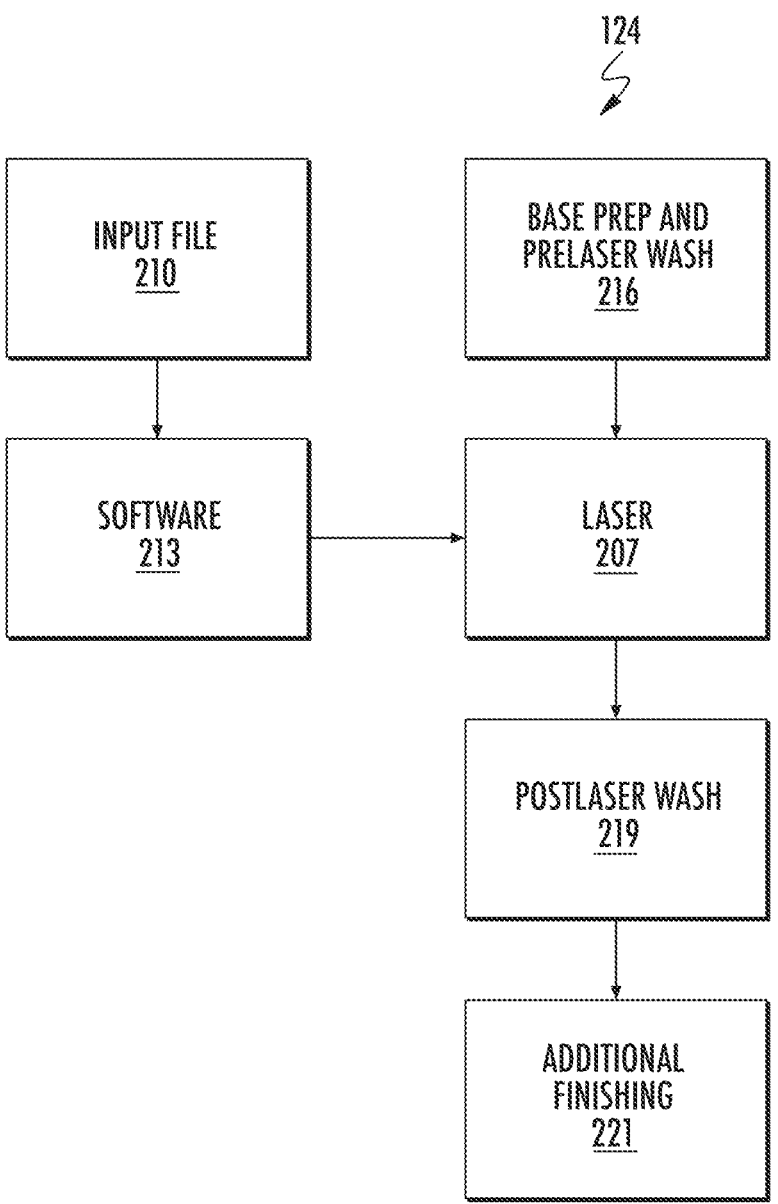
FIG. 2 shows a finishing technique that includes the use of a laser.

FIG. 2 shows a finishing technique that includes the use of a laser 207. A laser is a device that emits light through a process of light amplification based on the stimulated emission of electromagnetic radiation from lasing elements (e.g., gas molecules, atoms in a crystal lattice, or organic molecules). Lasers are used for bar code scanning, medical procedures such as corrective eye surgery, and industrial applications such as cutting and welding. A particular type of laser for finishing apparel is a carbon dioxide laser, which emits a beam of infrared radiation.

The laser is controlled by an input file 210 and control software 213 to emit a laser beam onto fabric at a particular position or location at a specific power level for a specific amount of time. Further, the power of the laser beam can be varied according to a waveform such as a pulse wave with a particular frequency, period, pulse width, or other characteristics. Some aspects of the laser that can be controlled include the duty cycle, frequency, marking or burning speed, ablation speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," "burns," or "ablates" a wear pattern (specified by input file 210) onto the garment. The fabric that is exposed to the laser beam (e.g., infrared beam) changes color, lightening the fabric at a specified position by a certain amount based on the laser power, time of exposure, waveform used, or any combination of these laser features. The laser light emitted by a laser is directed from position to position until the wear pattern is completely printed on the garment.

In a specific implementation, the laser beam has a resolution of about 34 dots per inch (dpi), which on the garment is about 0.7 millimeters per pixel. The technique described in this patent is not dependent on the laser beam's resolution, and will work with lasers have more or less resolution than 34 dots per inch. For example, the laser beam can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution of the laser beam can be increased. In an implementation, multiple laser passes are used.

In an implementation, jeans are dyed using an indigo dye, which results in a blue colored fabric. The blue color is caused by chromophores trapped in the fabric which reflect light as a blue color. U.S. patent application 62/433,739, filed Dec. 13, 2016, which is incorporated by reference, describes a denim material with enhanced response characteristics to laser finishing. Using a denim material made from indigo ring-dyed yarn, variations in highs and lows in indigo color shading is achieved by using a laser.

Laser finishing can be used on denim and other materials too. Laser finishing can be used to alter the coloration of any material where the sublimation (or decomposition in some cases) temperature of the dye or the material itself is within range of the operating temperatures of the laser during use. Color change is a product of either the removal of dyestuff or the removal of material uncovering material of another color.

Figure 3:
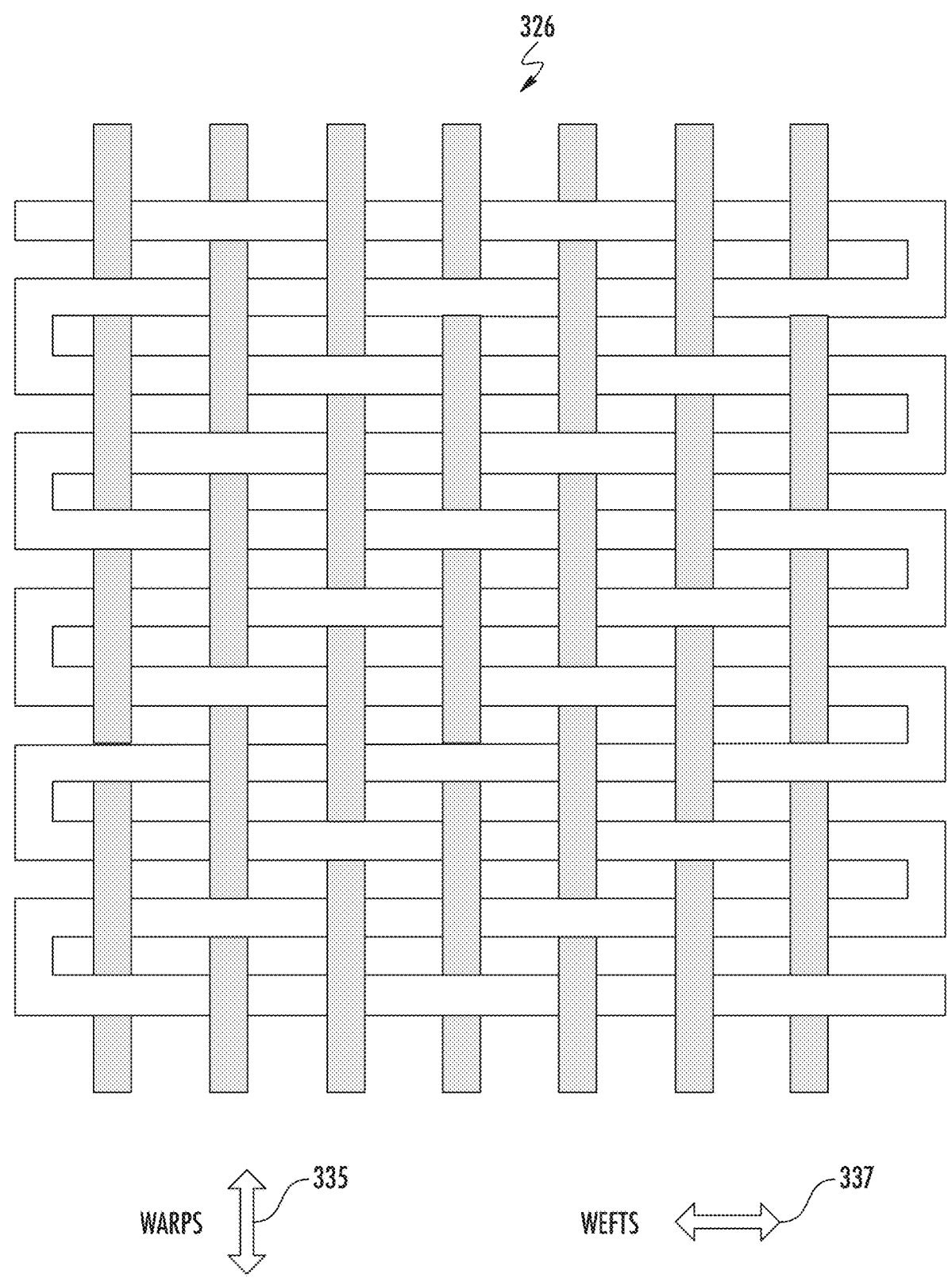
FIG. 3 shows a weave pattern of a denim fabric.

FIG. 3 shows a weave pattern of a denim fabric 326. A loom does the weaving. In weaving, warp is the lengthwise or longitudinal yarn or thread in a roll, while weft or woof is the transverse thread. The weft yarn is drawn through the warp yarns to create the fabric. In FIG. 3, the warps extend in a first direction 335 (e.g., north and south) while the wefts extend in a direction 337 (e.g., east and west). The wefts are shown as a continuous yarn that zigzags across the wefts (e.g., carried across by a shuttle or a rapier of the loom). Alternatively, the wefts could be separate yarns. In some specific implementations, the warp yarn has a different weight or thickness than the weft yarns. For example, warp yarns can be coarser than the weft yarns.

For denim, dyed yarn is used for the warp, and undyed or white yarn is typically used for the weft yarn. In some denim fabrics, the weft yarn can be dyed and have a color other than white, such as red. In the denim weave, the weft passes under two or more warp threads. FIG. 3 shows a weave with the weft passing under two warp threads. Specifically, the fabric weave is known as a 2×1 right-hand twill. For a right-hand twill, a direction of the diagonal is from a lower left to an upper right. For a left-hand twill, a direction of the diagonal is from a lower right to an upper left. But in other denim weaves, the weft can pass under a different number of warp threads, such as 3, 4, 5, 6, 7, 8, or more. In other implementation, the denim is a 3×1 right hand twill, which means the weft passes under three warp threads.

Because of the weave, one side of the fabric exposes more of the warp yarns (e.g., warp-faced side), while the other side exposes more of the weft yarns (e.g., weft-faced side). When the warp yarns are blue and weft yarns are white, a result of the weave is the warp-faced side will appear mostly blue while the reverse side, weft-faced side, will appear mostly white.

In denim, the warp is typically 100 percent cotton. But some warp yarns can be a blend with, for example, elastane to allow for warp stretch. And some yarns for other fabrics may contain other fibers, such as polyester or elastane as examples.

In an indigo ring-dyed yarn, the indigo does not fully penetrate to a core of the yarn. Rather, the indigo dye is applied at a surface of the cotton yarn and diffuses toward the interior of the yarn. So, when the yarn is viewed cross-sectionally, the indigo dyed material will appear as a ring on around an outer edge of the yarn. The shading of the indigo dye will generally lighten in a gradient as a distance increases from the surface of the yarn to the center (or core) of the yarn.

During laser finishing, the laser removes a selected amount of the surface of the indigo dyed yarn (e.g., blue color) to reveal a lighter color (e.g., white color) of the inner core of the ring-dyed yarn. The more of the indigo dyed material that is removed, the lighter the color (e.g., lighter shade of blue). The more of the indigo dyed material that remains, the darker the color (e.g., deeper shade of blue). The laser can be controlled precisely to remove a desired amount of material to achieve a desired shade of blue in a desired place or position on the material.

With laser finishing, a finish can be applied (e.g., printed, burned, or ablated via the laser) onto apparel (e.g., jeans and denim garments) that will appear similar to or indistinguishable from a finish obtained using traditional processing techniques (e.g., dry abrasion, wet processing, and oxidation). Laser finishing of apparel is less costly and is faster than traditional finishing techniques and also has reduced environmental impact (e.g., eliminating the use of harsh chemical agents and reducing waste).

Figures 4, 5, 6, 7:
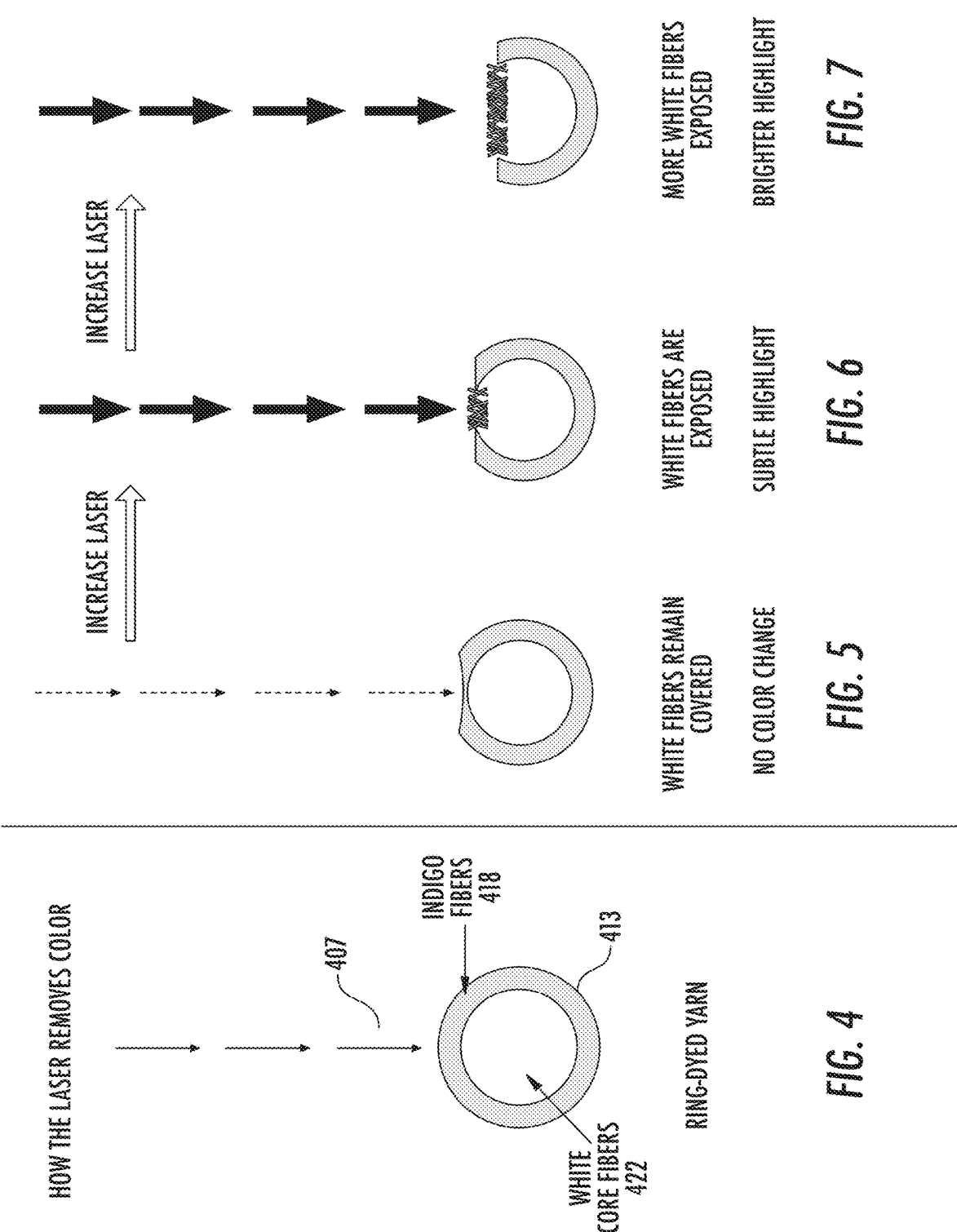
FIG. 4 shows a laser beam striking a ring-dyed yarn having indigo-dyed fibers and white core fibers.
FIG. 5 shows the laser using a first power level setting or first exposure time setting, or a combination of these, to remove some of the dyed fibers, but not revealing any of the white core fibers.
FIG. 6 shows the laser using a second power level setting or second exposure time setting, or a combination of these, to remove more of the dyed fibers than in FIG. 5.
FIG. 7 shows the laser using a third power level setting or third exposure time setting, or a combination of these, to remove even more of the dyed fibers than in FIG. 6.

FIGS. 4-7 show how the laser alters the color of ring-dyed yarn. FIG. 4 shows a laser beam 407 striking a ring-dyed yarn 413 having indigo-dyed fibers 418 and white core fibers 422. The laser removes the dyed fibers, which can be by vaporizing or otherwise destroying the cotton fiber via heat or high temperature that the laser beam causes.

FIG. 5 shows the laser using a first power level setting or first exposure time setting, or a combination of these, to remove some of the dyed fibers, but not revealing any of the white core fibers. The undyed fibers remain covered. There is no color change.

FIG. 6 shows the laser using a second power level setting or second exposure time setting, or a combination of these, to remove more of the dyed fibers than in FIG. 5. The second power level is greater than the first power level, or the second exposure time setting is greater than the first exposure time setting, or a combination of these. The result is some of the undyed fibers are revealed. There is a color change, subtle highlighting.

FIG. 7 shows the laser using a third power level setting or third exposure time setting, or a combination of these, to remove even more of the dyed fibers than in FIG. 6. The third power level is greater than the second power level, or the third exposure time setting is greater than the second exposure time setting, or a combination of these. The result is more of the undyed fibers are revealed. There is a color change, brighter highlighting.

As shown in FIG. 2, before laser 207, the fabric can be prepared 216 for the laser, which may be referred to as a base preparation, and can include a prelaser wash. This step helps improves the results of the laser. After the laser, there can be a post-laser wash 219. This wash can clean or remove any residue caused by the laser, such as removing any charring (which would appear as brown or slightly burning). There can be additional finish 221, which may be including tinting, softening, or fixing, to complete finishing.

Figure 8:
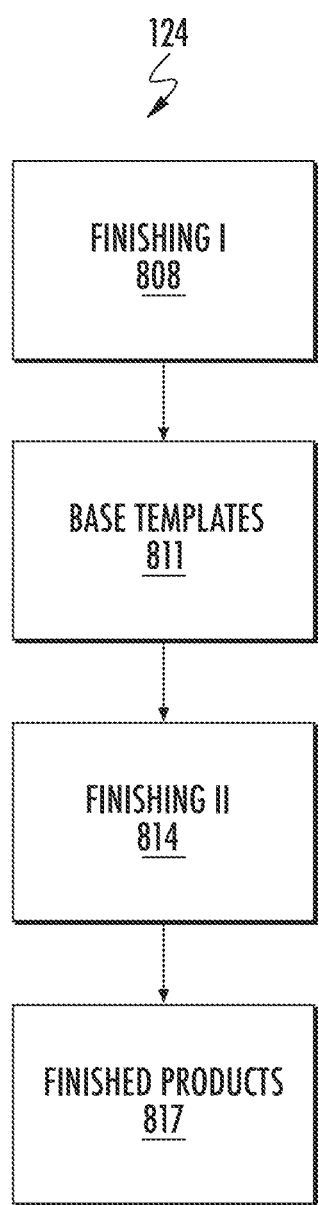
FIG. 8 shows a technique where finishing is divided into two finishing steps, finishing I and finishing II.

FIG. 8 shows a technique where finishing 124 is divided into two finishing steps, finishing I and finishing II. Finishing I 808 is an initial finishing to create base templates 811. With finishing II 814, each base template can be used to manufacture multiple final finishes 817.

Figure 9:
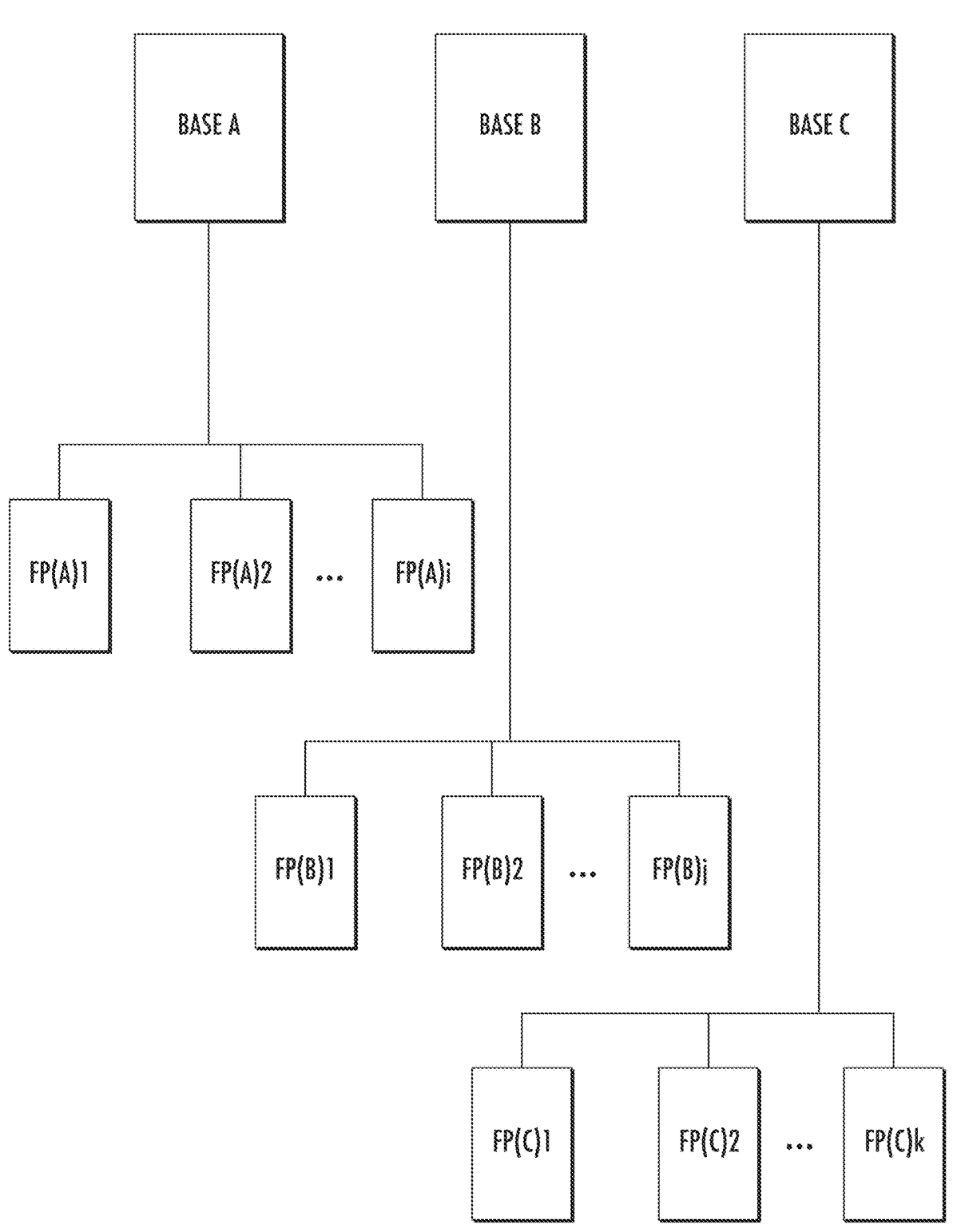
FIG. 9 shows multiple base templates, base A, base B, and base C.

FIG. 9 shows multiple base templates, base A, base B, and base C. These base templates may be referred to as base fit fabrics or BFFs. In an implementation, the base templates can be created during base prep and prelaser wash 216 (see FIG. 2). During finishing I, by using different wash 216 methods or recipes, each different base template can be created.

Finishing II can include laser finishing. Base A is lasered with different designs to obtain various final product based on base A (e.g., FP(A)1 to FP(A)i, where i is an integer). Base B is lasered with different designs to obtain various final product based on base B (e.g., FP(B)1 to FP(B)j, where j is an integer). Base C is lasered with different designs to obtain various final product based on base C (e.g., FP(C)1 to FP(C)k, where k is an integer). Each base can be used to obtain a number of different final designs. For example, the integers i, j, and k can have different values.

As described above and shown in FIG. 2, after finishing II, there can be additional finishing during post-laser wash 219 and additional finishing 221. For example, during the post-laser wash, there may be additional tinting to the lasered garments. This tinting can result in an overall color cast to change the look of the garment.

In an implementation, laser finishing is used to create many different finishes (each a different product) easily and quickly from the same fabric template or BFF or "blank." For each fabric, there will be a number of base fit fabrics. These base fit fabrics are lasered to produce many different finishes, each being a different product for a product line. Laser finishing allows greater efficiency because by using fabric templates (or base fit fabrics), a single fabric or material can be used to create many different products for a product line, more than is possible with traditional processing. This reduces the inventory of different fabric and finish raw materials.

For a particular product (e.g., 511 product), there can be two different fabrics, such as base B and base C of FIG. 9. The fabrics can be part of a fabric tool kit. For base B, there are multiple base fit fabrics, FP(B)1, FP(B)2, and so forth. Using laser finishing, a base fit fabric (e.g., FP(B)1) can be used to product any number of different finishes (e.g., eight different finishes), each of which would be considered a different product model.

For example, FP(B)1 can be laser finished using different laser files (e.g., laser file 1, laser file 2, laser file 3, or others) or have different post-laser wash (e.g., post-laser wash recipe 1, post-laser wash recipe 2, post-laser wash recipe 3, or others), or any combination of these. A first product would be base fit fabric FP(B)1 lasered using laser file 1 and washed using post-laser wash recipe 1. A second product would be base fit fabric FP(B)1 lasered using laser file 2 and washed using post-laser wash recipe 1. A third product would be base fit fabric FP(B)1 lasered using laser file 2 and washed using post-laser wash recipe 2. And there can be many more products based on the same base fit fabric. Each can have a different product identifier or unique identifier, such as a different PC9 or nine-digit product code.

With laser finishing, many products or PC9s are produced for each base fit fabric or blank. Compared to traditional processing, this is a significant improvement in providing greater numbers of different products with less different fabrics and finishes (each of which in traditional processing consume resources, increasing cost, and take time). Inventory is reduced. The technique of providing base fit finishes or fabric templates for laser finishing has significant and many benefits.

Figure 10:
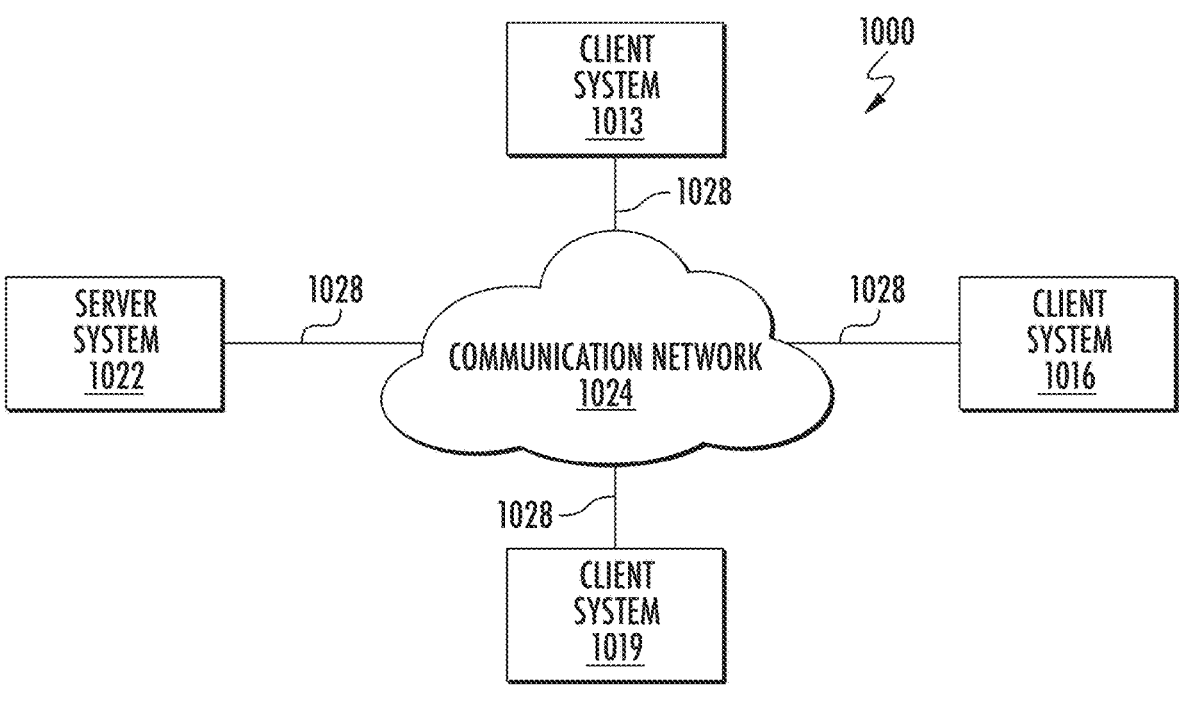
FIG. 10 is a simplified block diagram of a distributed computer network incorporating an embodiment of the present invention.

A system incorporating laser finishing can include a computer to control or monitor operation, or both. FIG. 10 shows an example of a computer that is a component of a laser finishing system. The computer may be a separate unit that is connected to a system, or may be embedded in electronics of the system. In an embodiment, the invention includes software that executes on a computer workstation system or server, such as shown in FIG. 10.

FIG. 10 is a simplified block diagram of a distributed computer network 1000 incorporating an embodiment of the present invention. Computer network 1000 includes a number of client systems 1013, 1016, and 1019, and a server system 1022 coupled to a communication network 1024 via a plurality of communication links 1028. Communication network 1024 provides a mechanism for allowing the various components of distributed network 1000 to communicate and exchange information with each other.

Communication network 1024 may itself be comprised of many interconnected computer systems and communication links. Communication links 1028 may be hardwire links, optical links, satellite or other wireless communications links, wave propagation links, or any other mechanisms for communication of information. Communication links 1028 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 10. These communication protocols may include VLAN, MPLS, TCP/IP, Tunneling, HTTP protocols, wireless application protocol (WAP), vendor-specific protocols, customized protocols, and others. While in one embodiment, communication network 1024 is the Internet, in other embodiments, communication network 1024 may be any suitable communication network including a local area network (LAN), a wide area network (WAN), a wireless network, an intranet, a private network, a public network, a switched network, and combinations of these, and the like.

Distributed computer network 1000 in FIG. 10 is merely illustrative of an embodiment incorporating the present invention and does not limit the scope of the invention as recited in the claims. One of ordinary skill in the art would recognize other variations, modifications, and alternatives. For example, more than one server system 1022 may be connected to communication network 1024. As another example, a number of client systems 1013, 1016, and 1019 may be coupled to communication network 1024 via an access provider (not shown) or via some other server system.

Client systems 1013, 1016, and 1019 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a standalone computer system.

Server 1022 is responsible for receiving information requests from client systems 1013, 1016, and 1019, performing processing required to satisfy the requests, and for forwarding the results corresponding to the requests back to the requesting client system. The processing required to satisfy the request may be performed by server system 1022 or may alternatively be delegated to other servers connected to communication network 1024.

Client systems 1013, 1016, and 1019 enable users to access and query information stored by server system 1022. In a specific embodiment, the client systems can run as a standalone application such as a desktop application or mobile smartphone or tablet application. In another embodiment, a "Web browser" application executing on a client system enables users to select, access, retrieve, or query information stored by server system 1022. Examples of Web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 11:
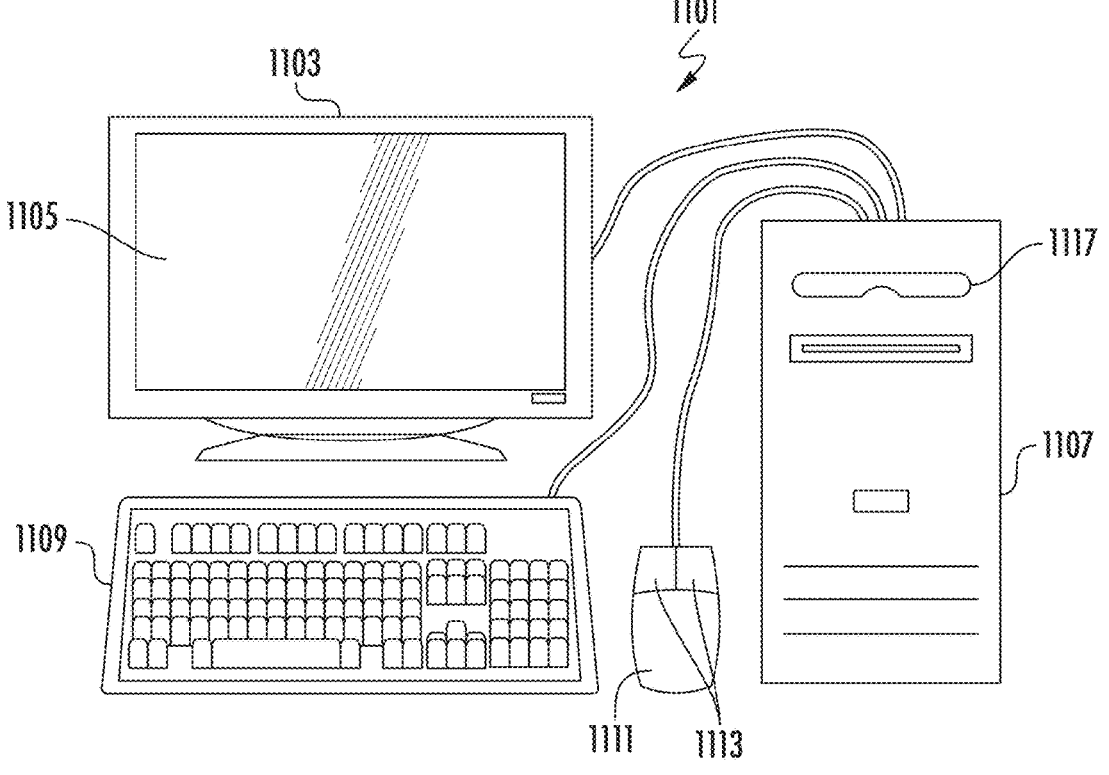
FIG. 11 shows an exemplary client or server system of the present invention.

FIG. 11 shows an exemplary client or server system of the present invention. In an embodiment, a user interfaces with the system through a computer workstation system, such as shown in FIG. 11. FIG. 11 shows a computer system 1101 that includes a monitor 1103, screen 1105, enclosure 1107 (may also be referred to as a system unit, cabinet, or case), keyboard or other human input device 1109, and mouse or other pointing device 1111. Mouse 1111 may have one or more buttons such as mouse buttons 1113.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone X series), Apple iPad (e.g., Apple iPad, Apple iPad Pro, or Apple iPad mini), Apple iPod (e.g., Apple iPod Touch), Samsung Galaxy product (e.g., Galaxy S series product or Galaxy Note series product), Google Nexus and Pixel devices (e.g., Google Nexus series), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 1107 houses familiar computer components, some of which are not shown, such as a processor, memory, mass storage devices 1117, and the like. Mass storage devices 1117 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 1117. The source code of the software of the present invention may also be stored or reside on mass storage device 1117 (e.g., hard disk, magnetic disk, tape, or CD-ROM). As a further example, code of the invention may be transmitted via wires, radio waves, or through a network such as the Internet.

Figure 12:
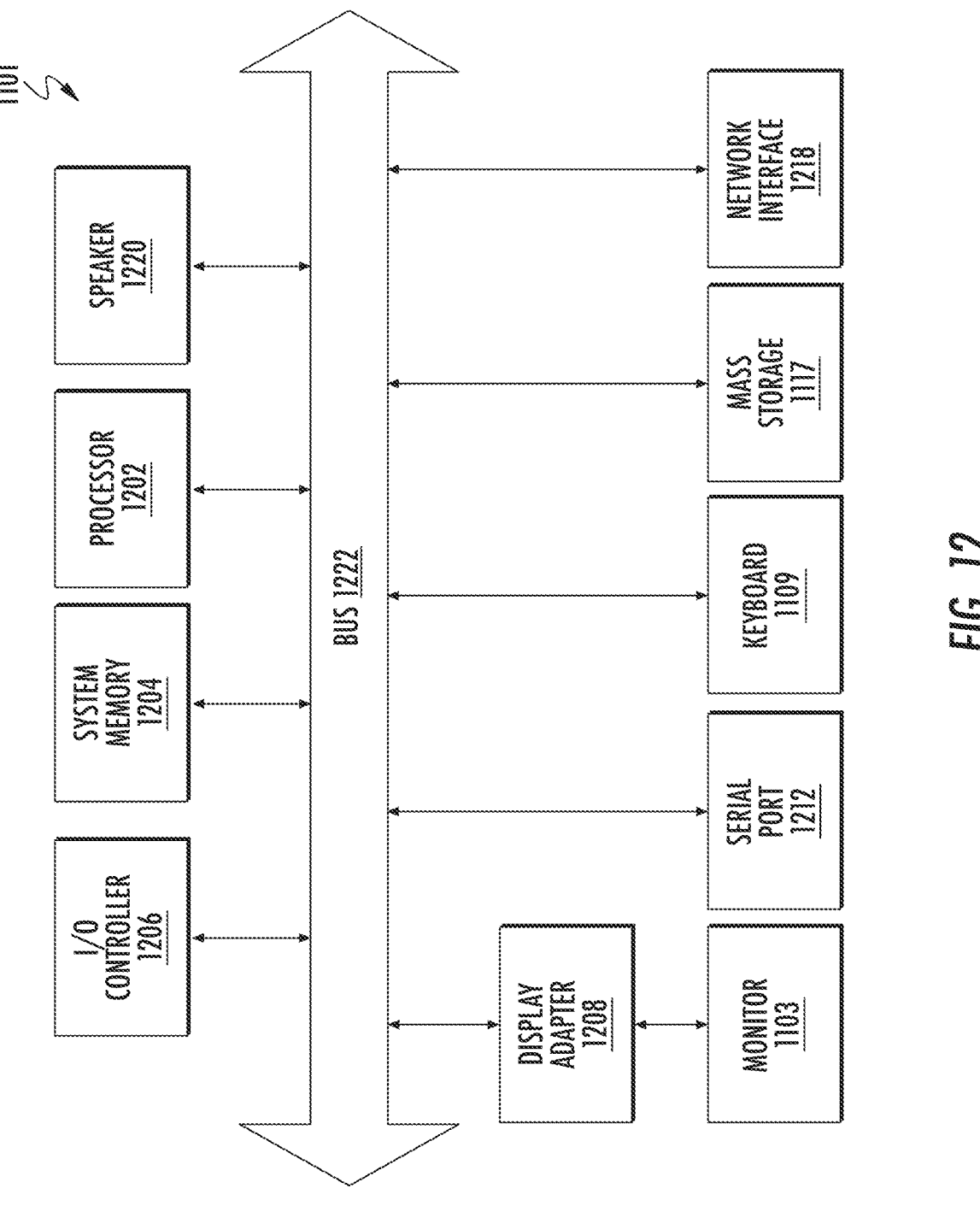
FIG. 12 shows a system block diagram of the computer system shown in FIG. 11 that is used to execute the software of the present invention.

FIG. 12 shows a system block diagram of computer system 1101 used to execute the software of the present invention. As in FIG. 11, computer system 1101 includes monitor 1103, keyboard 1109, and mass storage devices 1117. Computer system 1101 further includes subsystems such as central processor 1202, system memory 1204, input/output (I/O) controller 1206, display adapter 1208, serial or universal serial bus (USB) port 1212, network interface 1218, and speaker 1220. The invention may also be used with computer systems with additional or fewer subsystems. For example, a computer system could include more than one processor 1202 (i.e., a multiprocessor system) or a system may include a cache memory.

Arrows such as 1222 represent the system bus architecture of computer system 1101. However, these arrows are illustrative of any interconnection scheme serving to link the subsystems. For example, speaker 1220 could be connected to the other subsystems through a port or have an internal direct connection to central processor 1202. The processor may include multiple processors or a multicore processor, which may permit parallel processing of information. Computer system 1101 shown in FIG. 12 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows 11, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download Web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a Web application from one or more servers using a network connection with the server or servers and load the Web application in a Web browser. For example, a Web application can be downloaded from an application server over the Internet by a Web browser. Nonnative applications can also be obtained from other sources, such as a disk.

Figure 13:
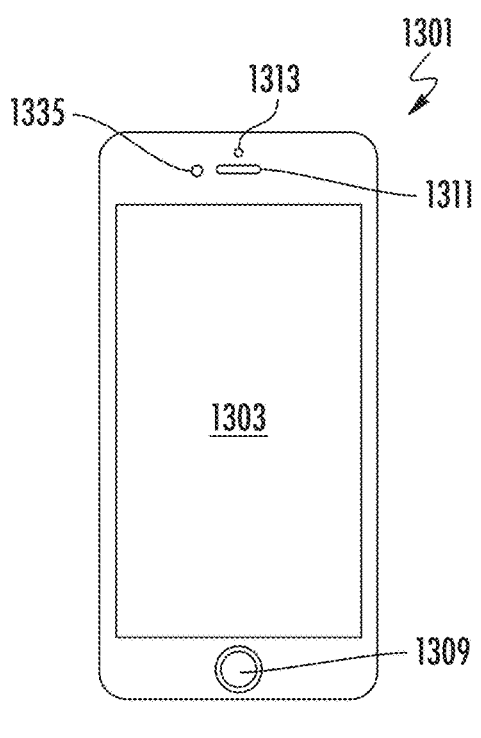
FIGS. 13-14 show examples of mobile devices, which can be mobile clients.
Figure 14:
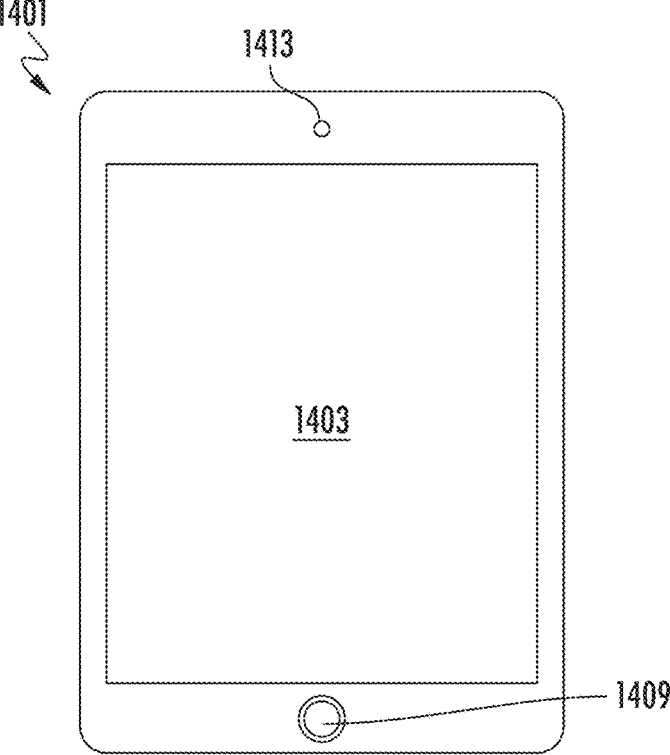

FIGS. 13-14 show examples of mobile devices, which can be mobile clients. Mobile devices are specific implementations of a computer, such as described above. FIG. 13 shows a smartphone device 1301, and FIG. 14 shows a tablet device 1401. Some examples of smartphones include the Apple iPhone, Samsung Galaxy, and Google Nexus family of devices. Some examples of tablet devices include the Apple iPad, Apple iPad Pro, Samsung Galaxy Tab, and Google Nexus family of devices.

Smartphone 1301 has an enclosure that includes a screen 1303, button 1309, speaker 1311, camera 1313, and proximity sensor 1335. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 1309 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 1401 is similar to a smartphone. Tablet 1401 has an enclosure that includes a screen 1403, button 1409, and camera 1413. Typically the screen (e.g., touch screen) of a tablet is larger than a smartphone, usually 7, 8, 9, 10, 12, 13, or more inches (measured diagonally).

Figure 15:
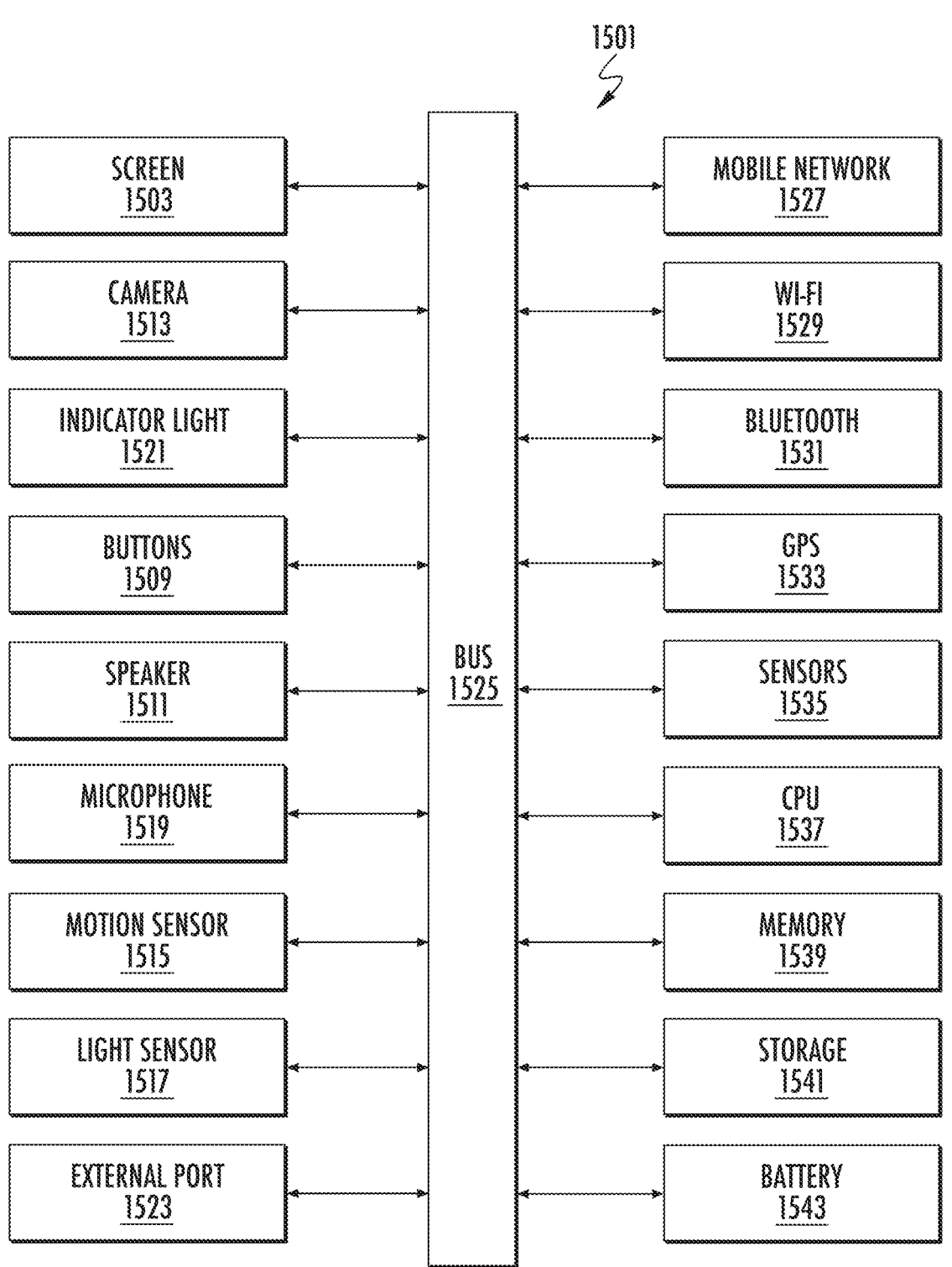
FIG. 15 shows a system block diagram of a mobile device.

FIG. 15 shows a system block diagram of mobile device 1501 used to execute the software of the present invention. This block diagram is representative of the components of smartphone or tablet device. The mobile device system includes a screen 1503 (e.g., touch screen), buttons 1509, speaker 1511, camera 1513, motion sensor 1515, light sensor 1517, microphone 1519, indicator light 1521, and external port 1523 (e.g., USB port or Apple Lightning port). These components can communicate with each other via a bus 1525.

The system includes wireless components such as a mobile network connection 1527 (e.g., mobile telephone or mobile data), Wi-Fi 1529, Bluetooth 1531, GPS 1533 (e.g., detect GPS positioning), other sensors 1535 such as a proximity sensor, CPU 1537, RAM memory 1539, storage 1541 (e.g., nonvolatile memory), and battery 1543 (lithium ion or lithium polymer cell). The battery supplies power to the electronic components and is rechargeable, which allows the system to be mobile.

Figure 16:
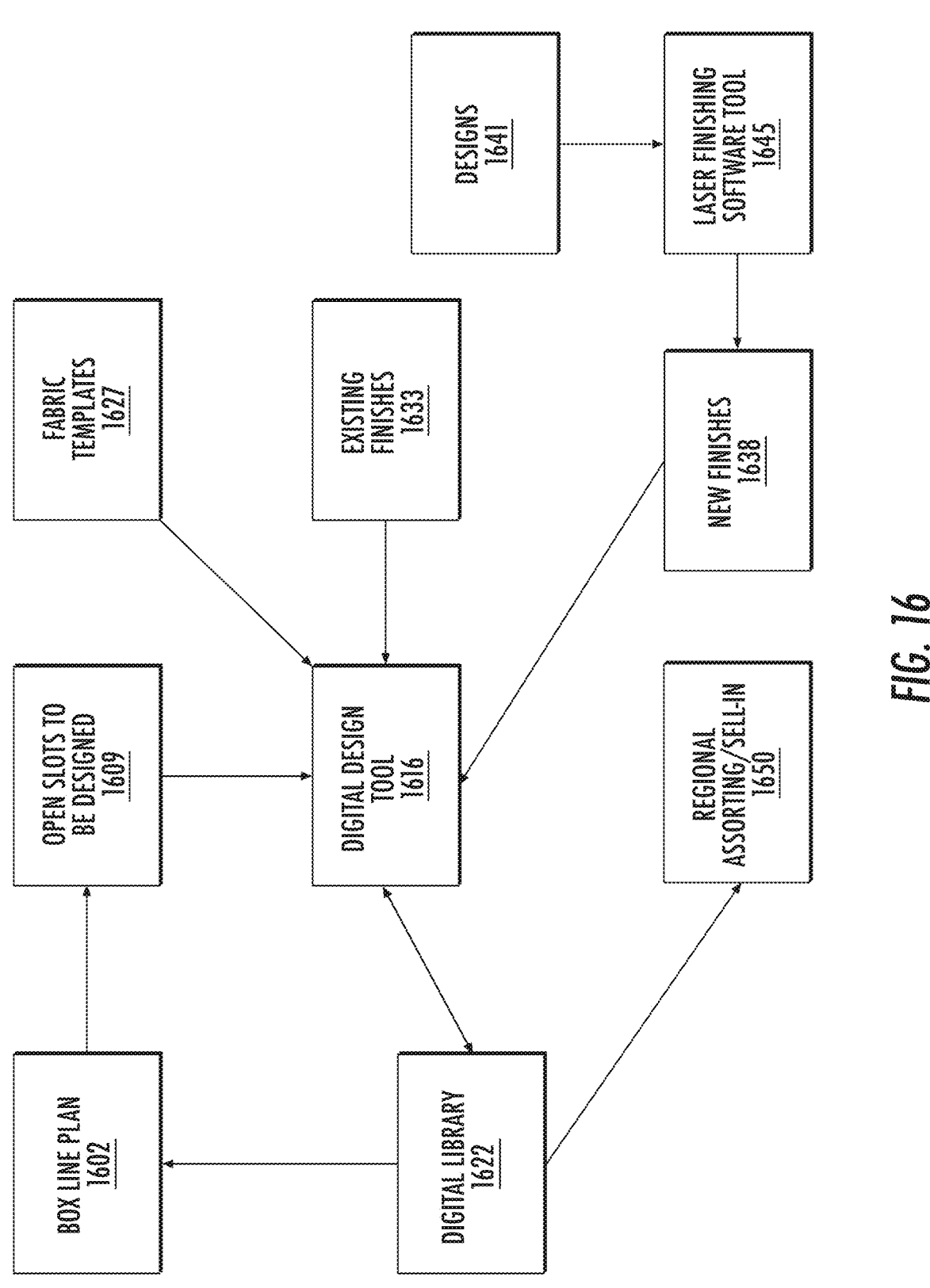
FIG. 16 shows a block diagram of a system for creating, designing, producing apparel products with laser finishing.

FIG. 16 shows a block diagram of a system for creating, designing, producing apparel products with laser finishing. A box line plan 1602 is an internal and interim tool for communication between a merchandising group and design group. Through the box line plan, merchandising can communicate what needs to be designed by the design group. The box line plan can have open slots to be designed 1609.

There is a digital design tool 1616 merchants and design can use to click and drag finish effects (e.g., laser files) and tint casts over images of base washes in order to visualize possible combinations and build the line visually before the garment finish is actually finished by the laser. The visualizations can be by rendering on a computer system, such as using three-dimensional (3D) graphics.

U.S. patent applications 62/433,746, filed Dec. 13, 2016, and Ser. No. 15/841,268, filed Dec. 13, 2017, which are incorporated by reference, describe a system and operating model of apparel manufacture with laser finishing. Laser finishing of apparel products allows an operating model that reduces finishing cost, lowers carrying costs, increases productivity, shortens time to market, be more reactive to trends, reduce product constraints, reduces lost sales and dilution, and more. Improved aspects include design, development, planning, merchandising, selling, making, and delivering. The model uses fabric templates, each of which can be used to produce a multitude of laser finishes. Operational efficiency is improved.

Designers can use the digital design tool to design products that are used to satisfy the requests in open slots 1609. Designs created using the digital design tool can be stored in a digital library 1622. Input to the digital design tool include fabric templates or blanks 1627 (e.g., base fit fabrics or BFFs), existing finishes 1633 (e.g., can be further modified by the tool 1616), and new finishes 1638. New finishes can be from designs 1641 (e.g., vintage design) captured using a laser finish software tool 1645, examples of which are described in U.S. patent applications 62/377,447, filed Aug. 19, 2016, and Ser. No. 15/682,507, filed Aug. 21, 2017. Digital library 1622 can be accessible by the region assorting and sell-in 1650. And the digital library can be used to populate or satisfy the box line plan.

Figure 17:
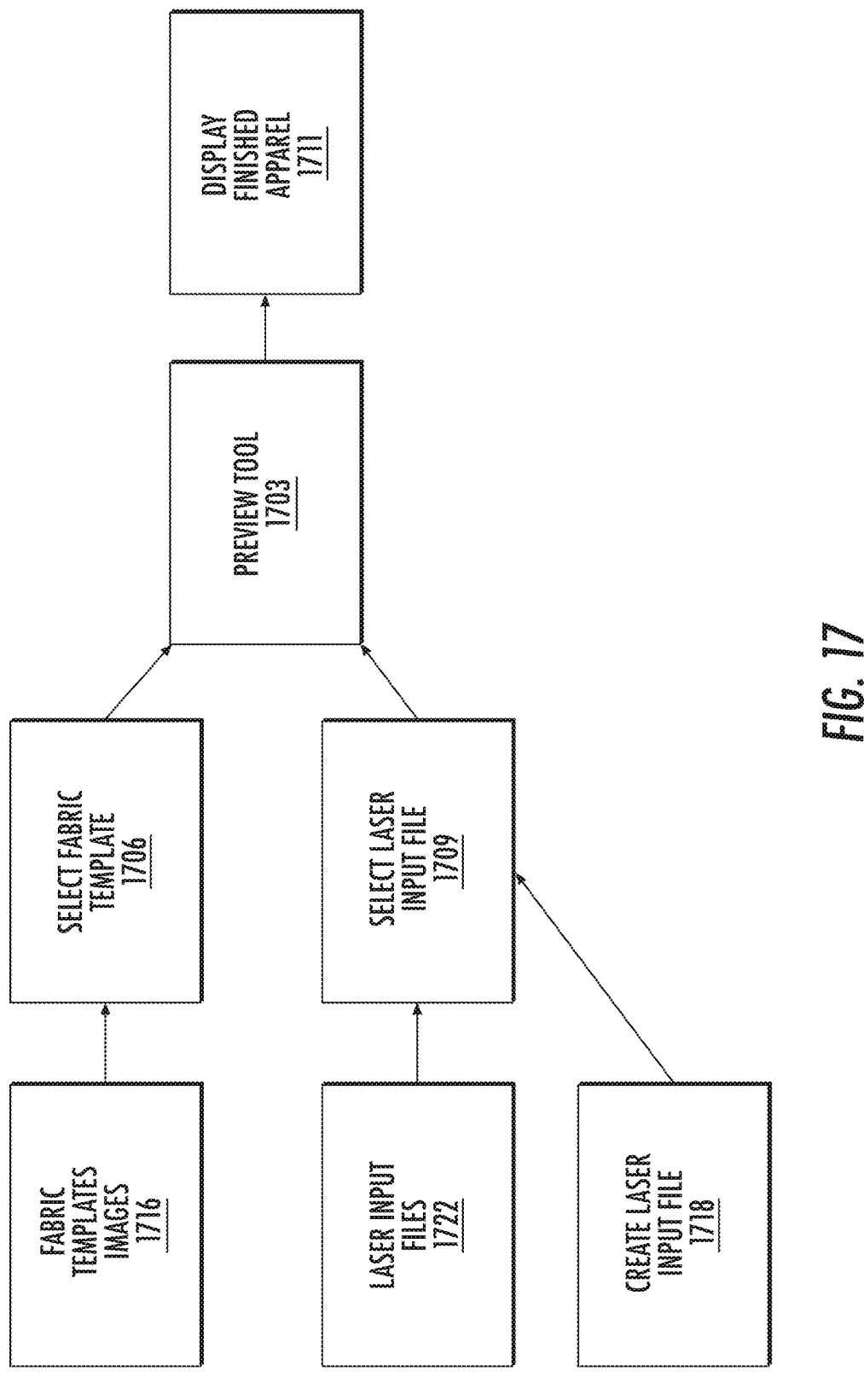
FIG. 17 shows a block diagram of a specific implementation of a digital design tool and a preview tool.

FIG. 17 shows a block diagram of a specific implementation of a digital design tool and a preview tool 1703. Digital design tool 1616 can be representative of a collection of tools, such as an application suite, including desktop or mobile apps, or a combination.

Preview tool 1703 can be a single tool in a toolbox or toolkit used for laser finishing of garments, or the tool can be incorporated as a feature of another tool. The preview tool 1703 allows a user such as a clothing designer to preview on a computer screen or to generate a digital representation (e.g., image file, JPEG file, BMP file, TIFF file, GIF file, PNG file, PSD file, or others) of jeans in a selected base fit fabric or fabric template 1706 with a selected laser pattern 1709 (e.g., from a laser input file). With the digital representation, the user will be able to see or preview the jeans in the selected base fit fabric as if it had been burned or ablated with the selected laser input file, without needing to actually laser or burn or ablate the jeans.

With the preview tool, the appearance of the garment (e.g., jeans) will be of the finished garment product that the consumer will see (e.g., after postlaser wash). As discussed above, after laser finishing, the garment will have charred appearance, and damage holes will still be connected by fine yarns, and will not yet be tinted. After postlaser wash, the charring and yellowish hue due to the laser ash and residue will be washed away. The damage holes or openings will be opened and typically have a shredded appearance. The garment will have the selected tinting (e.g., color and level of color).

The preview tool displays on a screen or other visual output a preview image 1711 of the garment as it would appear to the consumer, after post laser wash. The preview image 1711 will be a photorealistic image in color. The preview image may be displayed in using a 8-bit or greater color depth, 16-bit or greater color depth, 24-bit or greater color depth, or 32-bit or greater color depth. This is in contrast to a computer screen at operator's console of a laser finishing machine, which typically only shows black and white images. The console is primarily used for alignment rather than design, and using black and white images can provide increased contrast (as compared to color images) which aids the operator in achieving proper alignment.

The console is directly attached or connected to the laser, while the preview tool is front end tool that executes remotely from the computer and connected via a network. The preview tool can be directly attached or connected to the laser, but typically not because laser finishing is typically performed at a different physical location from where garments are designed. For example, a design facility may be in San Francisco, while the laser finishing center may be Las Vegas or outside the United States (e.g., China, Mexico, Bangladesh, Sri Lanka, Vietnam, India, Malaysia, Indonesia, Egypt, Brazil, and others).

After a garment has been designed and previewed using the preview tool, the information can be transferred via the network to the laser finishing tool and its console. For example, the preview tool can execute on a desktop computer, mobile device (e.g., smartphone or tablet computer), or using a Web browser.

Some files are described as being of an image file type. Some examples of image file types or file formats include bitmap or raster graphics formats including IMG, TIFF, EXIF, JPEG, GIF, PNG, PBM, PGM, PPM, BMP, and RAW. The compression for the file can be lossless (e.g., TIFF) or lossy (e.g., JPEG). Other image file types or file formats include vector graphics including DXF, SVG, and the like.

Bitmaps or raster graphics are resolution dependent while vector graphics are resolution independent. Raster graphics generally cannot scale up to an arbitrary resolution without loss of apparent quality. This property contrasts with the capabilities of vector graphics, which generally easily scale up to the quality of the device rendering them.

A raster graphics image is a dot matrix data structure representing a generally rectangular grid of pixels, or points of color, viewable via a monitor, paper, or other display medium. A bitmap, such as a single-bit raster, corresponds bit-for-bit with an image displayed on a screen or output medium. A raster is characterized by the width and height of the image in pixels and by the number of bits per pixel (or color depth, which determines the number of colors it can represent).

The BMP file format is an example of a bitmap. The BMP file format, also known as bitmap image file or device independent bitmap (DIB) file format or simply a bitmap, is a raster graphics image file format used to store bitmap digital images, independently of the display device. The BMP file format is capable of storing two-dimensional digital images of arbitrary width, height, and resolution, both monochrome and color, in various color depths, and optionally with data compression, alpha channels, and color profiles.

The fabric template can be selected from a library of fabric template images 1716 or may be a new image uploaded or provided by the user. Each fabric template images is an image file of jeans in a base fit fabric or other material. For each jeans model or fit (e.g., models or fits 311, 501, 505, 511, 515, 541, 569, 721, and others), there would be one image in each different material or base fit fabric.

The laser input file can be selected from a library of laser input files 1722 (e.g., files created from vintage jeans or from a group of designers), a file 1718 created by the user, or a file uploaded or provided by the user. For example, the user may have created the laser pattern (contained within a laser input file) manually using a graphical or image editing tool (e.g., Adobe Photoshop and similar photo editing programs). Or the laser pattern may have been created by another, such as selected from a library of laser files. The laser pattern may be generated by a computer or automated process, such as may be used to obtain a laser pattern from vintage jeans. The user will be able to see the results of a burn or ablation, make any manual changes or alterations to the pattern (such as additional changes to a vintage jeans pattern in a digital image file) and preview the results again. The preview tool allows a user to make and see changes, to the user can obtain feedback faster than having to laser jeans to see the results and also avoiding unneeded waste (e.g., preliminary versions of burned or ablated jeans).

Each digital representation can be saved as separate images, and a group or set of the images can be a called brief of collection of jeans. The preview tool can be used for merchandising, such as generating images of a proposed line of products for a particular season, and these images can be shared among members of a team to discuss any additions, changes, or deletions to a collection.

A table A below presents a pseudocode computer program listing of sample software code for a specific implementation of a preview tool 1703 for displaying finished apparel 1711 for a given fabric template input (e.g., base fit fabric image) and laser input file. A specific implementation of the source code may be written in a programming language such as Python. Other programming languages can be used.

TABLE A

```
PREVIEW PATTERN TOOL
SETUP: file selection object
GET: input file from user selection
ASSIGN: default blur options for high and low settings
ASSIGN: input and conversion dpi settings
FUNCTION: Import File (File List, File Index):
   IMPORT: file being previewed
   COMPUTE AND SET: resolution conversion factor
   CALCULATE: optional resized image for use during preview
   RETURN: input file and resized input file
RUN: Import File (File List, File Index)
CREATE: plotting object to display results to user
SETUP: custom colors for preview options
ASSIGN: color and color separation variables
SETUP: graphical user interface interactions buttons, sliders, etc.
FUNCTION: Update (Value):
   READ: current display settings
   CHECK: which user interactions are being changed
   ASSIGN: operation variable value
   PERFORM: user specified operation
   REDRAW: plot of image preview to user
FUNCTION: Reset (Event):
   RESET: all default settings for image preview
FUNCTION: Change Color (color):
   SET: color of base color for preview
   REDRAW: plot of image preview to user
PLOT: current state of file object
```

A specific version of the preview tool overlays a fabric template input file and a laser input file, and then generates an image to display them together as a representation of the laser-finished apparel. The laser input file is aligned to the garment in the fabric template input file, so that the positioning of features in the laser input file are at appropriate positions or places on the garment. The alignment may be by using alignment marks that are in the input files. The alignment may be an automated alignment or scaling, or a combination.

Brightness, intensity, opacity, blending, transparency, or other adjustable parameters for an image layer, or any combination of these, are selected or adjusted for the laser input file, so that when the laser input file is overlaid above the fabric template image, the look of the garment will appear of simulate the look of a garment had been burned or ablated by a laser using that laser input file.

Adjustable parameters such as opacity can be used to blend two or more image layers together. For example, a layer's overall opacity determines to what degree it obscures or reveals the layer beneath it. For example, a layer with 1 percent opacity appears nearly transparent, while one with 100 percent opacity appears completely opaque.

Further, a dots per inch (dpi) of the combined image can be adjusted to more properly simulate the look of a garment more closely with a burned or ablated garment. Dots per inch refers to the number of dots in a printed inch. The more dots, the higher the quality of the print (e.g., more sharpness and detail). By reducing the dpi of the image, this will reduce the image quality, resulting a blurring of the image. In an implementation, the preview tool reduces a dpi of the combined image, to be of less dpi than the fabric template input file or the laser input file. By blurring the preview image, this results in improved simulation that corresponds better to a burned or ablated laser garment. When burning or ablated a garment, the garment material or fabric typically limits the resolution of the result to less than that of the input file.

In an implementation, the dpi of the laser input file is about 72 dpi, while the dpi of the preview image is about 34 dpi. In an implementation, the dpi of the fabric template input file and laser input file are about 36 dpi or above, while the dpi of the preview image is about 36 dpi or lower.

FIG. 18 shows a block diagram of a digital brief tool 1803, which also like preview tool 1703, provides a real-time preview of an appearance of pair of jeans when a finishing pattern is applied by burning or ablated using a laser input file. The digital brief tool has additional features to allow more flexible designing of jeans.

It should be understood that the invention is not limited to the specific flows and steps presented. A flow of the invention may have additional steps (not necessarily described in this patent), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

The digital brief tool takes as input three types of digital assets 1805, fabric template input 1816, damage input 1819 (e.g., damage input file), and laser input file 1822. Fabric template input 1816 and laser input file 1822 are similar to the inputs for the preview tool. Damage input 1819 is an image of damage (e.g., holes, rips, shredded regions, or openings of various shapes and sizes) that can be burned or ablated by a laser into jeans. The digital brief tool overlays the damage and laser input files over the fabric template.

The user selects a fabric template input, which an image of a jeans style in a particular base fit fabric. The user can optionally select one or more damage inputs. If a damage input is selected, the damage input will be a layer that overlays the fabric template layer. As for the preview tool, the user selects a laser input file with laser pattern and overlays the fabric template layer. As the user selects the inputs, the user will be able to see in real time the inputs and any changes or updates in a preview image or brief.

After the inputs are selected, the user can select and perform one or more operations 1826 on the inputs using the digital brief tool. These operations including adding tint 1831, adjusting intensity 1834, adjusting bright point 1837, move digital asset 1842, rotate digital asset 1845, scale digital asset 1848, and warp digital asset 1852. As the user selects and performs one or more operations, the user will be able to see in real time the changes or updates in the preview image or brief.

After the fabric template input, the user can add tinting 1831. Tinting will adjust the hue of the color of the fabric template input. Tinting is representative of the tinting which can be added during the post-laser wash or finishing II, described above. The user will be able to select a tint color, and this tint color will be blended with the existing color of the fabric template input. The amount or intensity of the tinting can be increased or decreased, such as by using a slider bar.

The user can adjust intensity 1834. In an implementation, intensity adjusts a weight matrix by a percentage of each value in the array. In an implementation, intensity (or brightness) adjusts an opacity of a generated adjustment layer (see hue saturation lightness adjustment layer described below). The greater the opacity, the more opaque this layer will appear in the preview or brief image. The less the opacity, the less opaque this layer will appear in the preview or brief image; the layer will appear more transparent so that the layer beneath will show through more.

When increasing brightness, the opacity of the adjustment layer increases, and since the adjustment layer is above the fabric template input, the generated adjustment layer will become more prominent or visible, thus making this layer (which has the wear pattern) brighter. Similarly, when decreasing brightness, the opacity of the adjustment layer decreases, the generated adjustment layer will become less prominent or visible, thus making this layer (which has the wear pattern) less bright or fainter. The amount of the intensity can be increased or decreased, such as by using a slider bar.

The user can adjust bright point 1837. Bright point adjusts the effect of the laser input file on the fabric template input. In an implementation, bright point adjustment changes a midpoint of a grayscale, creating a piecewise linear mapping of the pattern file.

Increasing the bright point will increase an effect of the laser pattern (e.g., causing greater laser pattern highlights) in the laser input file on the fabric template input, while decreasing the bright point does the opposite (e.g., diminishing laser pattern highlights). The bright point adjustment can be analogous to changing a pixel time or the time that the laser stays at a particular position for a given input from the laser input file. The amount of the bright point can be increased or decreased, such as by using a slider bar.

The user can move 1842 or reposition a selected digital asset. For example, a damage input (or fabric template or laser file) may be moved to a position desired by the user. The user can rotate 1845 a selected digital asset. For example, a damage input (or fabric template or laser file) may be rotated to any angle relative to the other layers as desired by the user.

The user can scale 1848 a selected digital asset. This scaling can be locked, maintaining the original aspect ratio of the digital asset, or can be unlocked, such that the user can change the aspect ratio. The user can warp 1852 a selected digital asset. With warping, the user can adjust an aspect ratio of a portion of the digital asset differently from another portion. For example, one portion of a damage input (or fabric template or laser file) can be squished (e.g., right and left edges of image pushed toward each other) while another portion is expanded (e.g., right and left edges of image pulled away from each other).

After the user has performed selected operations 1826, the digital brief tool shows an image of the jeans with the laser finishing pattern, including any tinting, damage, or other adjustments, as created by the user. This image can be saved and viewed again later. A user can create multiple designs, and these can be saved together as part of a collection.

Figure 19:
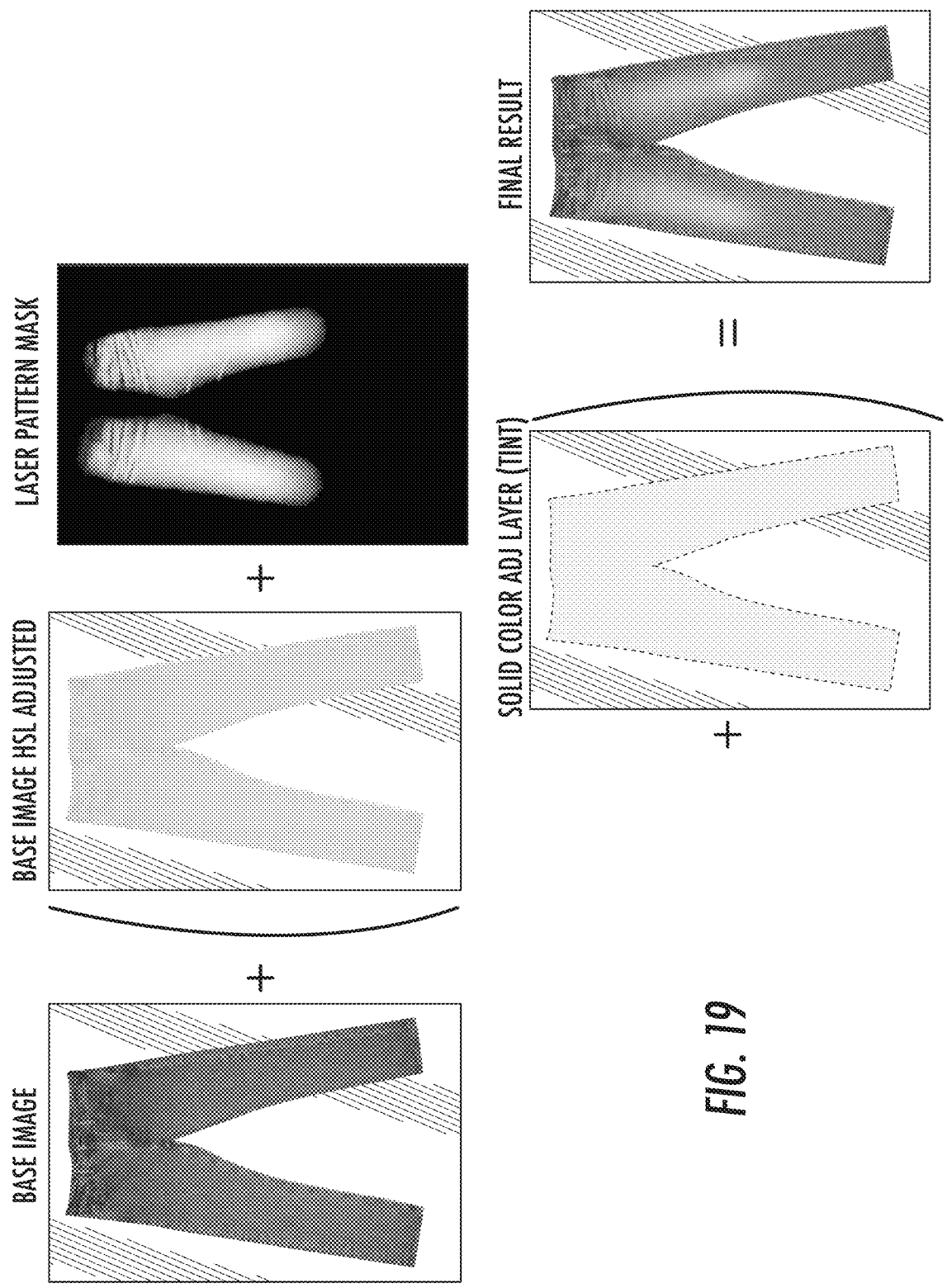
FIG. 19 shows a technique of generating a preview of a finished image using a digital brief tool.

FIG. 19 shows a technique of generating a preview of a finished image using a digital brief tool. A base image (or fabric template input) is selected. A hue saturation lightness or hue saturation luminance (HSL) adjustment layer is created or generated for the selected base image. The HSL adjustment layer can be the base layer with an adjustment for hue saturation lightness. When tinting is selected, a solid color adjustment layer is created or generated.

To obtain a final result, which is the final image of the jeans with laser finishing pattern, a laser pattern mask is combined with the base image and HSL adjustment layer. A resulting combination will be based on intensity and bright point settings.

The laser pattern mask is a negative image or reverse image of the laser input file. For the laser input file, during laser burning or ablating, a white pixel means the pixel is not lasered (which results in the original indigo color of the fabric), and a black pixel means the pixel will be lasered at highest level (which results in the whitest color that can be achieved on the fabric). In an implementation, the laser input file has 256 levels of gray, and for levels between 0 (e.g., black) and 255 (e.g., white), then the amount of laser burning or laser ablating will be proportionally somewhere in between.

FIG. 20 shows a laser pattern mask that is created from a laser input file. The digital brief tool creates the laser pattern mask from the laser input file by reversing the laser input file. So, for the laser pattern mask, a black pixel means the pixel is not lasered (which results in the original indigo color of the fabric), and a white pixel means the pixel will be lasered at highest level (which results in the whitest color that can be achieved on the fabric).

Figure 21:
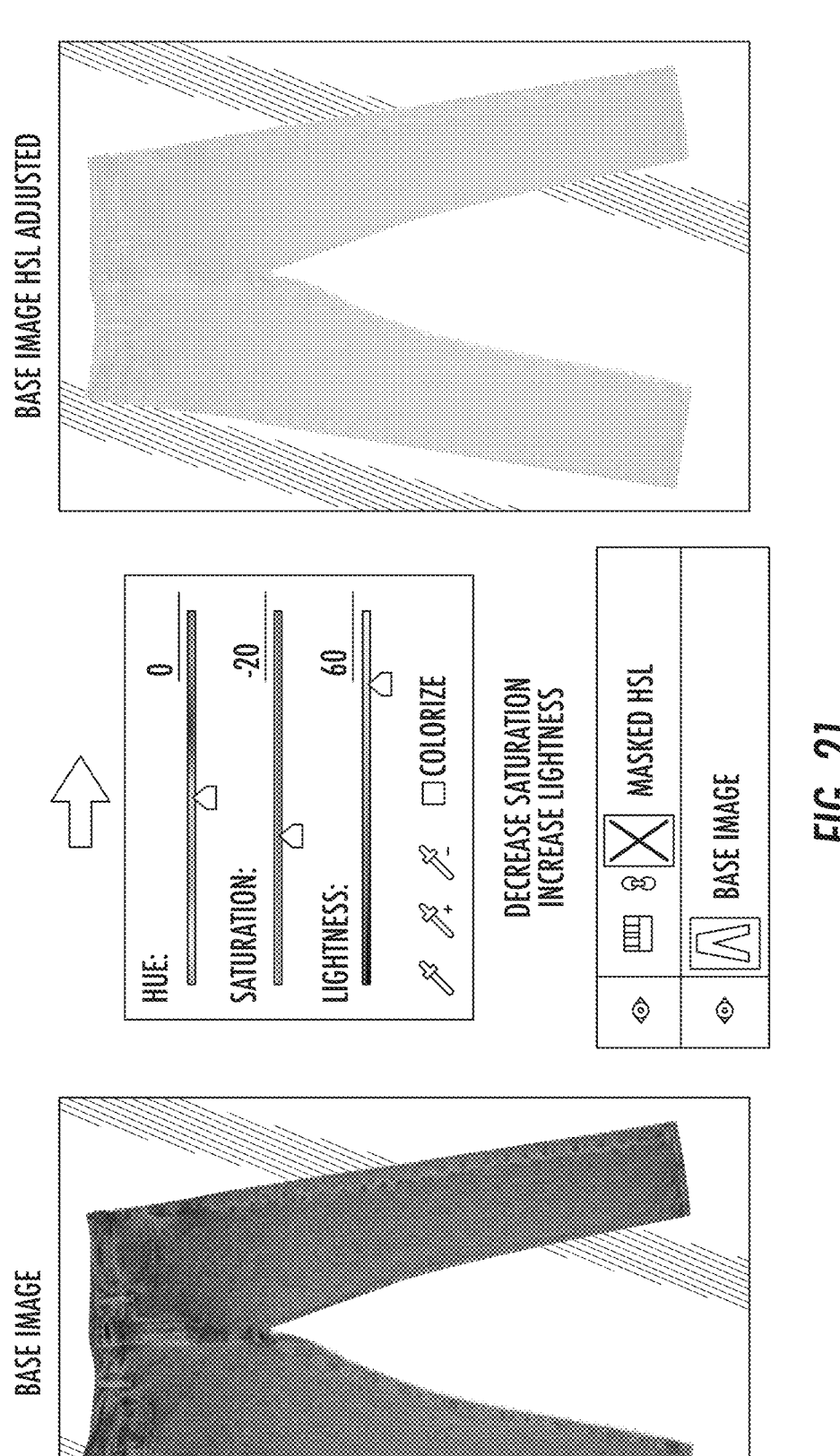
FIG. 21 shows an HLS adjustment layer that is created from the base image.

FIG. 21 shows an HLS adjustment layer that is created from the base image. The HLS adjustment layer (or adjustment layer) is like a bleaching layer, which is an image of what the jeans would appear like if the jeans were fully bleached or lasered. This layer is created by taking the base image and adjusting its hue, saturation, and lightness. In an implementation, for this layer, the saturation is reduced compared to the base layer, and the lightness is increased compared to the base layer. And the hue is not adjusted compared to the base layer.

A technique of the digital brief tool is to combine the base image and adjustment layer based on the laser pattern mask. For a black pixel in the laser pattern mask, the base layer will fully pass (and none of the adjustment layer) through to the final result image. For a white pixel in the laser pattern mask, the adjustment layer (and none of the base layer) will fully pass through to the final result image. For gray pixel values, then a percentage of the base layer and adjustment layer will pass through to the final result image. For example, for a value in the layer pattern mask, 90 percent of the base layer and 10 percent of the adjustment layer pass through to the final result image.

Figure 22:
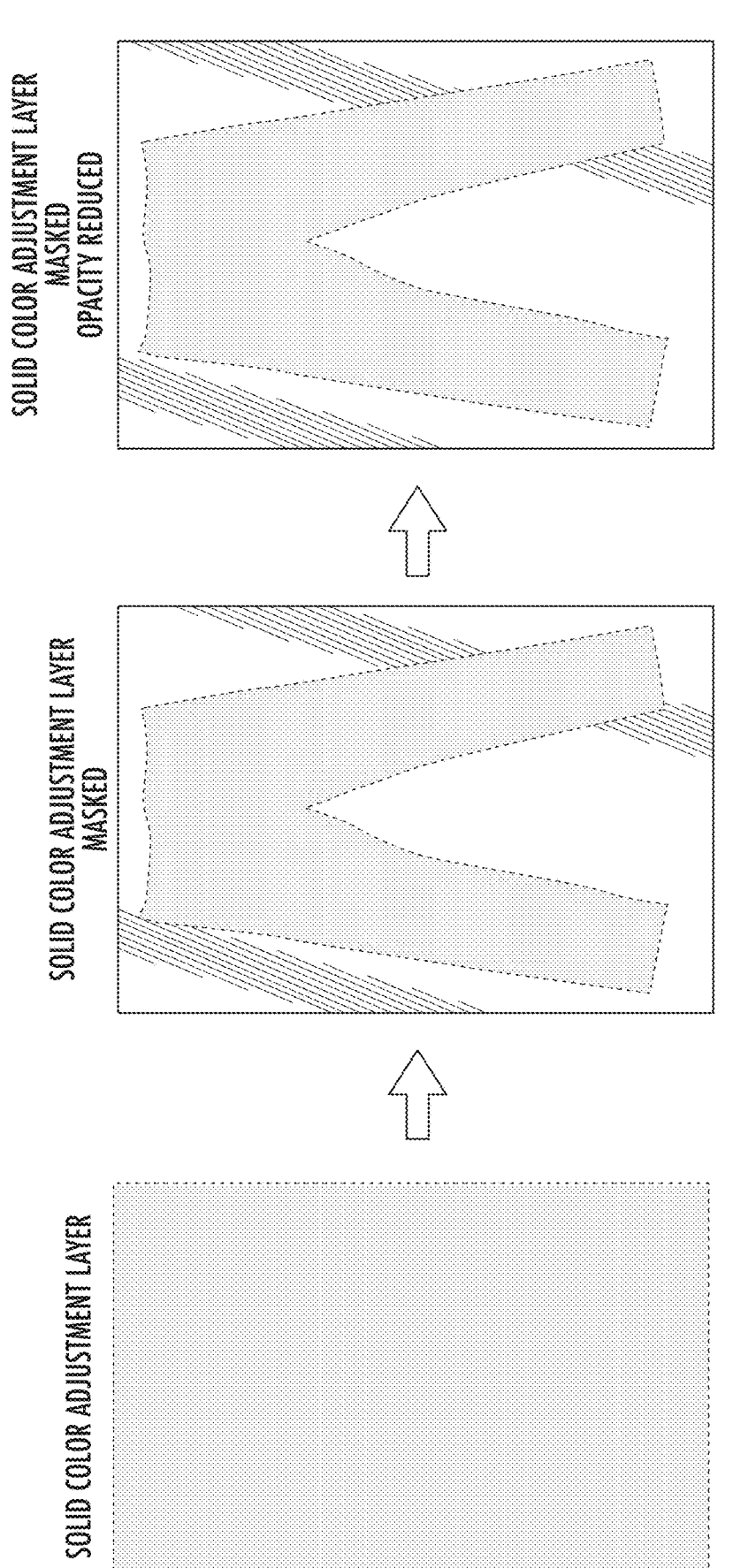
FIG. 22 shows a technique of creating a masked solid color adjustment layer.

FIG. 22 shows a technique of creating a masked solid color adjustment layer. The digital brief tool creates the solid color adjustment layer by creating a layer of a solid color, mask this layer based on the base image, and then create masked solid color adjustment layer. An opacity of the masked solid color adjustment layer can be reduced, so that when combined with the based image, the base image will pass through with some tinting contributed by the masked solid color adjustment layer.

FIGS. 23-24 shows examples of two different adjustments or settings for a bright point operation. Adjusting bright point adjusts a rate of transition from middle gray to white on the layer mask.

FIG. 25 shows adjustment of intensity. The intensity adjustment adjusts an opacity (e.g., 40 percent to 100 percent) of an HSL adjustment layer. At 100 percent, the HSL adjustment layer will be fully opaque, and the wear pattern will be very prominent in the brief image or preview.

Figure 26:
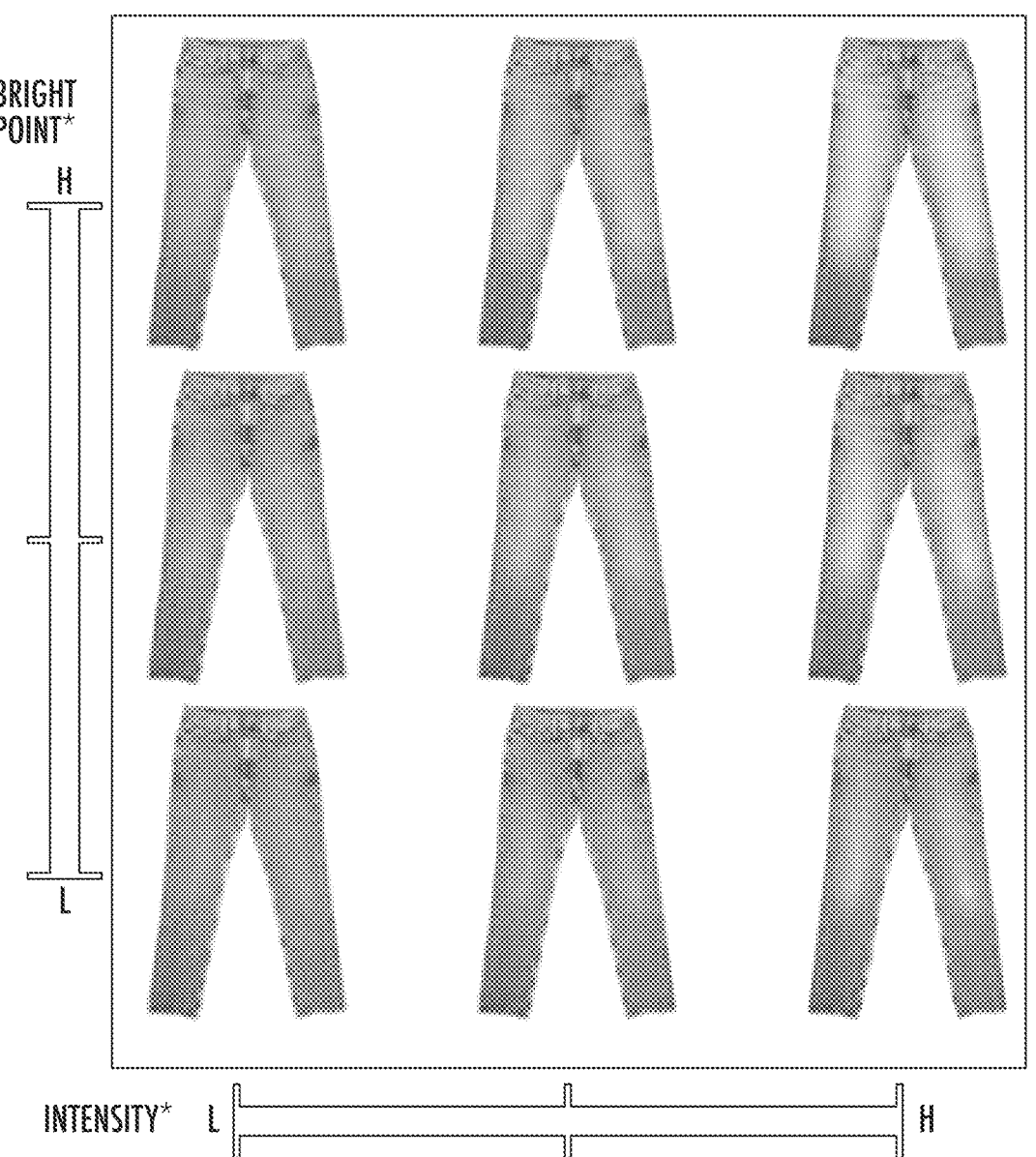
FIG. 26 shows an array of images showing the effects of adjustments in bright point and intensity.

FIG. 26 shows an array of images showing the effects of adjustments in bright point and intensity. Intensity changes are shown in an X or row direction, while bright point changes are shown in a Y or column direction.

For first jeans in the first column (from a left of the array), third row (from a top of the array), the bright point and intensity are both L, indicating the least amount of bright point and intensity. For second jeans in the second column, third row, these jeans have a bright point of L and an intensity between L and H. The wear pattern of the second jeans is more visible than that for the third jeans. For third jeans in the third column, third row, these jeans have a bright point of L and an intensity of H, indicating the greatest amount of intensity. The wear pattern of the third jeans is more visible than that for the second jeans.

For fourth jeans in the third column, second row, these jeans have a bright point between L and H, and an intensity of H. The size or area of the wear pattern of the fourth jeans is larger than that for the third jeans. For fifth jeans in the third column, first row, these jeans have a bright point of H and an intensity of H. The size or area of the wear pattern of the fifth jeans is larger than that for the fourth jeans.

In an implementation, one or more of the base image, the HSL adjustment layer, the laser pattern mask, the solid color adjustment layer (opacity adjusted and non-opacity adjusted), and the final result image are three-dimension images that show how a garment being customized appears in three-dimension at eat of the steps at with image information for these images is combines. Adjustment to the bright point and intensity may be made to intermediary three-dimensional images of garment or final three-dimension images of garments.

Figure 27:
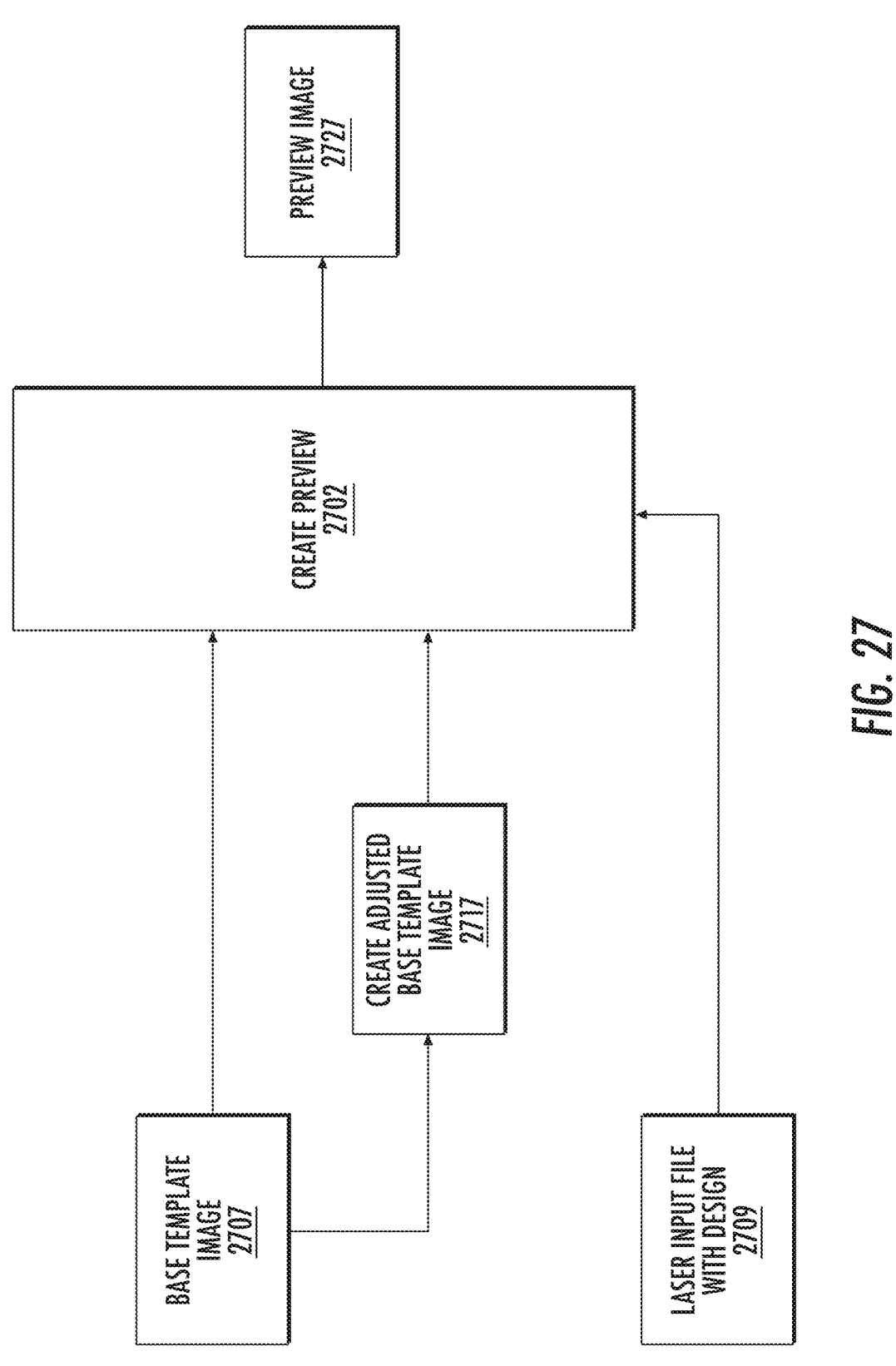
FIG. 27 shows a block diagram of a technique of generating a preview of a laser-finishing pattern on a garment, such as jeans.

FIG. 27 shows a block diagram of a technique of generating a preview of a laser-finishing pattern on a garment, such as jeans. Inputs to a create preview image process 2702 include a base template image 2707 and laser input file 2709. The base template image is used to create an adjusted base template image 2717, which is also input to the create preview image process. These create preview image process uses these three inputs to create a preview image 2727, which can be displayed on a computer screen for the user.

The adjusted base template image is created from the base template image by adjusting its hue, saturation, or lightness, or any combination of these. Compared to the original base template image, the adjusted base template image will appear washed out or bleached. In other words, the adjusted base template image will appear as if the garment in the base template image were fully bleached or lasered. The adjusted base template image can be an HLS adjustment layer as discussed above.

For a specific implementation of a laser, a specification for the laser input file is that each pixel is represented by an 8-bit binary value, which represents grayscale value in a range from 0 to 255. A 0 black prints the highest intensity (i.e., creates the most change and will be the lightest possible pixel) and a 255 white does not print at all (i.e., creates the least change or will be the darkest possible pixel).

For a laser input file for this laser implementation, a reverse or negative image of the laser input file is input to the create preview image process. Based on the negative laser input file, to create each pixel in the preview image, the create preview image process will pass pixels of the base template image or the adjusted base template image, or a combination of these.

For the negative laser input file, a black pixel means the pixel (which was a white pixel in the original file) will not be lasered (which results in the original indigo color of the fabric). And a white pixel means the pixel (which was black in the original file) will be lasered at highest level (which results in the whitest color that can be achieved on the fabric). And for gray pixels between black and white, the result will be proportional to the value, somewhere between darkest and lightest colors.

Similarly, to create the preview image, based the negative laser input file, a pixel of a (1) base template image (e.g., unbleached) or (2) adjusted base template image (e.g., bleached) or (3) some mixture or combination of the base template image and adjusted base template image proportional to the grayscale value in the negative laser input file. For example, for a gray value in the negative laser input file, 60 percent of the base layer and 40 percent of the adjustment layer pass through to the preview image.

The above discussion described a laser input file conforming to one type of logic. However, in other implementations of a laser, the values in the laser input file can be the reverse or negative logic compared to that described above. As one of ordinary skill in the art would appreciate, the techniques described in this patent can be modified accordingly to work with negative or positive logic laser input files.

FIGS. 28-43 show a number of screens for the preview tool 1703 or the digital brief tool 1803, such as for Levi's Customization Studio with Project F.L.X. The screens may be displayed on a client system 1301 or 1401 (e.g., smartphone, tablet computer, desktop computer, or other computer systems) or other system on which the preview tool or digital brief tool is operating. In an implementation, the screens may be for a consumer digital brief tool or a consumer preview tool where the consumer digital brief tool and the consumer preview tool have a more restricted feature set compared to a full or general digital brief tool or a full or general preview tool for a garment designer. A user can interact with the tools via the screens using a human interface device, such as keyboard device or touch screen interface of the client system.

In an implementation, the preview tool is a consumer digital brief tool, such as for Levi's Customization Studio with Project F.L.X. The consumer brief tool may be similar to a full or general digital brief tool for a designer, but may have a more restricted feature set. The consumer digital brief tool allows a consumer user to design apparel that may include a laser finish. The consumer digital brief tool can execute on a device such a computer, electronic tablet (e.g., Apple iPad), or smartphone. The user can interact with the tool using a keyboard device or touch screen interface.

The computer system is adapted to store and run computer code for the preview tool, the digital design tool, the consumer digital design tool, or any combination of these tools. That is, the computer system is adapted to store and run computer code for any of the digital brief tool 1803, operations 1805 associated with the digital brief tool, operations 1826 associated with the digital brief tool, the display digital brief 1711, any combination of these modules and operations, or other modules and operations. These software tools are sometimes referred to as software modules or simply modules. The consumer digital brief tool may be operated in a mobile processing system that can be moved from location to location where consumers can order and purchases garments that they consumers customize using the consumer digital brief tool. A number of mobile systems that includes shipping containers are described below.

Figure 28:
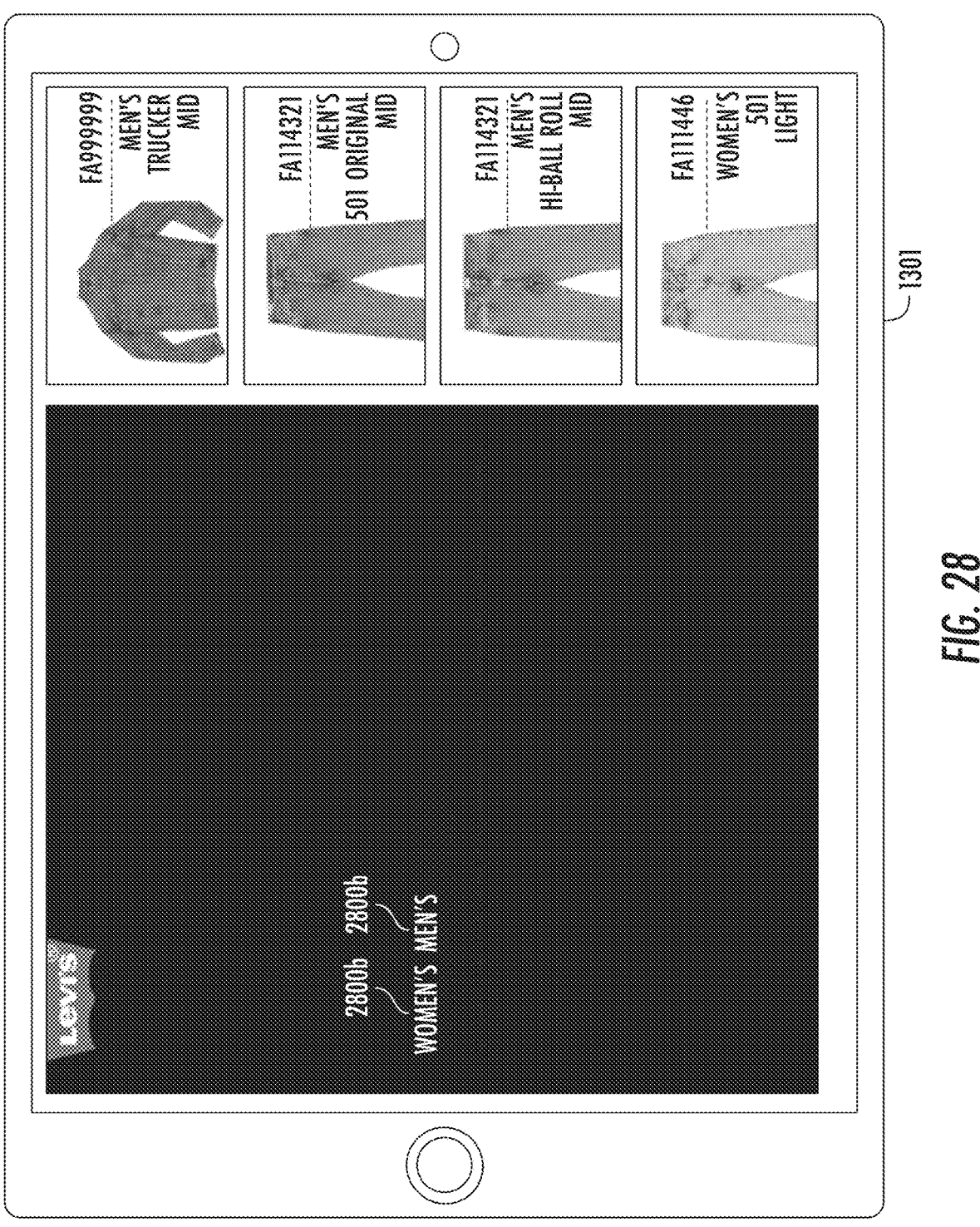
FIGS. 28-29 show screens that includes user selectable options for selecting garments for women or men.
Figure 29:
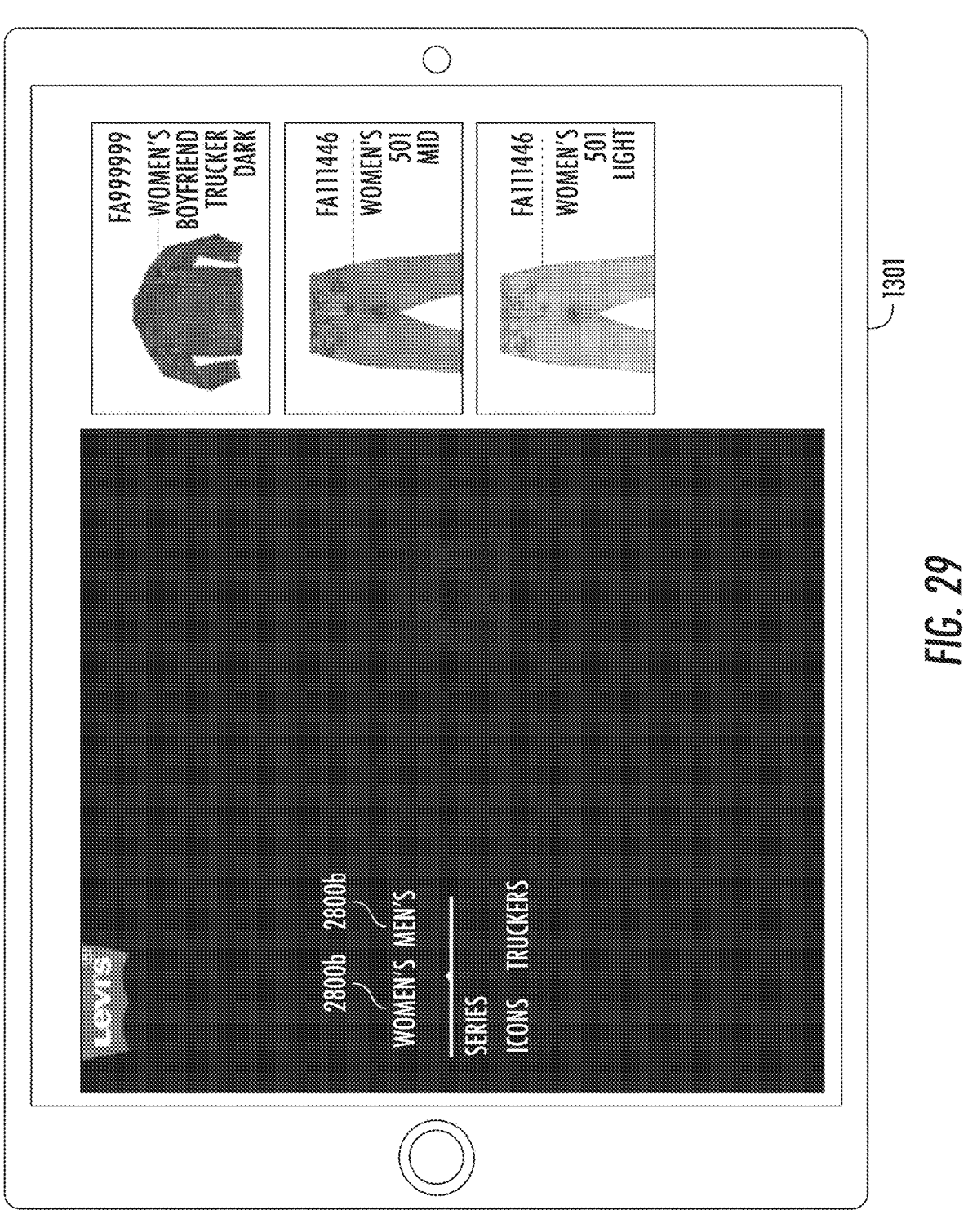

FIGS. 28-29 show screens that include user selectable options 2800a and 2800b for selecting garments for women or men. FIG. 28 shows a screen where garments that can be selected for designing. The garments in the example screen include a trucker jackets and jeans, such as 501 original, hi-ball roll, and 501 light. FIG. 29 shows a screen where garments for women 2800*a* has been selected and shows various garment that can be selected for customizing. The women's garments in the example screen include a trucker jackets and jeans, such as 501 mid and 501 light. Other garments may be displayed for selection.

Figure 30:
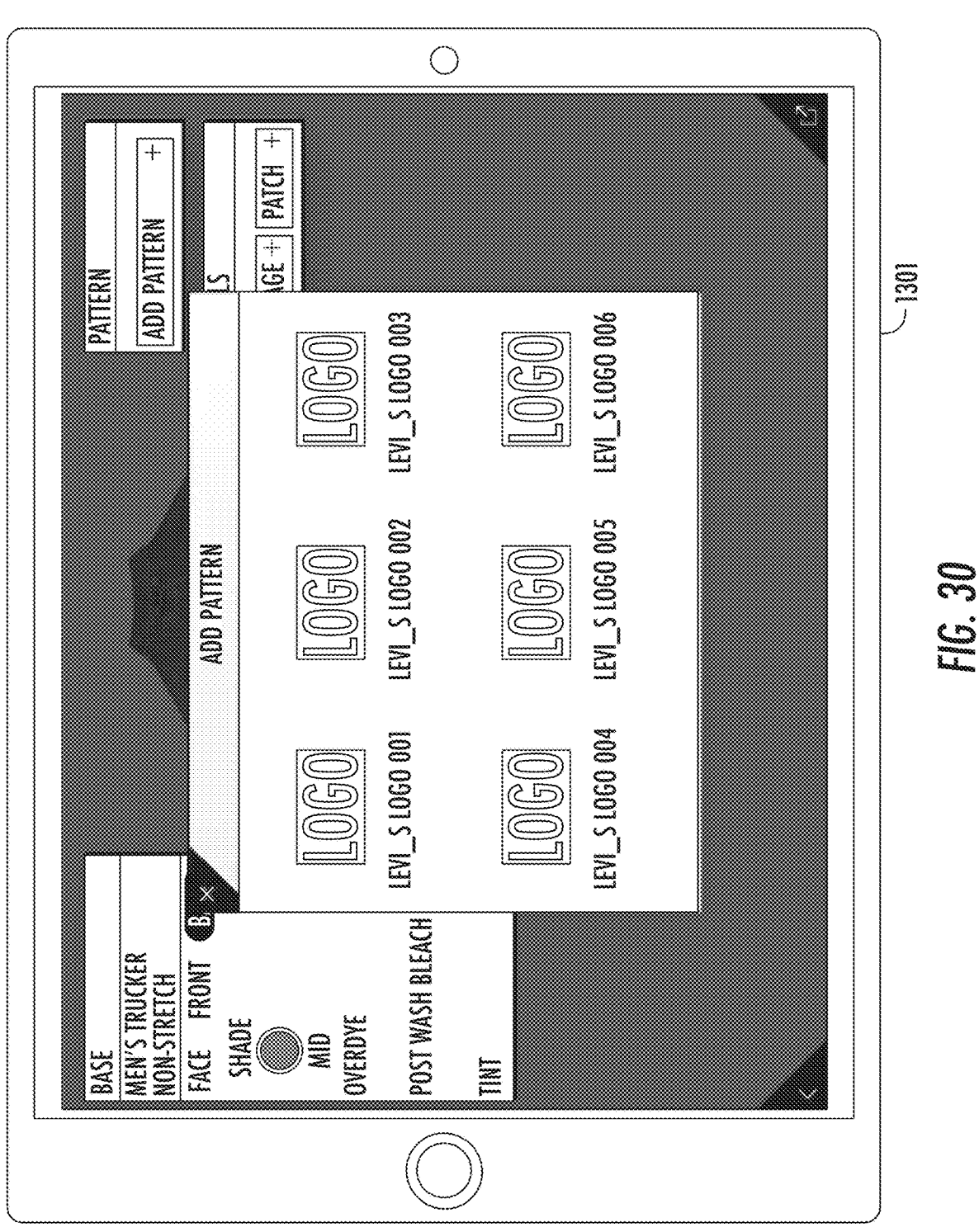
FIG. 30 shows a screen where the user can add a pattern or artwork, such as a logo, to add to a garment.

FIG. 30 shows a screen where the user can add a pattern or artwork, such as a logo, to add to a garment. These pattern or patterns will be applied onto the fabric of the garment by a laser finishing system.

Figure 31:
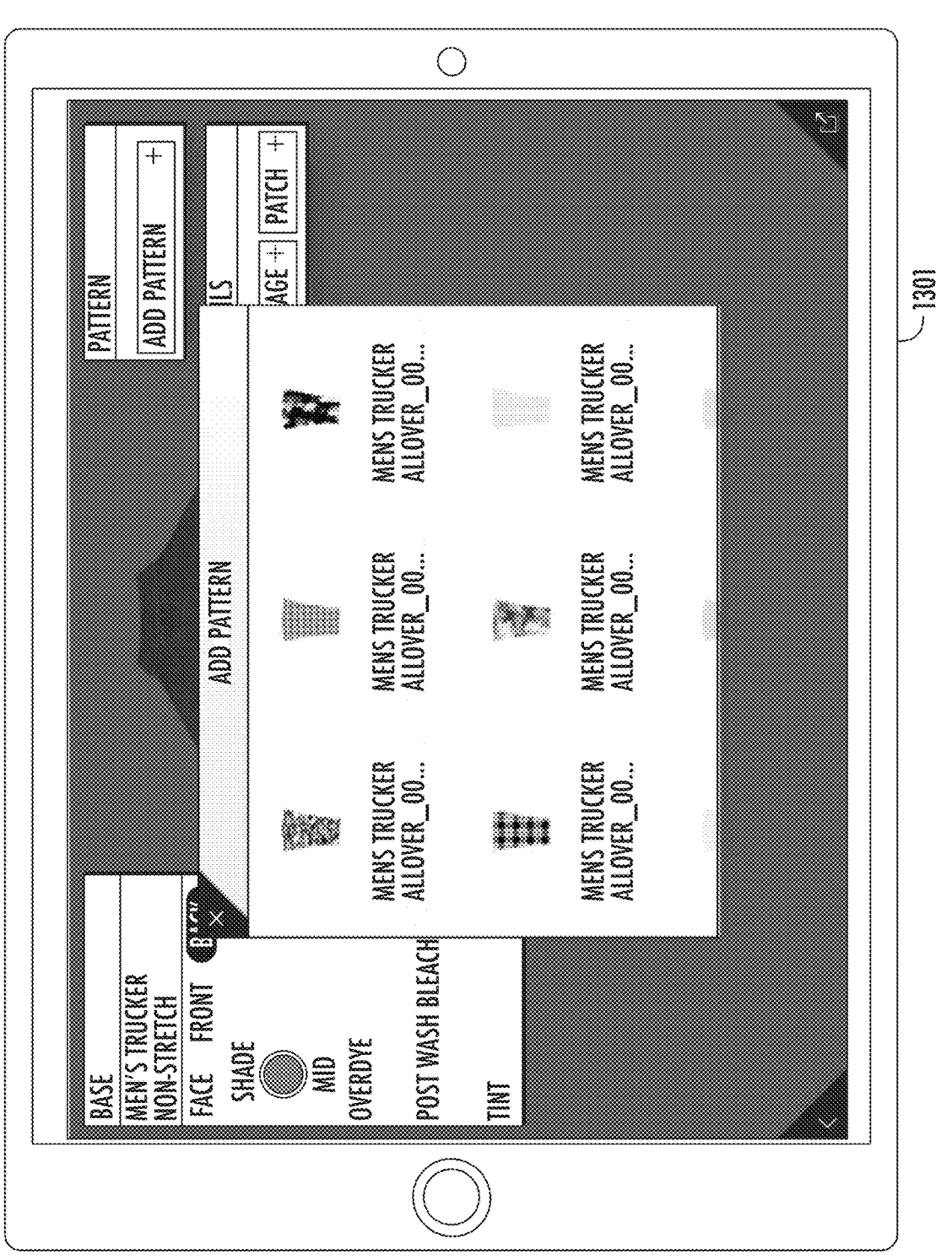

FIG. 31 shows a screen showing additional patterns or artwork, in addition to, for example, logos, the user can select from. For example, these patterns can include camo or camouflage, plaids, stripes, and others. These patterns can be repeated multiple times to extend in multiple directions, to increase the area of coverage on a garment. These pattern or patterns will be applied onto the fabric of the garment by a laser finishing system.

Figure 32:
FIG. 32 shows a screen showing a back of a trucker jacket.

FIG. 32 shows a screen showing a back of a trucker jacket. The user can select to view the front or back by selecting the appropriate button in an editing window or interface. Using the consumer digital brief tool, the user is able to see the back side of the garment, for both tops and bottoms. The system can store images in pairs. The user can select the back to digitally flip the garment over.

In the editing interface, the user can make selections as to a shade, overdye, intensity (e.g., a slider bar), post-wash bleach, and tint. In FIG. 32, the user has selected overdye and an intensity of 0.00. As the user makes these selections, the resulting changes to the garment are shown to the user in real time to the user.

Figure 33:
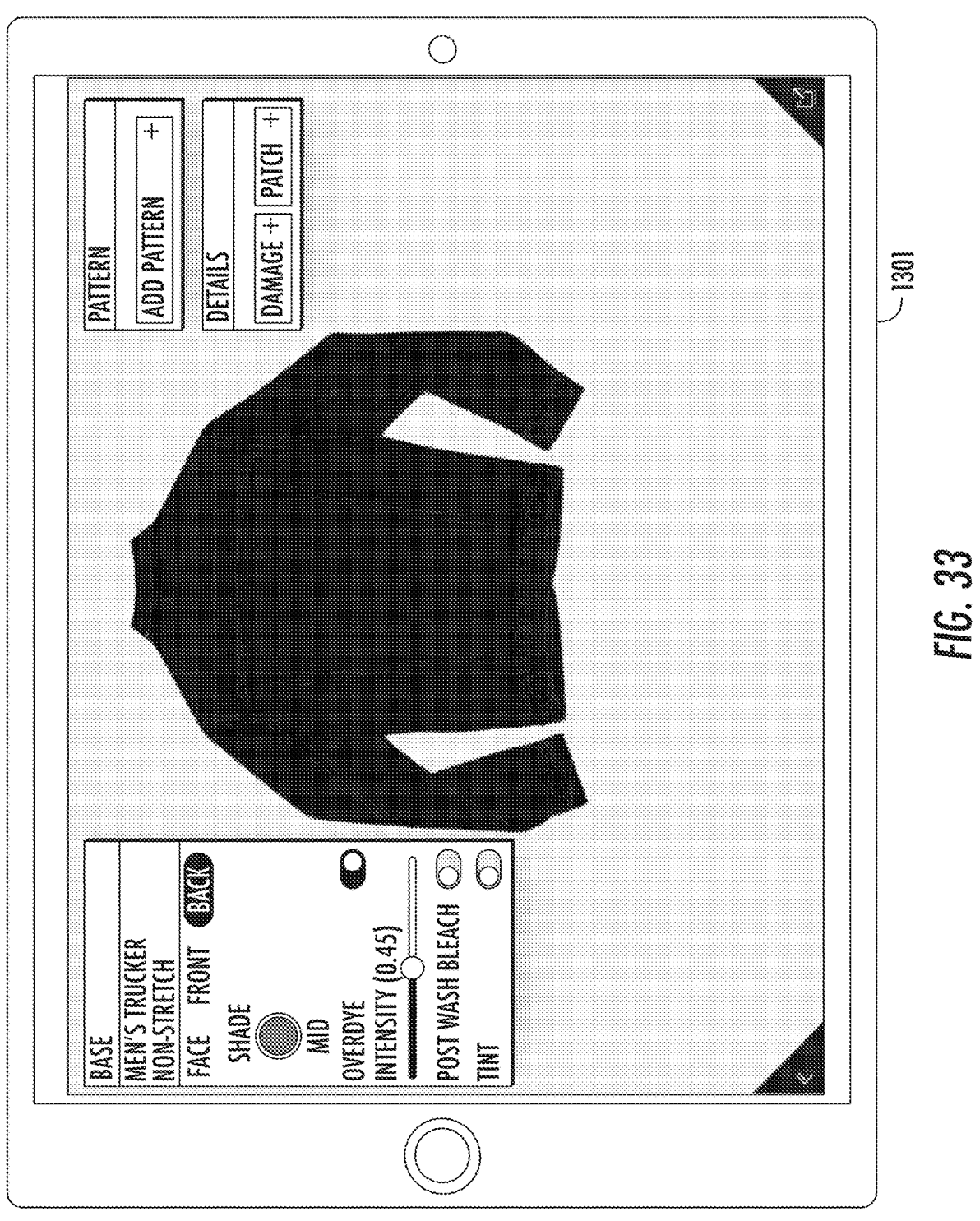
FIG. 33 shows a screen showing a back of a trucker jacket, where overdye is selected and a slider bar for the intensity the shade has been adjusted to 0.45.

FIG. 33 shows a screen showing a back of a trucker jacket, where overdye is selected and a slider bar for the intensity the shade has been adjusted to 0.45. This increases an intensity of the shade, so that the indigo will be a deeper shade. The change in coloration of the back of the trucker jacket is displayed in real time on the screen to the user, as the user adjusts the slider.

Figure 34:
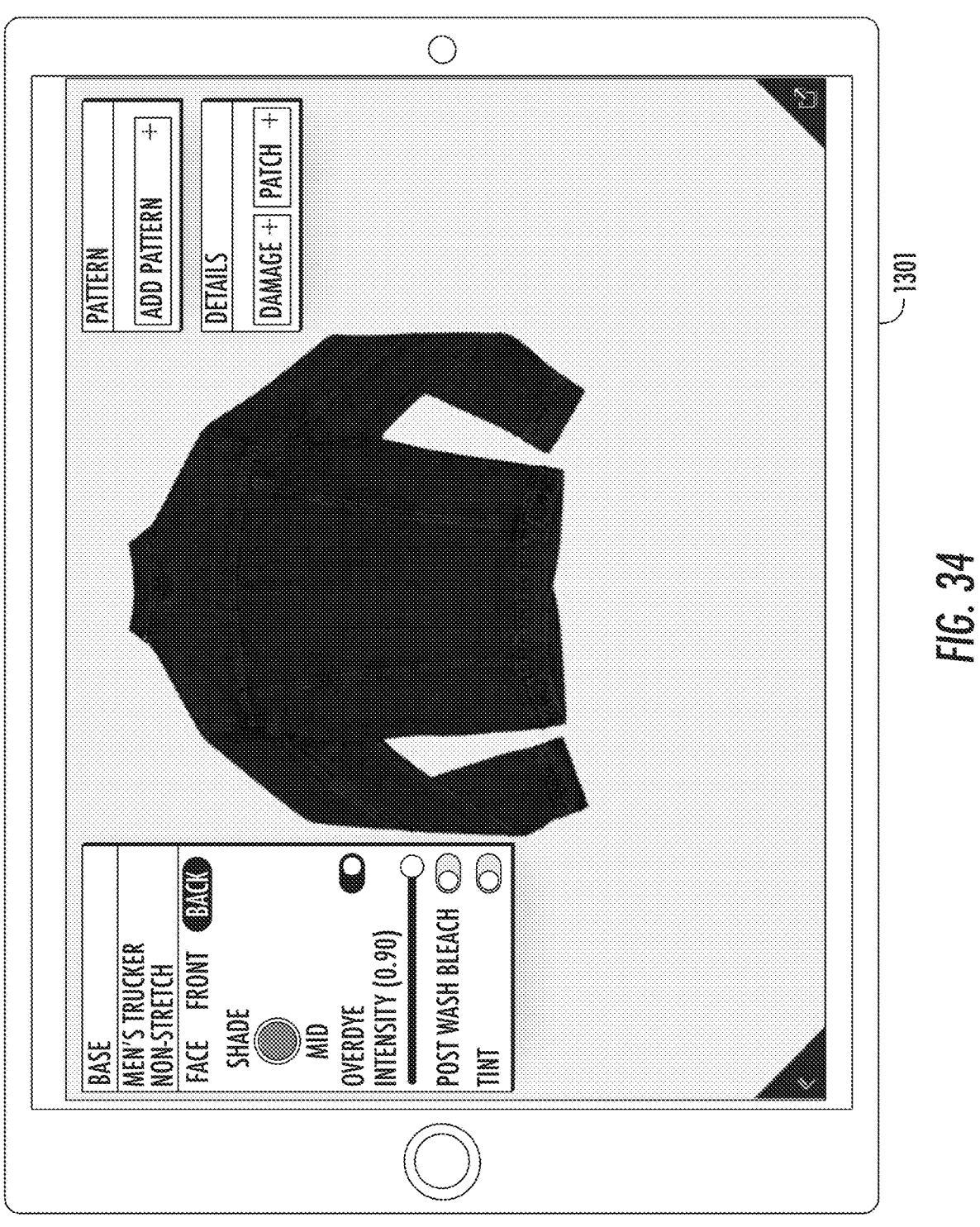
FIG. 34 shows a screen showing a back of a trucker jacket, where overdye is selected and the slider bar for the intensity the shade has been adjusted to 0.90.

FIG. 34 shows a screen showing a back of a trucker jacket, where overdye is selected and the slider bar for the intensity the shade has been adjusted to 0.90. The coloration of the trucker jacket is the deepest shade of indigo that is permitted by the tool. The change in coloration of the back of the trucker jacket is displayed in real time on the screen to the user, as the user adjusts the slider.

Figure 35:

FIG. 35 shows a screen showing back of a trucker jacket, where an option for overdye is turned off and post-wash bleach is turned on. The coloration of the trucker jacket is adjusted in real time, showing the how the back of the jacket will appear after manufacture.

Figure 36:
FIG. 36 shows a screen showing back of a trucker jacket, where an option for post-wash bleach is turned on and the intensity the shade has been adjusted to 0.08.

FIG. 36 shows a screen showing a back of a trucker jacket, where an option for post-wash bleach is turned on and the intensity the shade has been adjusted to 0.08. The coloration of the trucker jacket is adjusted in real time, showing the how the back of the jacket will appear after manufacture.

Figure 37:
FIG. 37 shows a screen showing back of a trucker jacket, where an option for post-wash bleach is turned on and the intensity the shade has been adjusted to 0.15.

FIG. 37 shows a screen showing a back of a trucker jacket, where an option for post-wash bleach is turned on and the intensity the shade has been adjusted to 0.15. The coloration of the trucker jacket is adjusted in real time, showing the how the back of the jacket will appear after manufacture.

Figure 38:
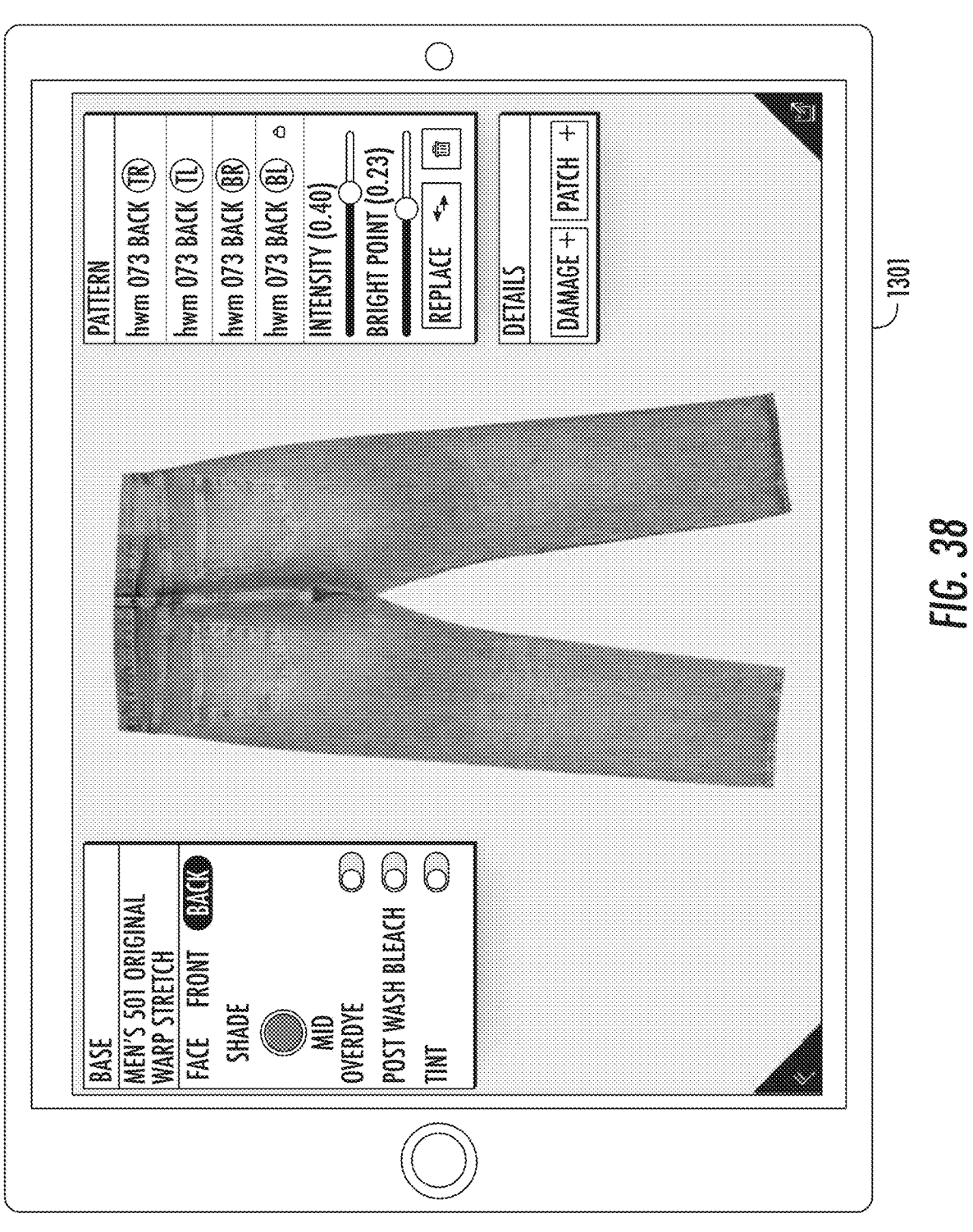
FIG. 38 shows a screen showing back of a pair of jeans where patterns hwm 073 back TR, hwm 073 back TL, hwm 073 back BR, and hwm 073 back BL have been applied.

FIG. 38 shows a screen showing back of a pair of jeans where patterns hwm 073 back TR, hwm 073 back TL, hwm 073 back BR, and hwm 073 back BL have been applied. A selected intensity is 0.40 and bright point is 0.23. The coloration of the jeans and patterns are adjusted and applied in real time, showing the how the back of the jeans will appear after manufacture.

Figure 39:
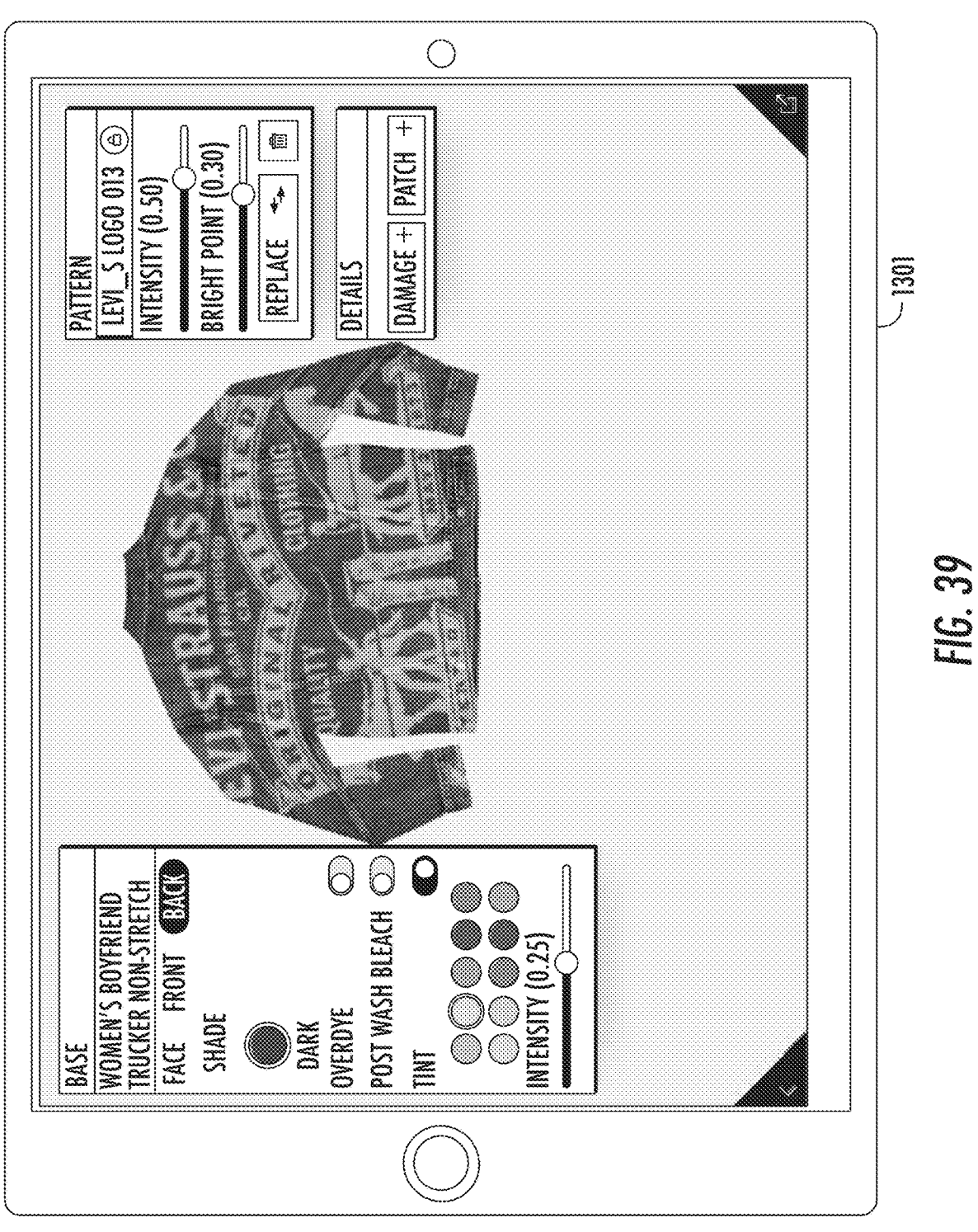
FIG. 39 shows a screen showing back of a trucker jacket, where a pattern LEVI_S LOGO 013 has been applied.

FIG. 39 shows a screen showing back of a trucker jacket, where a pattern LEVI_S LOGO 013 has been applied. A selected intensity is 0.50 and bright point is 0.30. A tint option is turned on, and a particular tint shade is selected (e.g., indicated by a circle around a shade circle) with an intensity of 0.25. The coloration of the jacket and pattern are adjusted and applied in real time, showing the how the back of the jacket will appear after manufacture.

Figure 40:
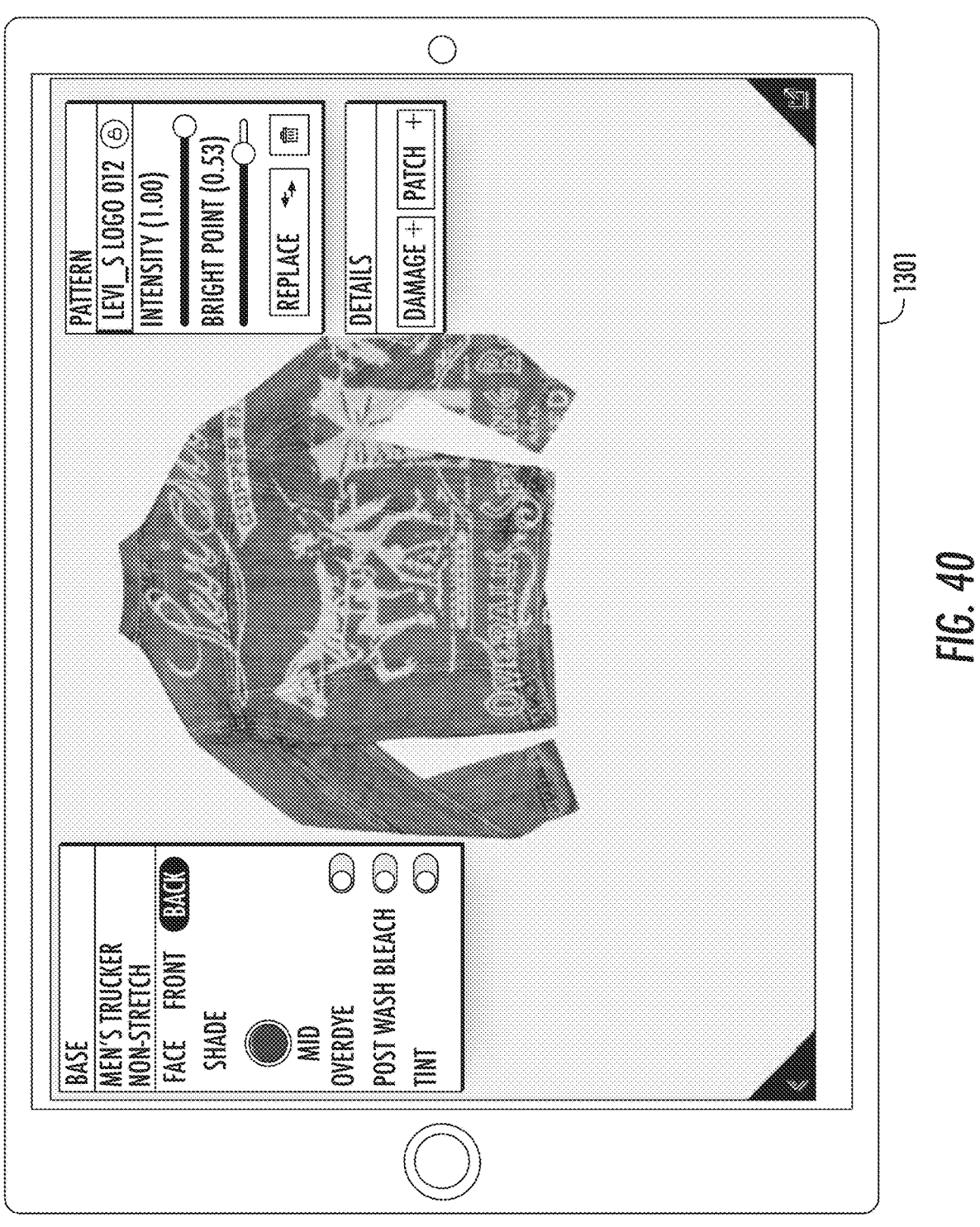
FIG. 40 shows a screen showing back of a trucker jacket, where a pattern LEVI_S LOGO 012 has been applied.

FIG. 40 shows a screen showing back of a trucker jacket, where a pattern LEVI_S LOGO 012 has been applied. A selected intensity is 1.00 and bright point is 0.53. The coloration of the jacket and pattern are adjusted and applied in real time, showing the how the back of the jacket will appear after manufacture.

Figure 41:
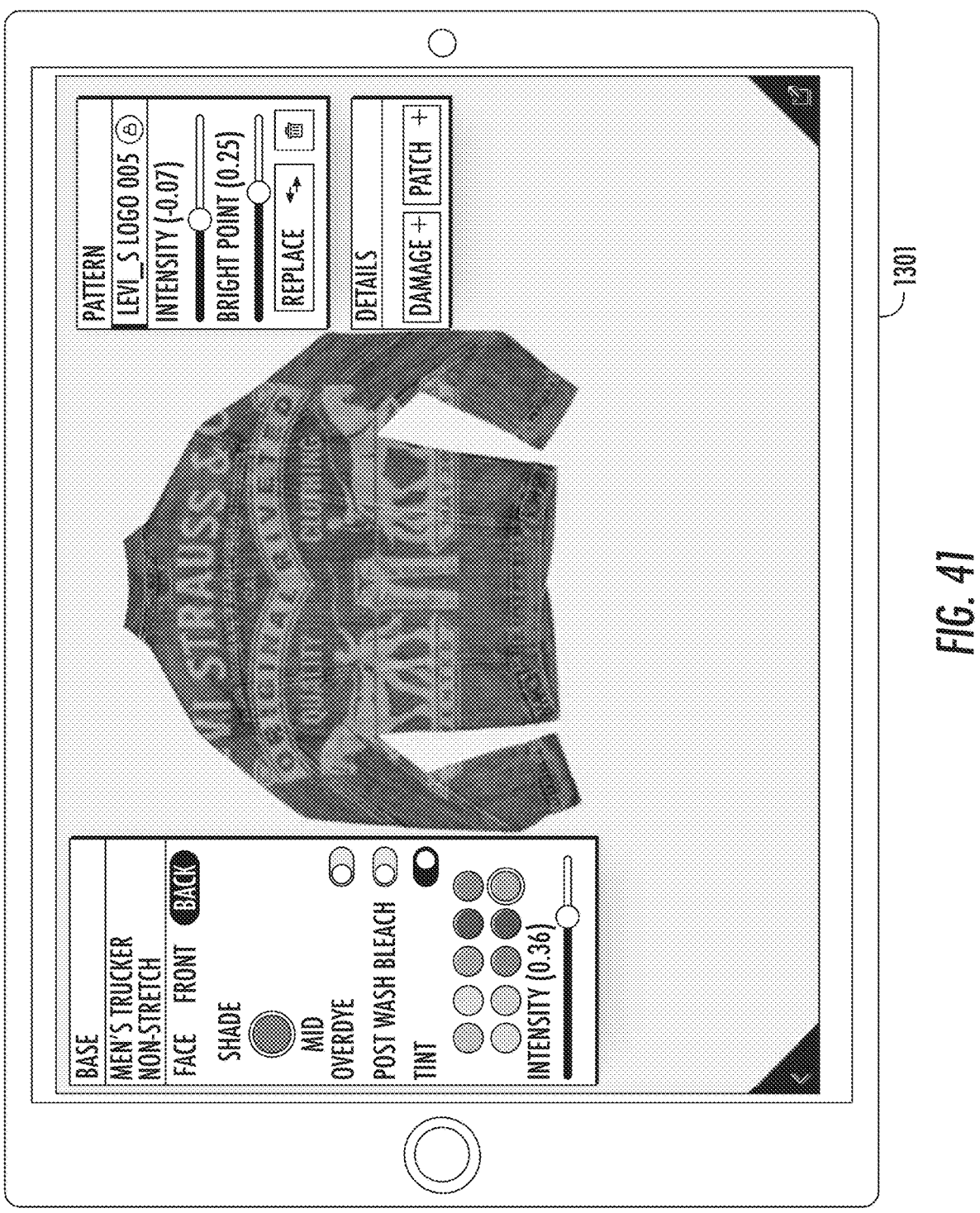
FIG. 41 shows a screen showing back of a trucker jacket, where a pattern LEVI_S LOGO 005 has been applied.

FIG. 41 shows a screen showing back of a trucker jacket, where a pattern LEVI_S LOGO 005 has been applied. A selected intensity is –0.07 and bright point is 0.25. A tint option is turned on, and a particular tint shade is selected (e.g., indicated by a circle around a shade circle) with an intensity of 0.36. The coloration of the jacket and pattern are adjusted and applied in real time, showing the how the back of the jacket will appear after manufacture.

Figure 42:
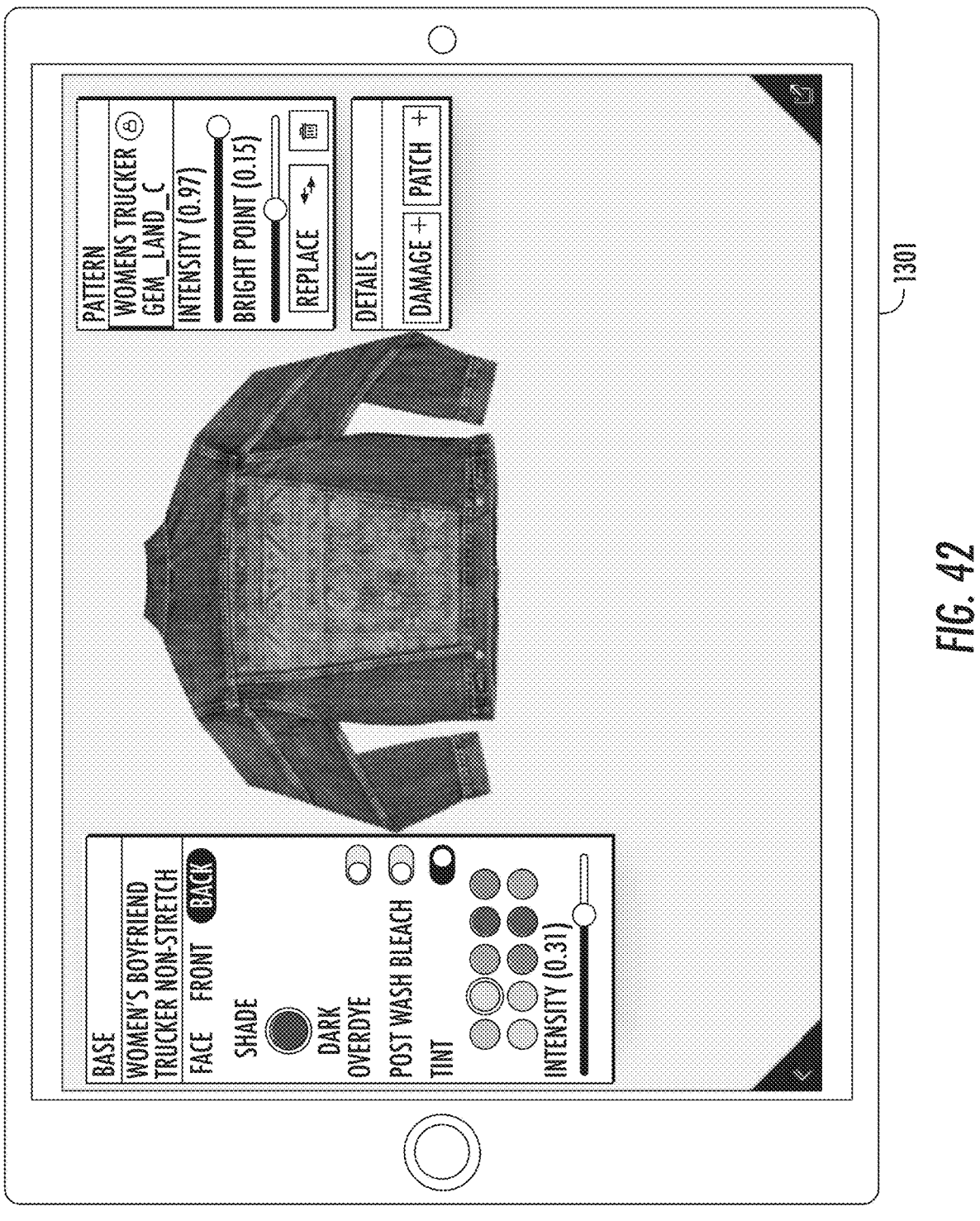
FIG. 42 shows a screen showing back of a trucker jacket, where a pattern Women's Trucker GEM_LAND_C has been applied.

FIG. 42 shows a screen showing back of a trucker jacket, where a pattern Women's Trucker GEM_LAND_C has been applied. A selected intensity is 0.97 and bright point is 0.15. A tint option is turned on, and a particular tint shade is selected (e.g., indicated by a circle around a shade circle) with an intensity of 0.31. The coloration of the jacket and pattern are adjusted and applied in real time, showing the how the back of the jacket will appear after manufacture.

Figure 43:
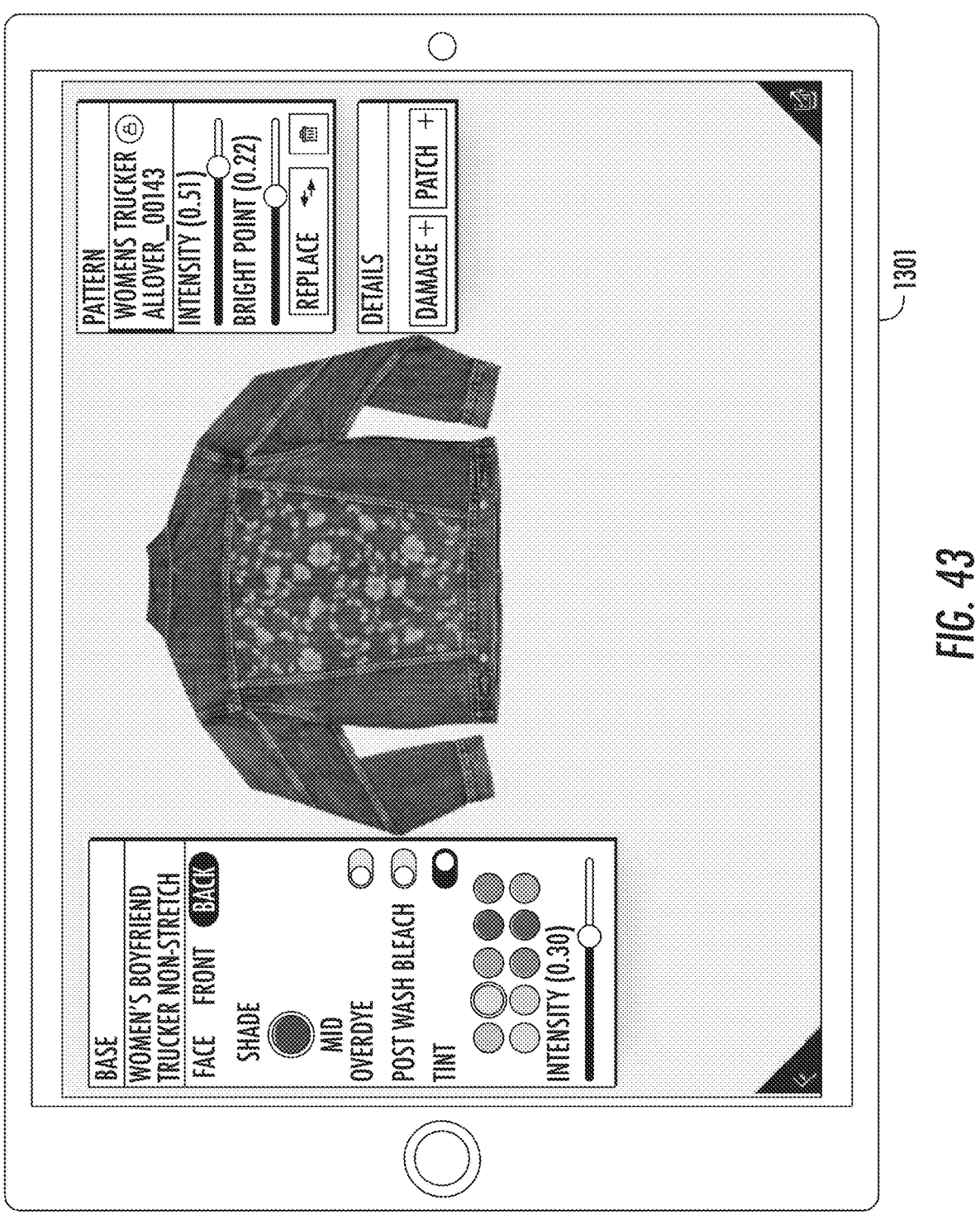
FIG. 43 shows a screen showing back of a trucker jacket, where a pattern Women's Trucker ALLOVER_00143 has been applied.

FIG. 43 shows a screen showing back of a trucker jacket, where a pattern Women's Trucker ALLOVER_00143 has been applied. A selected intensity is 0.51 and bright point is 0.22. A tint option is turned on, and a particular tint shade is selected (e.g., indicated by a circle around a shade circle) with an intensity of 0.30. The coloration of the jacket and pattern are adjusted and applied in real time, showing the how the back of the jacket will appear after manufacture.

Figure 44:
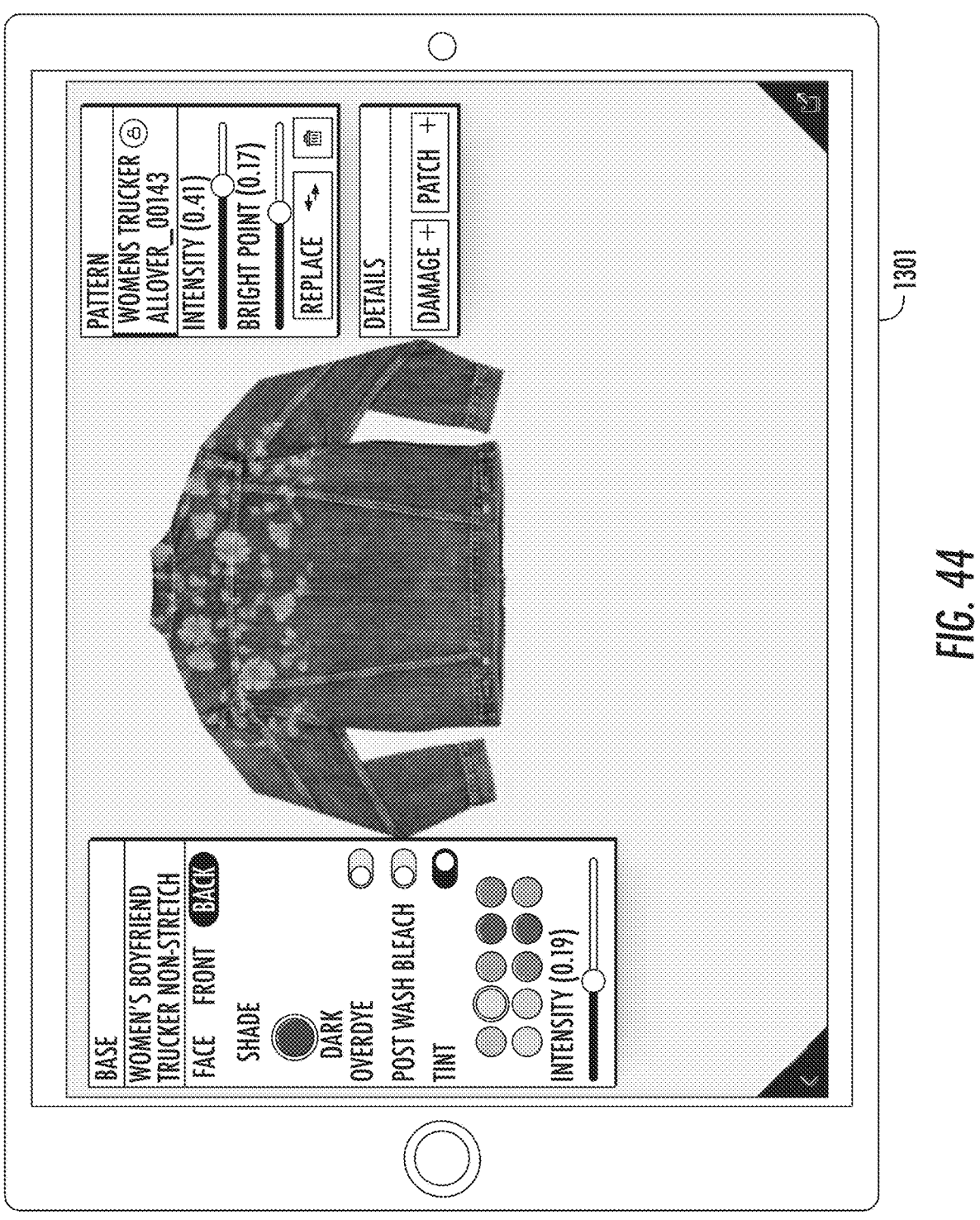
FIG. 44 shows a screen showing back of a trucker jacket, where a pattern Women's Trucker ALLOVER_00143 has been applied.

FIG. 44 shows a screen showing back of a trucker jacket, where a pattern Women's Trucker ALLOVER_00143 has been applied. A selected intensity is 0.41 and bright point is 0.17. A tint option is turned on, and a particular tint shade is selected (e.g., indicated by a circle around a shade circle) with an intensity of 0.19. The coloration of the jacket and pattern are adjusted and applied in real time, showing the how the back of the jacket will appear after manufacture.

Some additional features of the consumer digital brief tool include patches. Patch images are processed in a similar way as damages (discussed elsewhere), where the image is overlaid onto the base garment, rather than processed like a laser file. Overlaid design features include: damages, patches, hem treatments. As shown above, Levi's logos can be added as "laser patches." These images are processed in a similar way as laser patterns, but they are not wear patterns. These images are of logos, shapes, textures, or any artistic design that does create the look of natural worn denim.

The tools also allow further wet processing including tinting, overdye and post-wash bleach. Overdye is similar to tint, but a heavier effect. Tint is subtle while overdye allows a user to change the color more dramatically. For post-wash bleach, the garment can be slightly bleached during the post-wash. This functionality allows the user to lighten the image in order to visualize this effect.

A brief description of the FIGS. 28-44 follows. FIG. 28: Menu showing men's and women's bottoms and tops. FIG. 29: Selected women's shows bottoms and truckers menu items on left. FIG. 30: "laser patches" menu (1/2). FIG. 31: "laser patches" menu (2/2). FIG. 32: Overdye intensity—0. FIG. 33: Overdye intensity—half. FIG. 34: Overdye intensity—full. FIG. 35: Post-wash bleach—0. FIG. 36: Post-wash bleach—half. FIG. 37: Post-wash bleach—full. FIG. 38: Garment "flipped" to the back. Back seat image and appropriate pattern selection. FIG. 39: Example of denim top with laser patch, and tint (1/5). FIG. 40: Example of denim top with laser patch. FIG. 41: Example of denim top with laser patch, and tint (2/5). FIG. 42: Example of denim top with laser patch, and tint (3/5). FIG. 43: Example of denim top with laser patch, and tint (4/5). FIG. 44: Example of denim top with laser patch, and tint (5/5).

In an implementation, each of the garment preview images shown in FIGS. 38-44 is a three-dimensional garment preview image. The three-dimensional garment preview images allow a user to see how the customized garments will appear on their body. In an implementation, the garment preview images and the three-dimensional garment preview images are rotatable. Thus, a user can see how the garment will appear on their body from more than one point of view (e.g., angles of rotation), such as two or more points of view.

Figure 45:
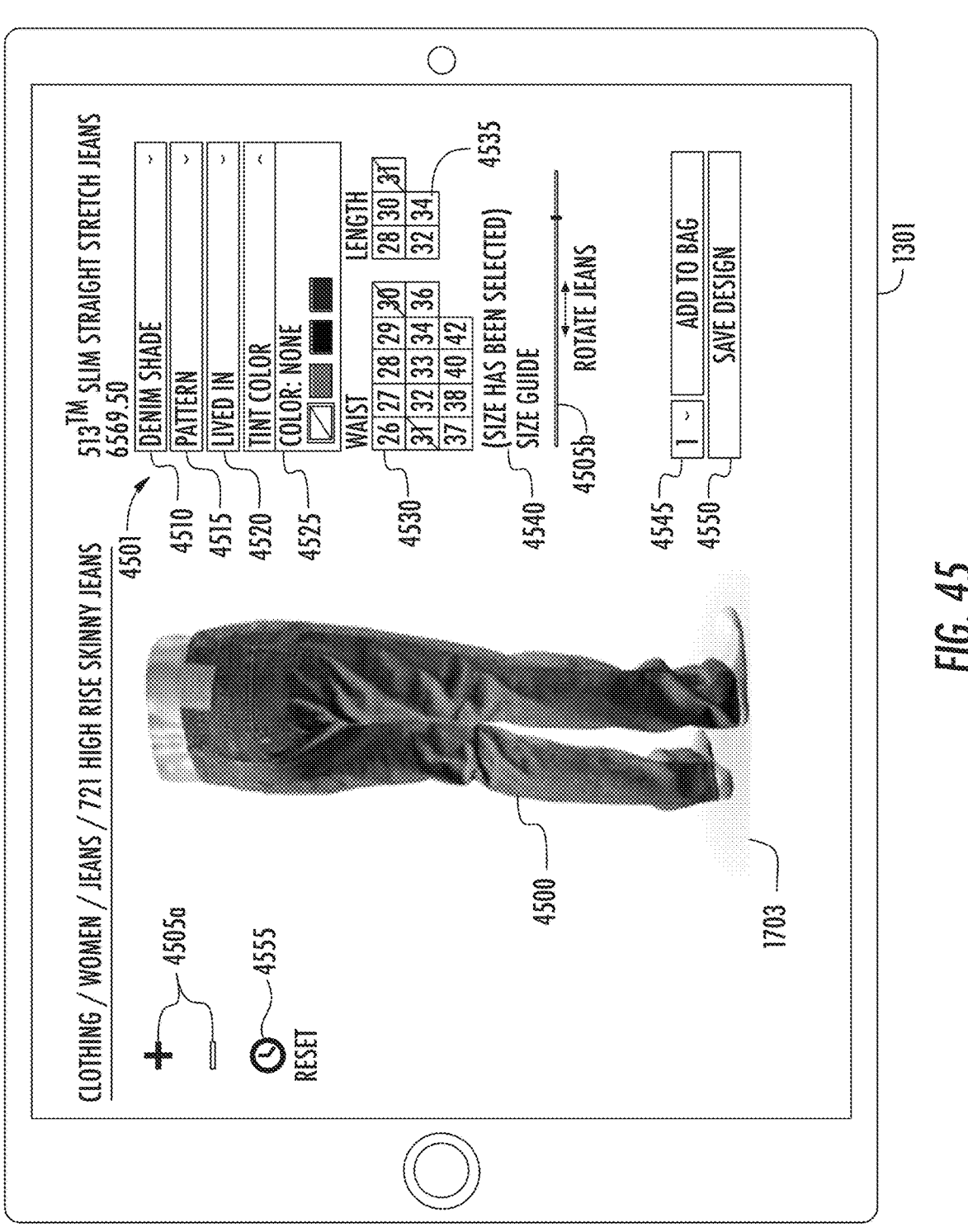
FIGS. 45-46 show a computer system 1301 or 1401 (e.g., a smartphone or tablet computer) operating the preview tool 1703, the digital brief tool 1803, or the consumer digital brief tool, or any combination of these tools.
Figure 46:
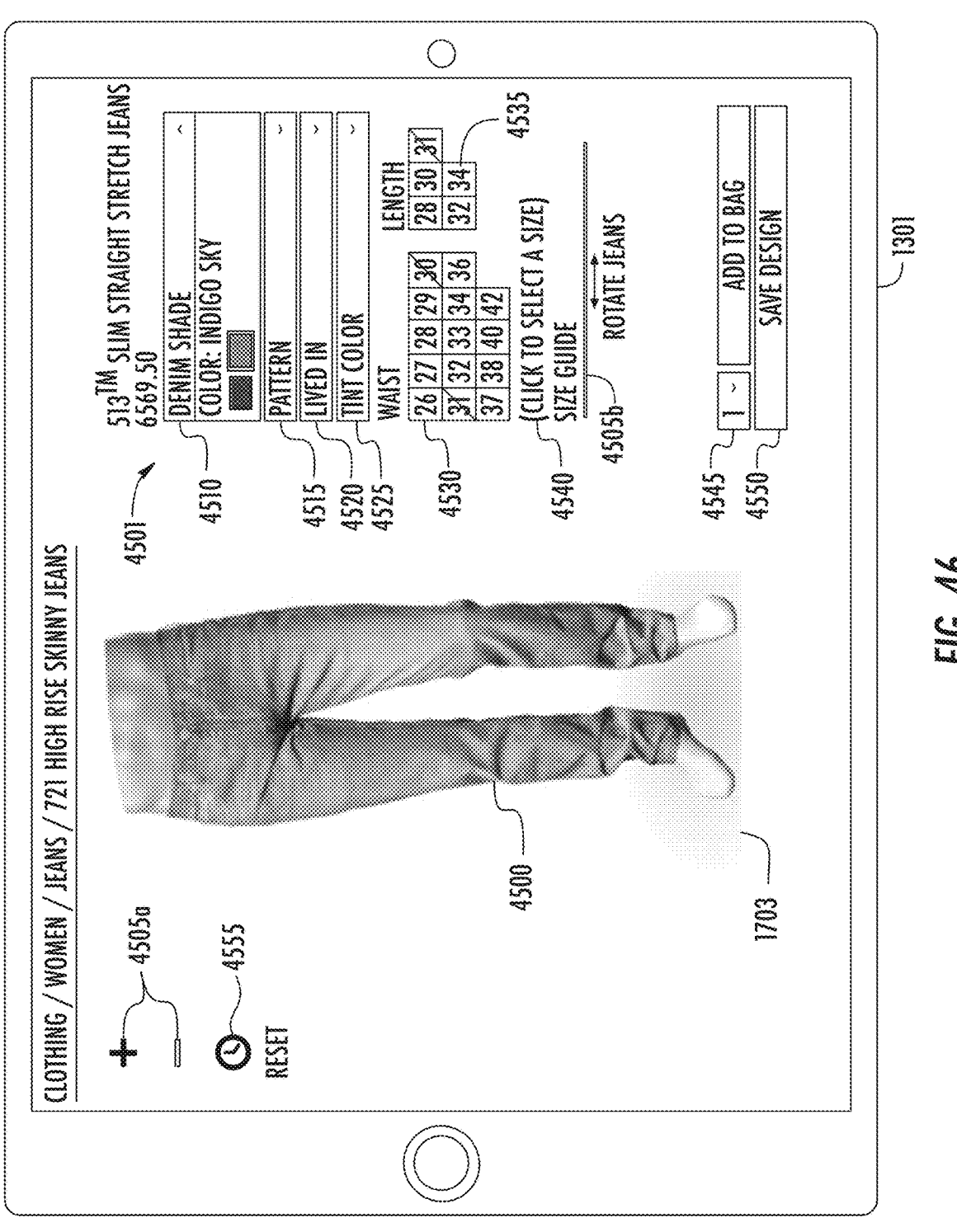

FIGS. 45-46 show a computer system 1301 or 1401 (e.g., a smartphone or tablet computer) operating the preview tool 1703, the digital brief tool 1803, or the consumer digital brief tool, or any combination of these tools. The computer system is adapted to store and run software modules code for any combination of software tools described above, such as the software tools shown in FIGS. 16-18. These software tools are sometimes referred to as software modules or simply modules. The following describes modules, user interface screens, and other parts of the preview tool. However, any of the following description may apply to the digital brief tool or the consumer digital brief tool.

In an implementation, the preview tool includes a menu 4501 for order options. Order options that are displayed in the menu can be selected by a customer, via a touch screen of the computer system, a human interaction device, or others.

In an implementation, the preview tool displays a garment preview image 4500 of the preview tool in combinations with the order options displayed in the menu 4501. The garment preview image may be a base garment image having user selected options. The order options may include options provided by the preset design tool 805, the custom design tool 815, and the sizing tool 810. The preview tool interface can be adapted to update the base garment image as various order options are selected from the menu. While the base garment image is jeans, the image can be any selected garment, bag, or others.

The garment preview image shows the garment in a three-dimensional view. The three-dimensional view of the garment preview image shows how a garment that is being customized using the preview tool will appear on the user's body when the user purchases and wears the garment. In an implementation, the garment preview image in the three-dimension view is a pare of jeans, but can be any garment, such as a jacket, shorts, shirts, hat, backpack, scarf, hat, or other garment items.

In an implementation, the garment preview image is rotatable and each of the rotated view of the garment preview image is a three-dimensional image. The multiple three-dimensional view of the preview garment image allows the user to see how the garment will appear on the user's body from multiple viewpoints (e.g., multiple angles of rotation).

All customization applied to a garment that are selected by a user are shown in the three-dimensional view of the garment preview image. Thus, a user will not only see how the garment will appear on their body in three-dimension, a user will all see how each customization will appear on the garment in three-dimensions on the user's body. A two-dimensional, in comparison with a three-dimensional view, does not allow a user to see how a garment will actually appear on their body and does not allow a user to see how their selected customizations of a garment will appear on their body.

In an implementation, the preview tool includes one or more options for displaying the front and back of the base garment image or for smooth rotation of the garment image for viewing from more view than front and back. The front and back view of jeans 4500 are both shown in a three-dimensional view so that a user can see how the jeans will appear on their body in three-dimensions. The smooth rotated views are also three-dimensional view. The preview tool may allow the garment to be "clicked" on using a human interface device to rotate the garment between front and back. In an implementation, the preview tool includes a front select button ("+") and a back select button ("−") 4505a that allow for selection of a front view of a garment and a back view of a garment. In an implementation, the preview tool includes a slider bar 4505b or another tool that allows for rotations of a garment displayed by the preview tool. The slider tool may allow for a number of angled views to be displayed, such as more than two views (e.g., front and back). For example, the slider tool may allow for 360 rotated views (e.g., a view for every angle of rotation from 0 degrees to 360 degrees).

In an implementation, the preview tool includes a user selectable option 4510 for selecting the shade of denim of the base template jeans. The use selectable option may include a dropdown menu. There can be a number of base templates colors to choose from where the base templates have different colors of denim. The colors may include indigo and indigo sky (as indicated on the preview tool shown in FIG. 46), dark dark (e.g., which may be referred to as ddark), dark, medium, light, or other shades. The dropdown menu for denim shape selection may include a graphical indicator (e.g., rectangle around the indigo sky option) that indicates the particular shade of denim is selected. Each preview image (e.g., jeans) for the different shades is shown as three-dimensional images. Each preview image includes three-dimensional shadowing for the three dimensional images so that the user can see how the garments look in realistic lighted scene. The shadows rotate with the preview image as the preview image is rotated. Thus, a user can see shadowing on the jeans in three-dimension from multiple viewpoints (e.g., multiple angles of rotation).

The preview tool includes a user selectable option 4515 for selecting a finishing pattern that may be formed on a garment, such as jeans. The user selectable option 4515 may include a dropdown menu. A finishing pattern may be applied by the laser of the mobile finishing center 10 to jeans, such as jeans shown in the base template jeans image in the preview tool 1703.

Figure 47:
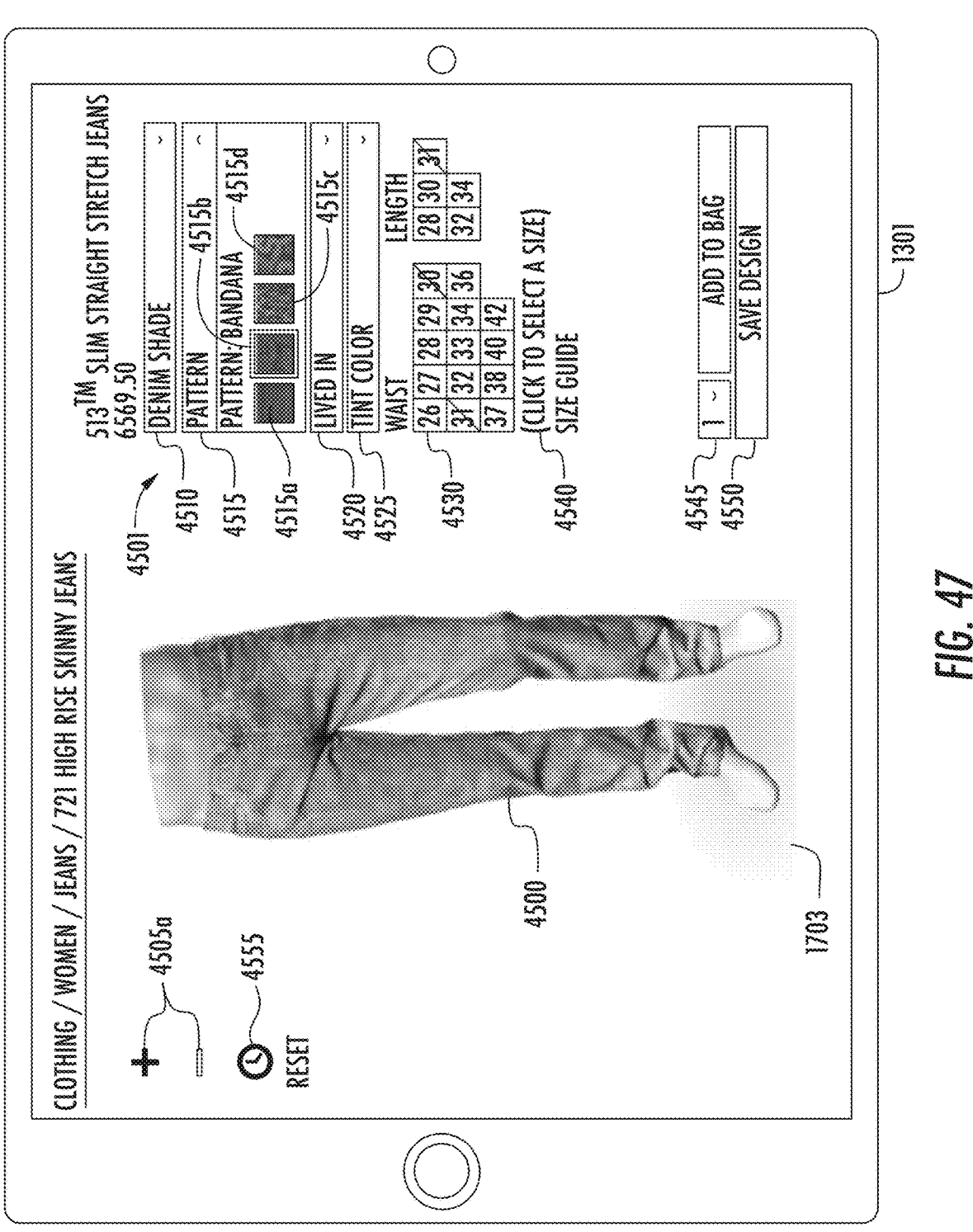
FIG. 47 shows a dropdown menu in a dropdown state when the user-selectable option is selected for the finishing patterns.

FIG. 47 shows a dropdown menu in a dropdown state when the user-selectable option 4515 is selected for the finishing patterns. The finishing patterns may include a wear pattern 4515a that is associated with a naturally worn pattern that forms on a garment from extended wear, washing, or both. The finishing patterns may include one or more fanciful design patterns 4515*b*-4515*d*. The design patterns may include a paisley type pattern, also referred to as a bandana pattern 4515*b*. FIG. 47 shows the dropdown menu with the finishing pattern 4515*b* selected and shows the bandana pattern on the previewed jeans. The finishing patterns on the preview images of the garment (e.g., jeans) are shown in three-dimensions. The finishing pattern rotate with the preview image as the preview image is rotated. Thus, a user can see the finishing pattern on the jeans in three-dimension from multiple viewpoints (e.g., multiple angles of rotation).

Figure 48:
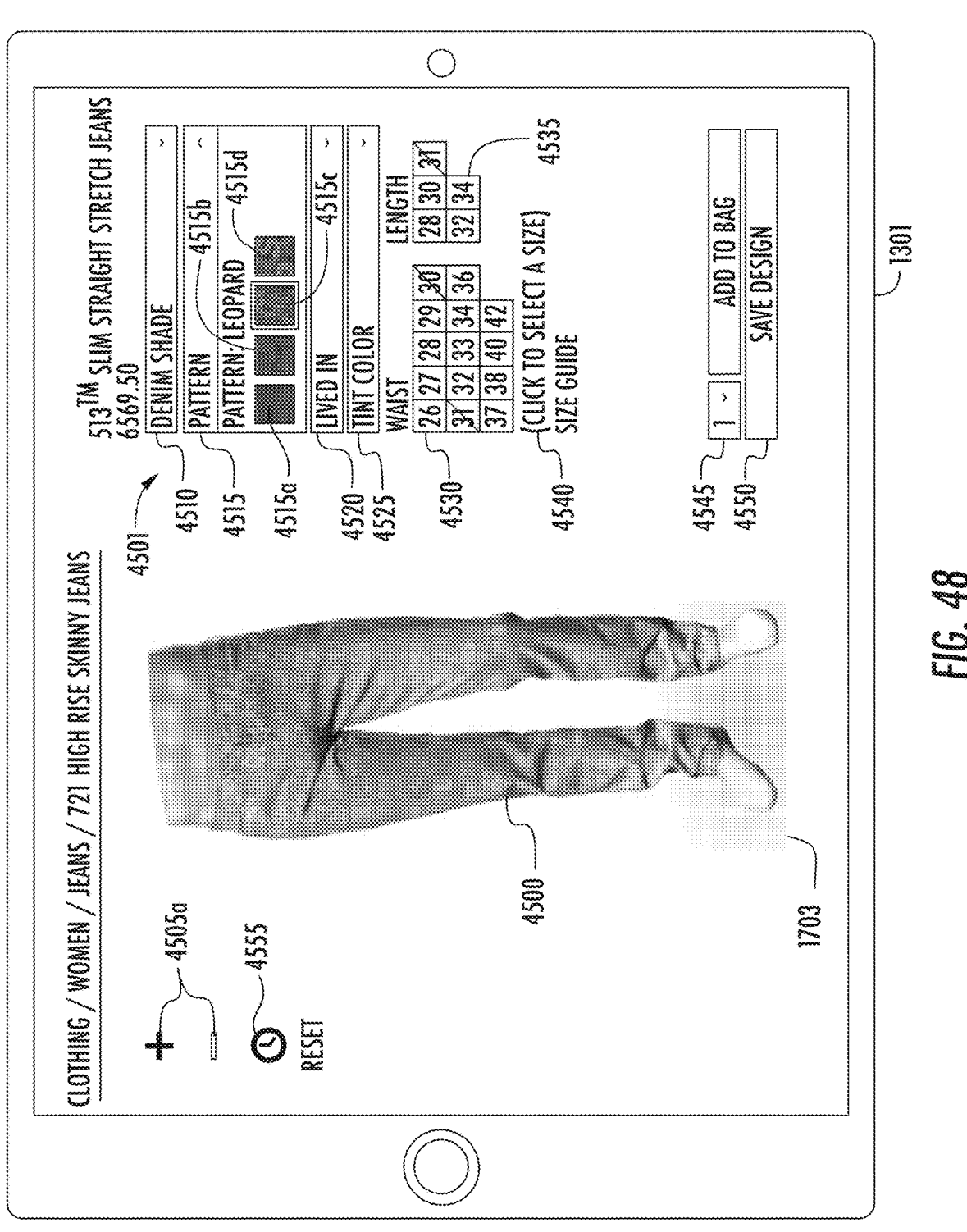
FIG. 48 shows the dropdown menu with the finishing pattern selected and shows the leopard print pattern on the previewed jeans.

The design pattern may include an animal print 4515*c*, such as a leopard pattern. FIG. 48 shows the dropdown menu with the finishing pattern 4515*c* selected and shows the leopard print pattern on the previewed jeans.

The design pattern may include letters, numbers, or other symbols 4515*d* or graphics combined letters, numbers, or other symbols. The dropdown menu for a finishing pattern may include a graphical indicator (e.g., rectangle around the bandana pattern) that indicates the particular finishing pattern is selected.

Additionally, the preview tool may include additional options that allow a user to make other adjustments such, changing an intensity of the pattern, changing a bright point of the pattern, or adding damage to the design. The jeans images and laser finishing patterns may be stored in one or more formatted files in one or more mobile devices operating the digital design tool 800

For any changes the user makes, the user will see changes in the preview image in real-time. The preview shows the user how the jeans will appear after it is manufactured by the mobile finishing center. By selecting different combinations of laser files and base jeans templates, a customer can create numerous different jeans designs and have these manufactured by the mobile finishing center.

Figure 49:
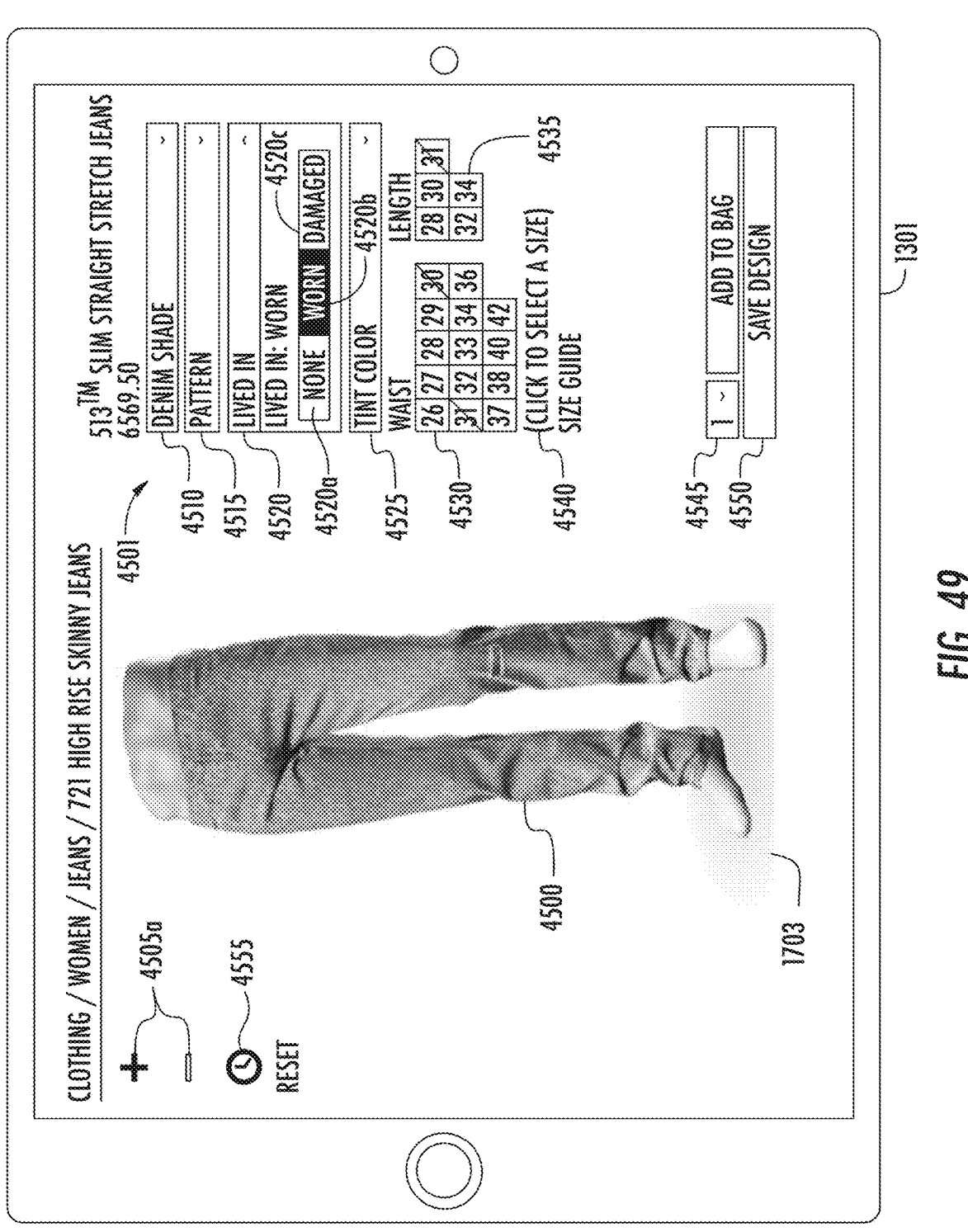
FIG. 49 shows a dropdown menu in a dropdown state when the user-selectable option is selected for the lived in option.

FIG. 49 shows a dropdown menu in a dropdown state when the user-selectable option 4520 is selected for the lived in option. The lived in option includes an option for no lived in appearance 4520*a*, a worn lived in appearance 4520*b*, and a damaged appearance 4520*c*. The preview of the base garment jeans in FIG. 49 is shown with the worn image. Worn includes normal wear, such as on the knee portion of jeans where a person might kneel down and wear their jeans at the knee. Worn may also include locations on a garment where the warp fibers are worn through, but the weft fibers are not worn through. In an implementation, the worn pattern can be moved to various locations on the jeans for example by dragging and dropping with a human input device.

Figure 50:
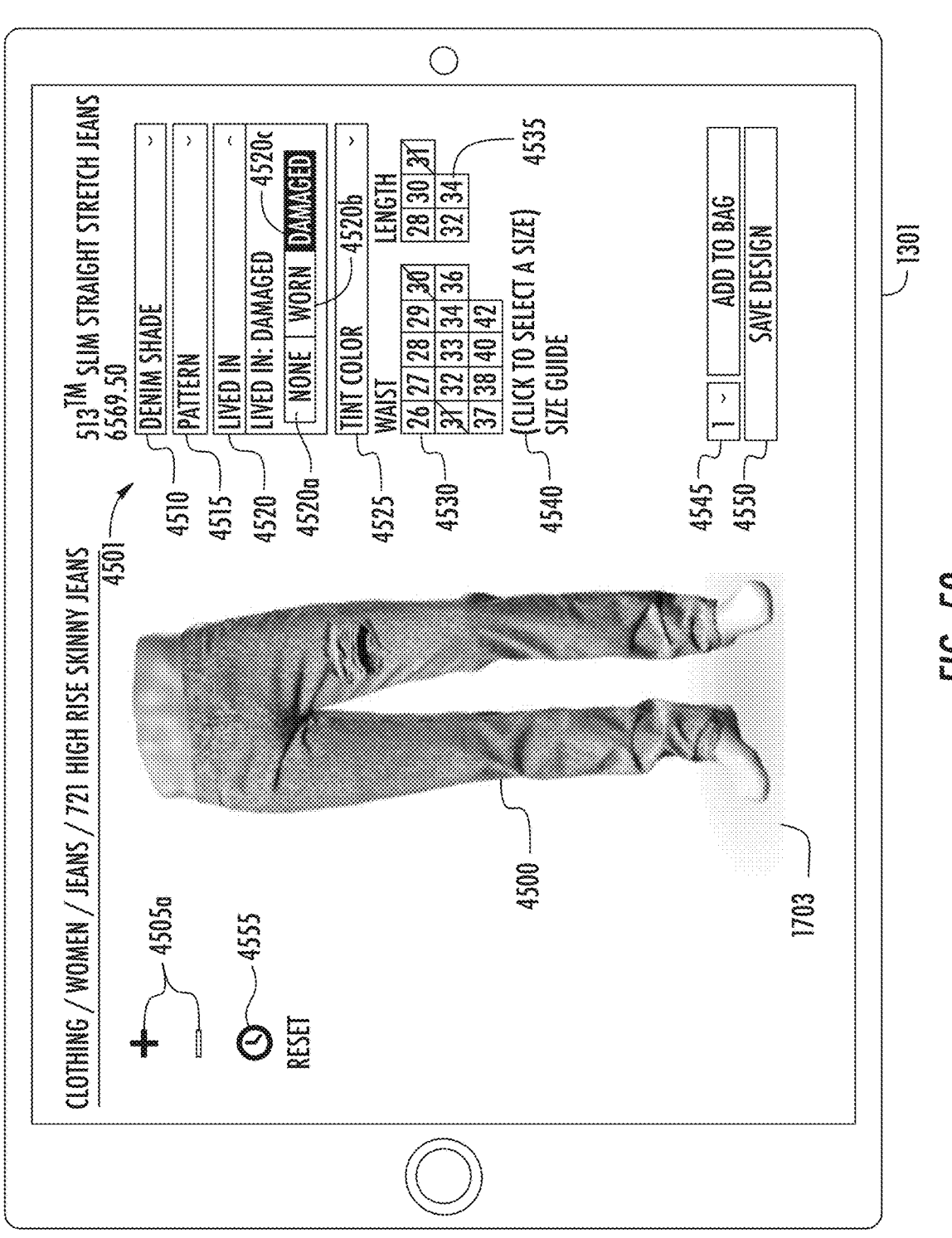
FIG. 50 shows the dropdown menu for the lived in option with the damaged appearance selected.

FIG. 50 shows the dropdown menu for the lived in option with the damaged appearance 4520*c* selected. The preview of the base garment jeans in FIG. 50 is shown with the damage image. Damage may include locations on a garment where the warp and a portion of the weft fibers are both worn through. In an implementation, the damage pattern can be moved to various locations on the jeans for example by dragging and dropping with a human input device.

The wear and damage patterns on the preview images of the garment (e.g., jeans) are shown in three-dimensions. The wear and damage patterns rotate with the preview image as the preview image is rotated. Thus, a user can see the wear and damage patterns on the jeans in three-dimension from multiple viewpoints (e.g., multiple angles of rotation).

Figure 51:
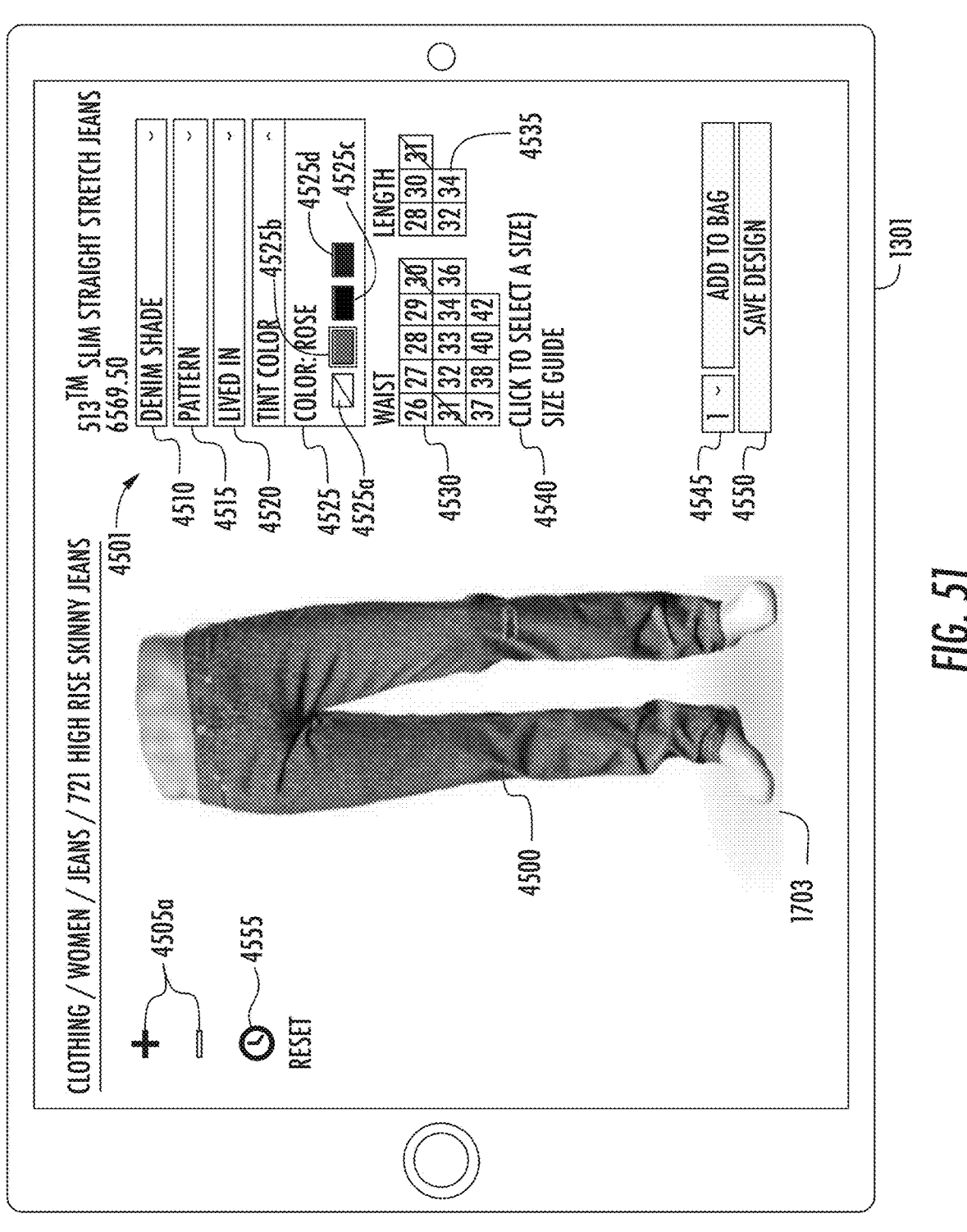
FIG. 51 shows a dropdown menu in a dropdown state when the user-selectable option is selected for a tint color option selected.
Figure 52:
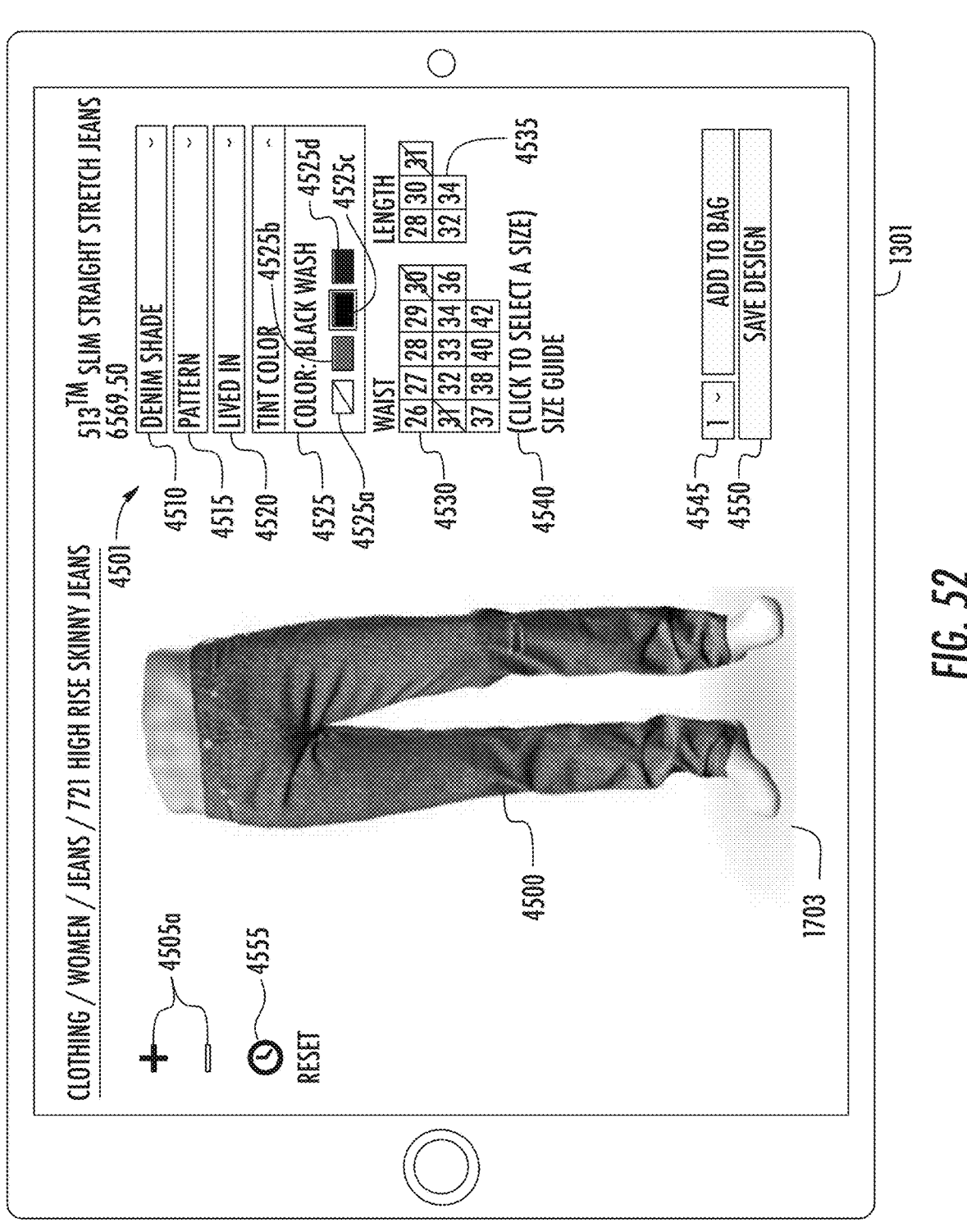
FIG. 52 shows the preview of the base garment jeans with the black tint color selected.
Figure 53:
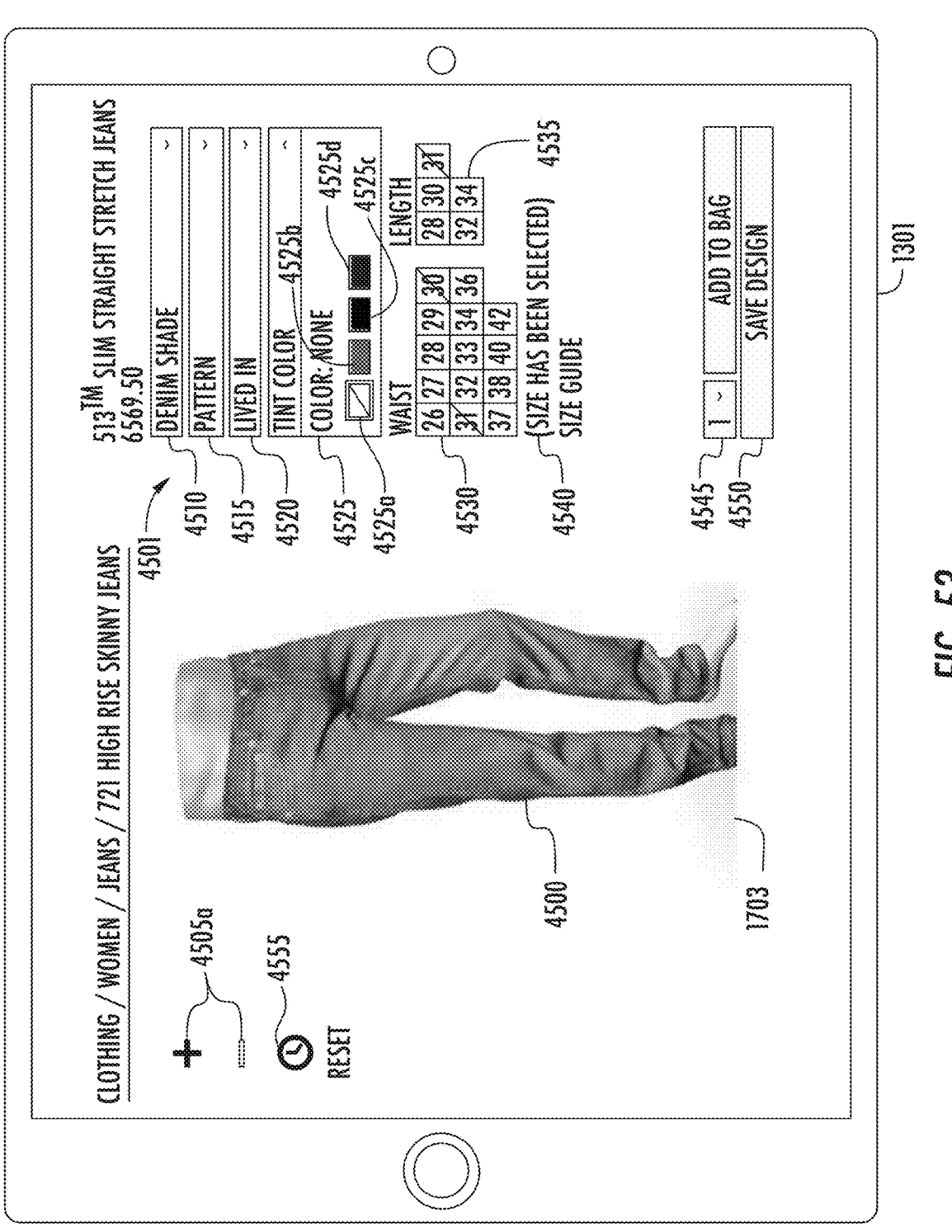
FIG. 53 shows the preview of the base garment jeans with no tint color selected.

FIG. 51 shows a dropdown menu in a dropdown state when the user-selectable option 4525 is selected for a tint color option selected. The tint color option includes options for a number of tints that may be applied to a garment. In the particular implementation shown in FIG. 51, the tint color options include no tint 4525*a*, a rose tint color 4525*b*, a black tint color 4525*c*, and a bright blue tint color 4525*d*. The preview of the base garment jeans in FIG. 51 is shown with the rose tint color 4525*b* selected. FIG. 52 shows the preview of the base garment jeans with the black tint color 4525*c* selected. FIG. 53 shows the preview of the base garment jeans with no tint color 4525*a* selected. FIG. 45 shows a preview of the base garment jeans with no tint color from a back view of the jeans.

The tint of the garment in the preview image is shown in three-dimensions. The tint rotates with the preview image as the preview image is rotated. Thus, a user can see the tint on the jeans in three-dimension from multiple viewpoints (e.g., multiple angles of rotation).

In an implementation, preview tool 1703 includes a menu 4530 for waist sizes for jeans from which a user may select a desired waist size. The preview tool may also include a menu 4535 for inseam length from which a user may select a desired inseam length. The waist and inseam sizes are shown in inches but may be displayed in other units, such as centimeters. The preview tool may include one or more other menus for jeans sizes, such as hip size.

For other types of garments, one menu for garment sizes might be provided by the preview tool. For example, for a shirt, one size menu might be provided by the preview tool where the sizes include extra small, small, medium, large, extra-large, xx-large, xxx-large, other sizes, or any combination of these sizes. In another implementation, three or more menus may be provided for sizing, such as three size menus for shirts that may include menu options for torso length, chest circumference, and sleeve length. The preview tool may also display and provide a link 4540 to another user interface page that includes information for interpreting size information, such as linking torso length, chest circumference, and sleeve length to sizes, such as extra small, small, medium, large, extra-large, xx-large, xxx-large, other sizes.

In an implementation, the preview tool displays a user-selectable screen button 4545 that may be selected to add a specified garment (e.g., jeans with a light indigo color, a bandana pattern, damage, rose tint, 34 inch waist, and 32 inch inseam) to an electronic shopping bag, sometimes referred to an electronic shopping cart. When the specified garment is added to the electronic shipping bag, the digital design tool 800 may display another interface, such as the digital design tool interface 835 (e.g., shown in FIG. 56), where a purchase of the specified garment may be made. After the purchase is made, the garment may be laser processed in the mobile finishing center and the finished garment deliver to a purchaser is a relatively short time, such as half of an hour to three hours (e.g., about the length of a sports match).

In an implementation, the preview tool displays a user-selectable screen button 4550 that may be selected to save a specified garment design. The specified garment design may be stored in the mobile device operating the digital design tool 800, may be stored remotely in a data center, may be stored on a user's own device (e.g., mobile device), or another device. The specified garment design may be recalled from memory to modify the design or to purchase the garment having the design.

In an implementation, the preview tool displays a user-selectable screen button 4555 that may be selected to reset of a specified garment design. A reset design may include a base denim shade, no pattern, no lived in options, no tint, and no size information. After a design is reset, the preview tool displays an essentially blank pallet from which a new design may be specified using the preview tool.

Figure 54:
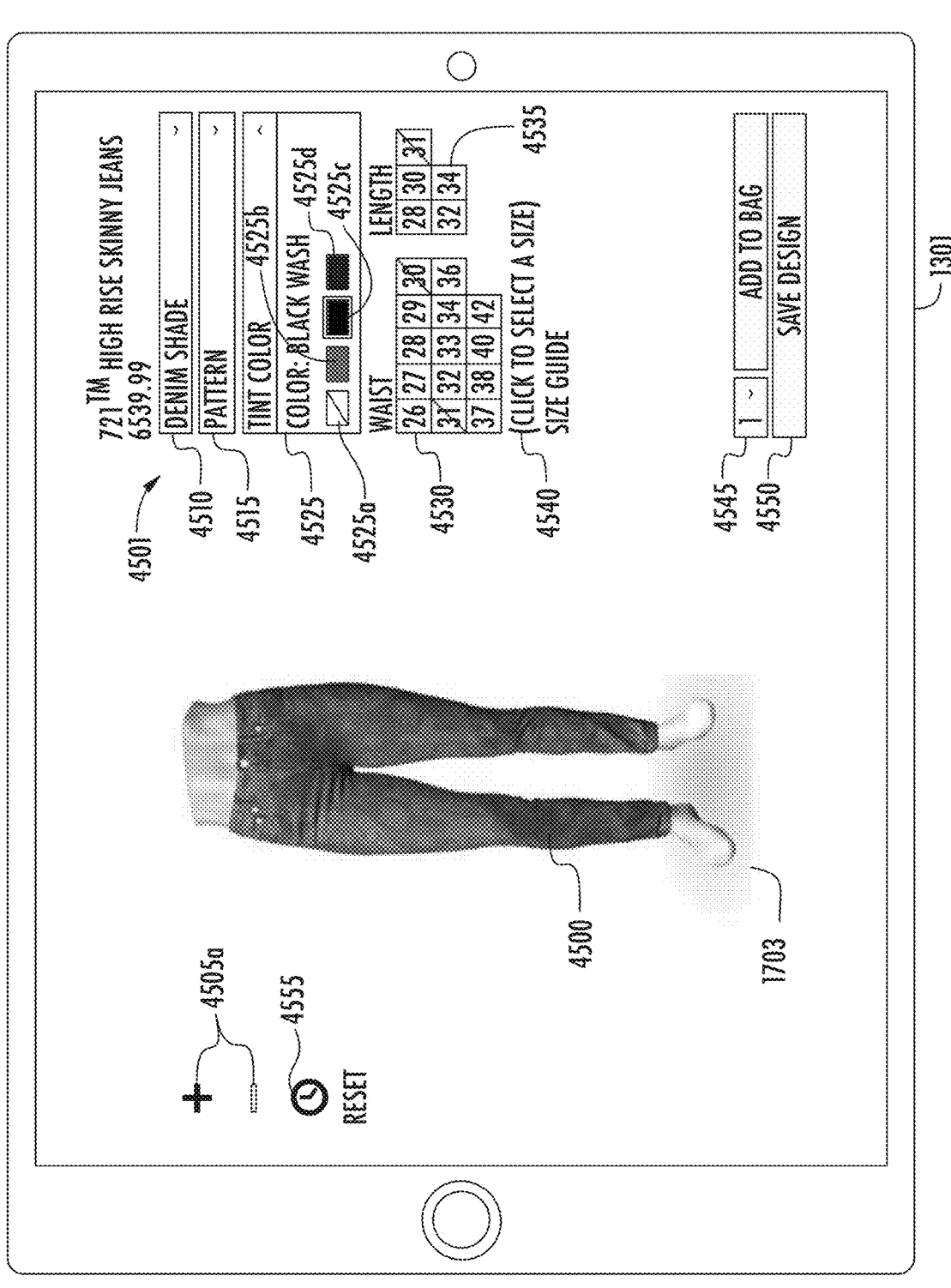
FIGS. 54-55 show the preview tool with a base garment jeans having a number of options selected, such as the bandana finishing pattern and a black tint.
Figure 55:
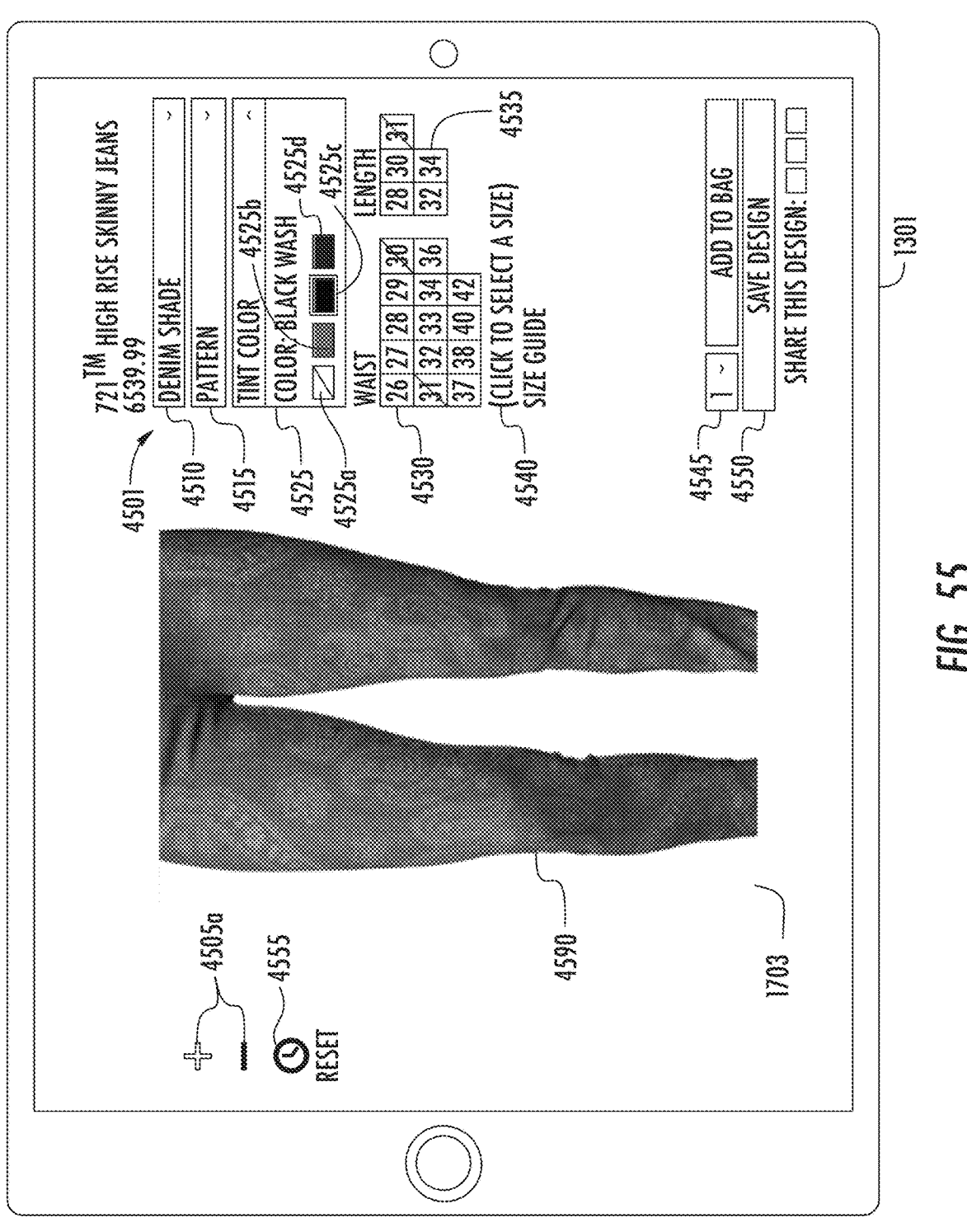

FIGS. 54-55 show the preview tool 1703 with a base garment jeans 4590 having a number of options selected, such as the bandana finishing pattern and a black tint. The base garment jeans 4590 in FIG. 54 is shown having a first magnification and the base garment jeans 4590 is shown in FIG. 55 having a second magnification. The second magnification is larger than the first magnification. In an implementation, screen buttons 4505a are adapted for increasing and decreasing the magnification of the displayed base garment jean. The "+" screen button may increase the magnification (e.g., enlarge) of the displayed image of the base garment jeans when selected and the "—" button may decrease the magnification (e.g., shrink) of the displayed image of the base garment jeans when selected. The pattern and tint are magnified and shrunk as the base garment jeans are magnified and shrunk.

The preview images for the garment in the normal size and in the magnified view are both shown in three-dimensions. The normal sized garment and the magnified garment rotate with the preview image as the preview image is rotated. Thus, a user can see the jeans in three-dimension from multiple view points (e.g., multiple angles of rotation) in multiple magnifications.

Figure 56:
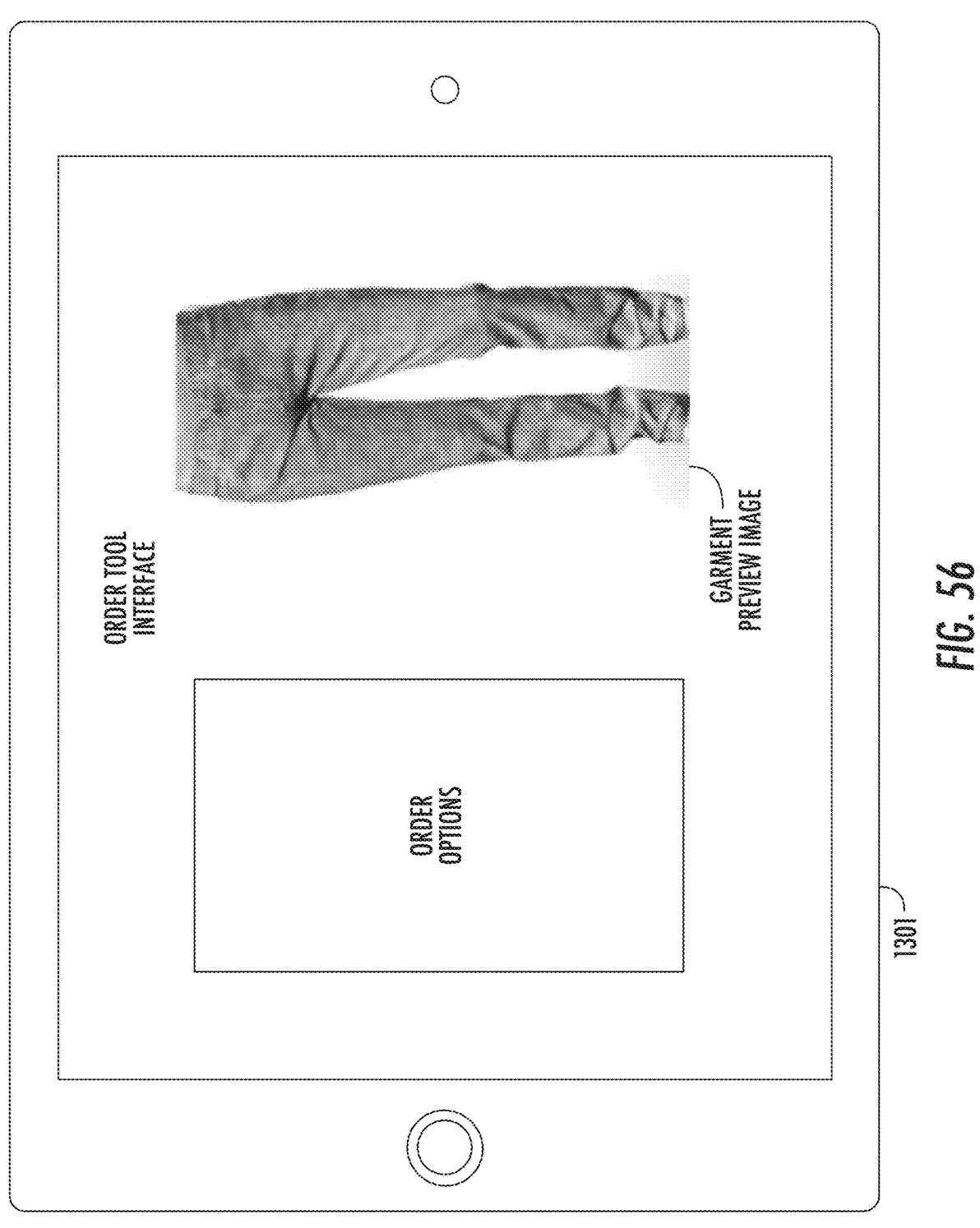
FIG. 56 shows the computer system with an order tool interface of the preview tool displayed on the display of the computer system, in an implementation.

FIG. 56 shows the computer system 1301 or 1401 with an order tool interface of the preview tool 1703 displayed on the display of the computer system, in an implementation. The order tool interface may be displayed after the add to bag option 4545 is selected on the preview tool 1703. The order interface tool includes a menu for order options.

In an implementation, the order tool interface displays a garment image 4590 having the options selected using the preview tool. The order tool interface can be adapted to update the garment image as various order options are selected from the garment. For example, if a preset design with whiskers is selected from the order options, then the garment image (e.g., jeans) is displayed with whiskers. If the present design for whiskers is deselected, then the garment preview image is displayed without whiskers. While the garment preview image is jeans, the image can be any selected garment, bag, or others.

The preview image of the ordered garment is shown in three-dimensions so that the user can see how the customized garment that they are about to purchase will appear on their body in three-dimensions. In an implementation, the preview image of the garment in three-dimension is rotatable on the order tool interface (e.g., curser click on the garment and drag for rotation) and each rotated view of the garment can be a three-dimensional view of the garment.

Figure 57:
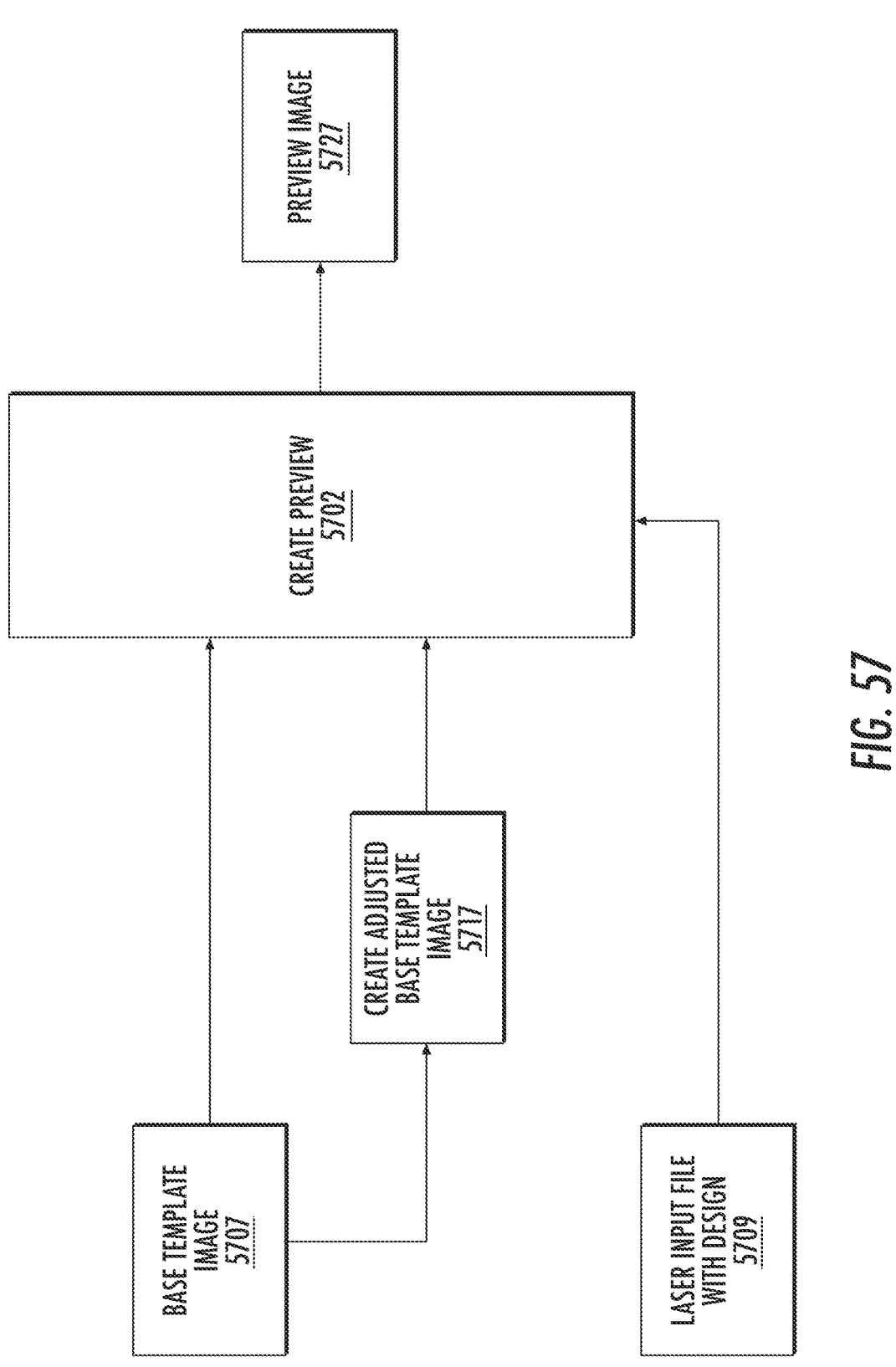
FIG. 57 shows a block diagram of a technique of generating a preview of a laser-finishing pattern on a garment, such as jeans.

FIG. 57 shows a block diagram of a technique of generating a preview of a laser-finishing pattern on a garment, such as jeans. Inputs to a create preview image process 5702 include a base template image 5707 and laser input file 5709. The base template image is used to create an adjusted base template image 5717, which is also input to the create preview image process. These create preview image process uses these three inputs to create a preview image 5727, which can be displayed on a computer screen for the user.

The adjusted base template image is created from the base template image by adjusting its hue, saturation, or lightness, or any combination of these. Compared to the original base template image, the adjusted base template image will appear washed out or bleached. In other words, the adjusted base template image will appear as if the garment in the base template image were fully bleached or lasered. The adjusted base template image can be an HLS adjustment layer as discussed above.

For a specific implementation of a laser, a specification for the laser input file is that each pixel is represented by an 8-bit binary value, which represents grayscale value in a range from 0 to 255. A 0 black prints the highest intensity (i.e., creates the most change and will be the lightest possible pixel) and a 255 white does not print at all (i.e., creates the least change or will be the darkest possible pixel).

For a laser input file for this laser implementation, a reverse or negative image of the laser input file is input to the create preview image process. Based on the negative laser input file, to create each pixel in the preview image, the create preview image process will pass pixels of the base template image or the adjusted base template image, or a combination of these.

For the negative laser input file, a black pixel means the pixel (which was a white pixel in the original file) will not be lasered (which results in the original indigo color of the fabric). And a white pixel means the pixel (which was black in the original file) will be lasered at highest level (which results in the whitest color that can be achieved on the fabric). And for gray pixels between black and white, the result will be proportional to the value, somewhere between darkest and lightest colors.

Similarly, to create the preview image, based the negative laser input file, a pixel of a (1) base template image (e.g., unbleached) or (2) adjusted base template image (e.g., bleached) or (3) some mixture or combination of the base template image and adjusted base template image proportional to the grayscale value in the negative laser input file. For example, for a gray value in the negative laser input file, 60 percent of the base layer and 40 percent of the adjustment layer pass through to the preview image.

The above discussion described a laser input file conforming to one type of logic. However, in other implementations of a laser, the values in the laser input file can be the reverse or negative logic compared to that described above. As one of ordinary skill in the art would appreciate, the techniques described in this patent can be modified accordingly to work with negative or positive logic laser input files.

Figure 58:
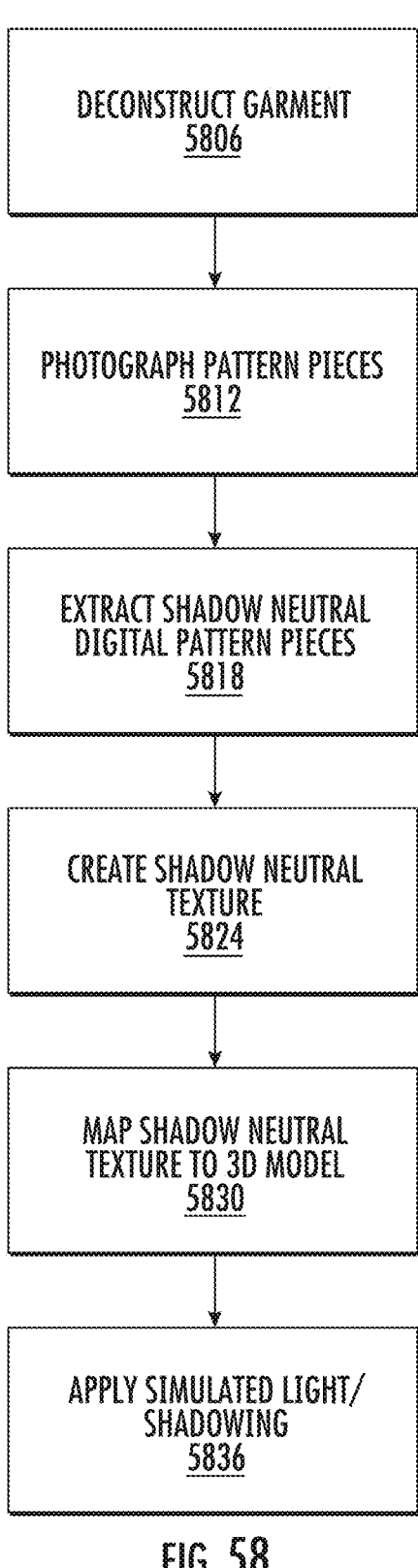
FIG. 58 shows an overall flow for creating a three-dimensional preview for an apparel product, such as a pair of jeans.
Figure 59C:
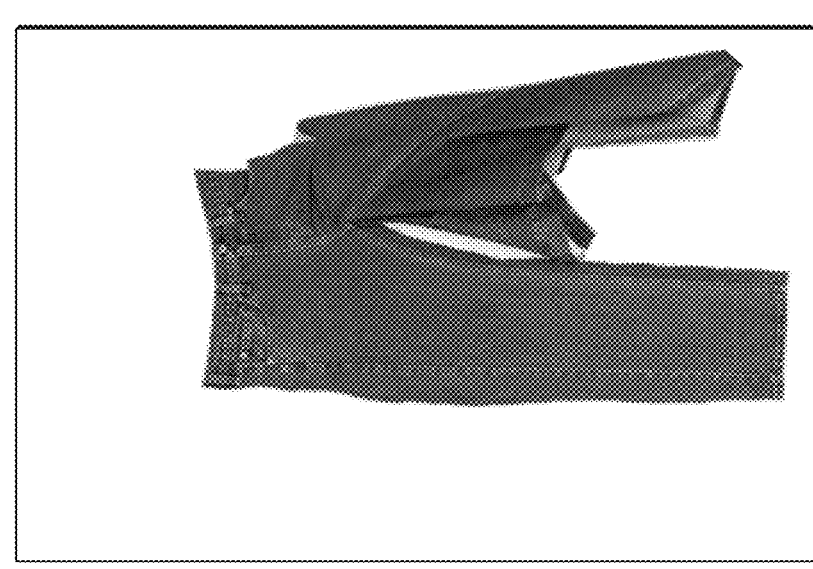
FIGS. 59A-59F show photographs of cutting a garment into pieces.
Figure 59B:
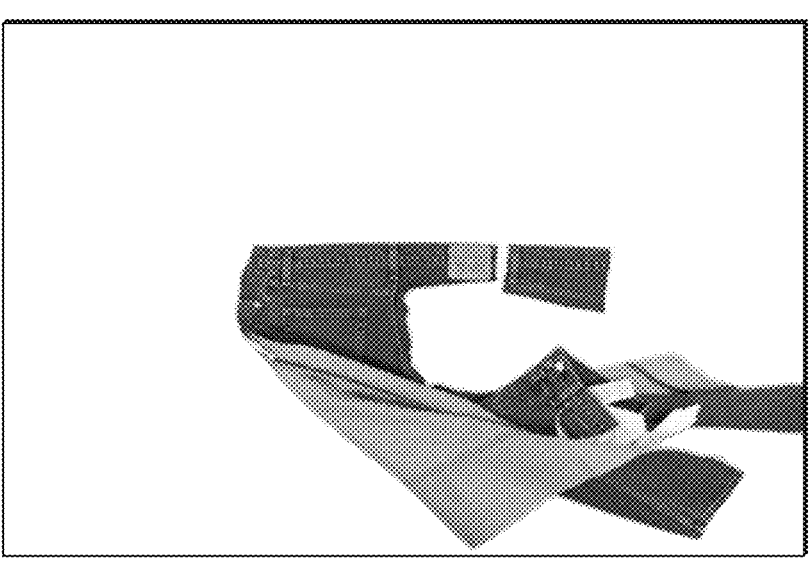
Figure 59A:
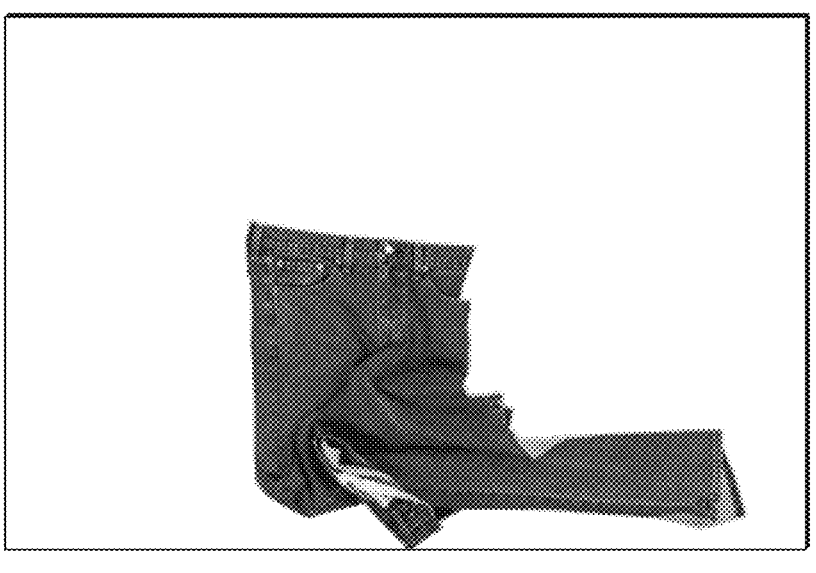
Figure 59F:
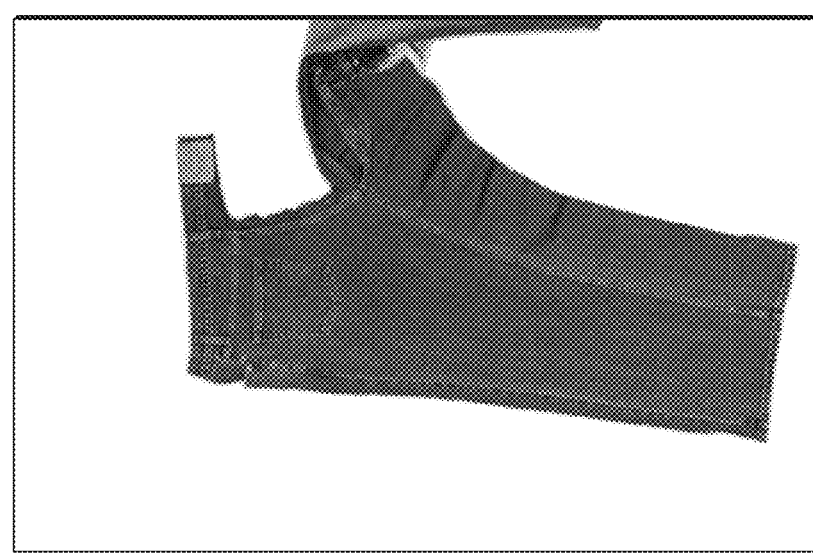
Figure 59E:
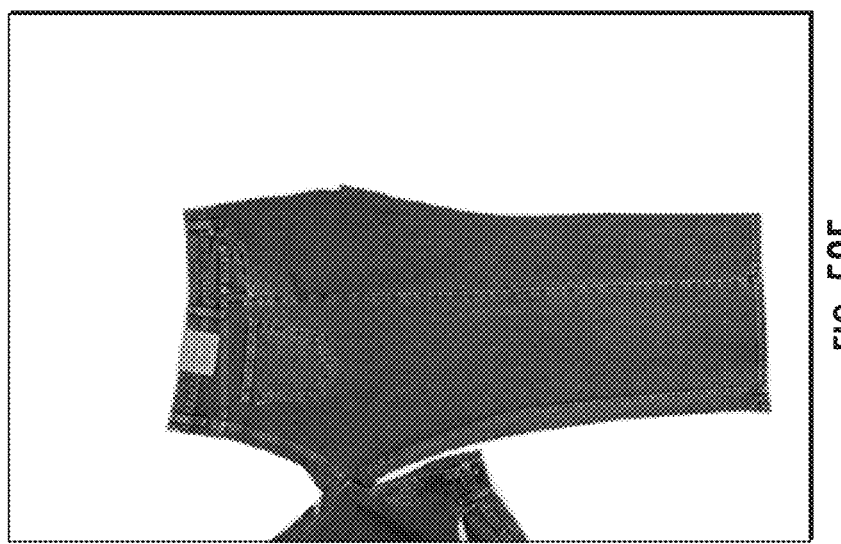
Figure 59D:
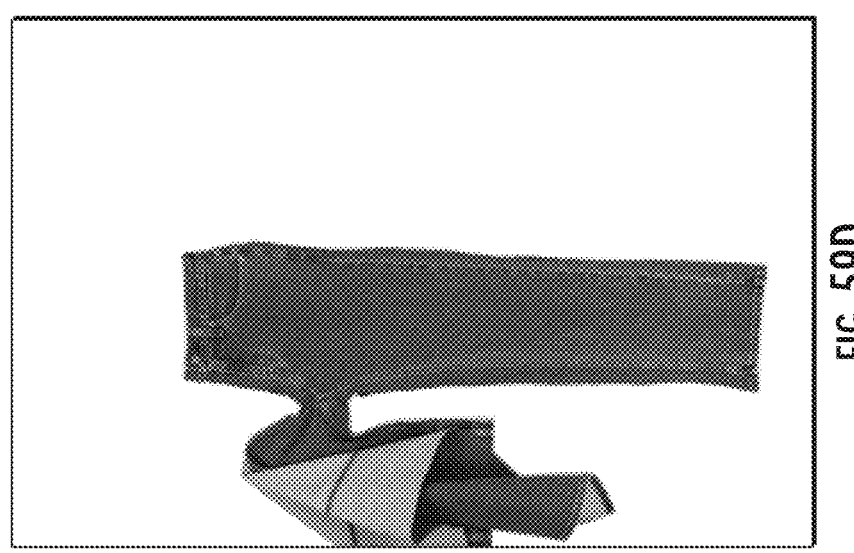

FIG. 58 shows an overall flow for creating a three-dimensional preview image for an apparel product, such as a pair of jeans. The three-dimensional preview images described above for use with preview tool 1703 and other tools are created and displayed according to the described flow, in an implementation. The flow includes:

1. A deconstruct garment step S806. A garment is cut into separate pieces so the pieces can be photographed flat. The shape of the cut pieces are specifically sized and selected for ensuring a high quality three-dimensional preview.
2. A photograph pattern pieces step S812. The pieces of the garment are photographed while flat on a surface. Compared to photographing the pieces while sewed together, where sections of the garment may be
3. An extract shadow neutral digital pattern pieces 5818.
4. A create shadow neutral texture pieces 5824.
5. A map shadow neutral texture to three-dimensional (3-D or 3D) model step S830.
6. An apply simulated light or shadowing, or both, step S836.

The following describes a specific implementation of deconstructing a garment 5806. FIGS. 59A-59F show photographs of cutting a garment into pieces. The photos are for a specific implementation where the garment is a pair or pants, and in particular, a pair of jeans. Not that the seams are not ripped or cut, but rather the cut pieces include the seams with thread. This ensures the three-dimensional preview will represent the seams properly. Also, the cut pieces do not necessarily correspond to the pattern panels used to contrast the garment. The cut pieces are cut into shapes that are appropriate for photographing flat and use in generating the three-dimensional preview.

The following describes a specific implementation of photograph pattern pieces 5812. A photograph of each deconstructed pattern pieces is taken. Each photograph can be stored in a digital file, such as a JPEG, high efficiency video coding (HVEC), or other image file format.

Figure 60:
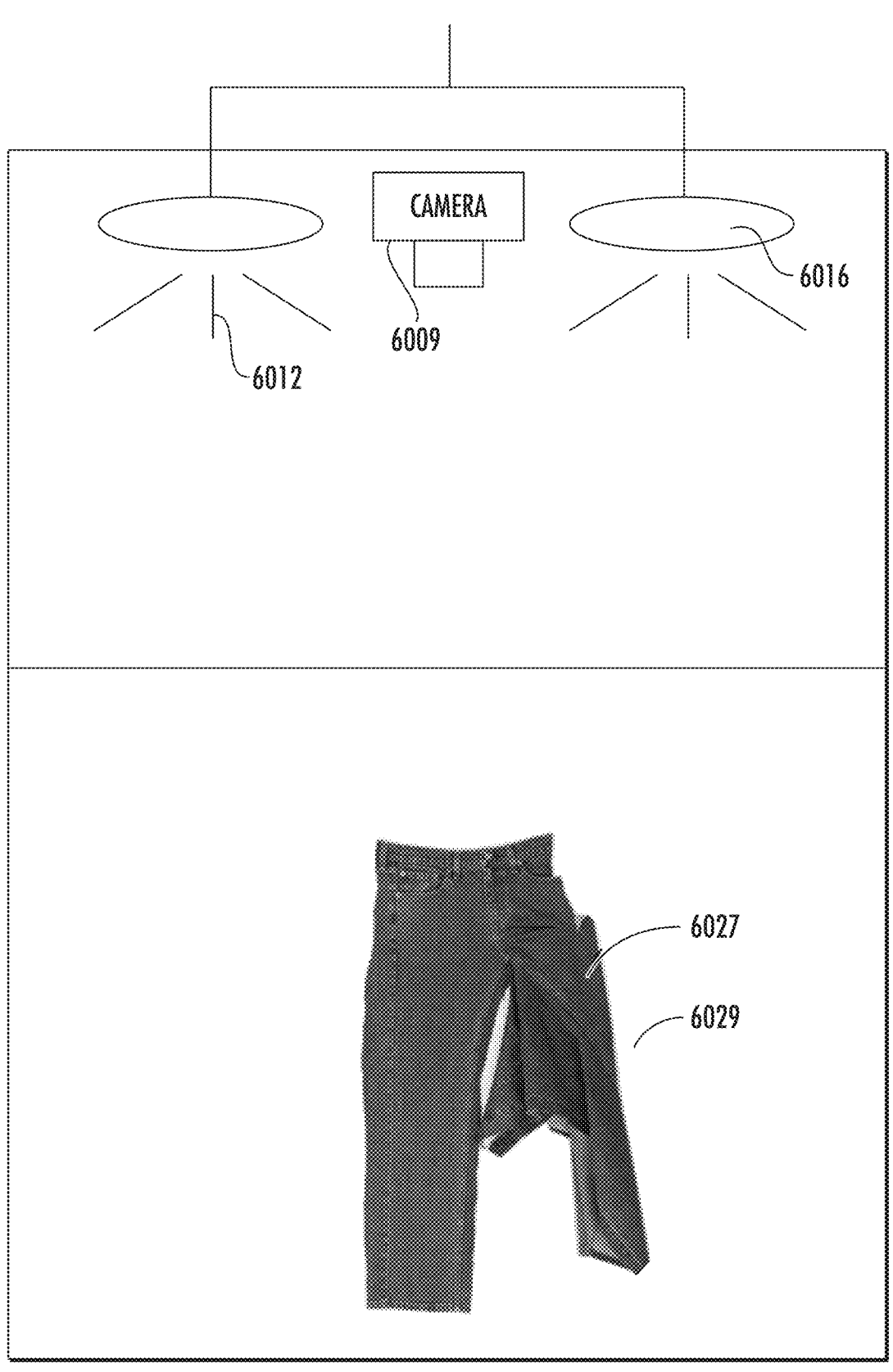
FIG. 60 shows a system for taking photographs of the garment pieces.

FIG. 60 shows a system for taking photographs of the garment pieces. The system includes a camera 6009 and lighting 6012 and 6016. Typically, the camera and lights are mounted or positioned against or near a wall or ceiling of a room, or on one side of room. A garment or garment pieces 6027 that are to be photographed are laid flat on a surface, facing the camera and lighting. In an implementation, the camera and lightning are positioned above a table or other work surface 6029, horizontally orientated, upon which the garment is placed.

Alternatively, the camera and lightning are positioned on a side, and the work surface is vertically orientated on another side facing the camera and lightning. The garment pieces that be attached, such as using glue, pins, or hook and loop fasteners, to the vertical work surface.

The room can be a light room or light box. The room and work surface are typically painted or colored a white color. For good or best results, the white color used should be consistently the same shade throughout the room. Then any white balance adjustment or correction made at the camera or digitally after the photographs are taken will be more precise.

The lights of the lightning are positioned laterally (e.g., distributed evenly along the same plane as the work surface, which can be referred as an X direction) to evenly illuminate the work surface. So, the garment will be evenly illuminated without noticeably or significantly brighter or darker areas or portions. The lightning is also positioned a distance above the work surface (which can be referred as a Y direction) to allow for more even illumination.

The lens of the camera is positioned above (in the Y direction) the lighting source, so that the camera does not cast a shadow on the work surface or garment (e.g., horizontally orientated). And the camera can be positioned in the X direction so that lights are arranged uniformly about the camera lens. For example, in FIG. 60, camera 6009 is between lights 6012 and 6016. Also the camera lens should be positioned directly over the garment (in the X direction) being photographed. This ensures the photographs taken will not be at an angle.

A specific example of extract shadow neutral digital pattern pieces 5818 follows. After the photographs are taken, each photograph is processed to extract neutral digital pattern pieces. In the extraction process, the background and shadowing, if any, is removed.

Figure 61A:
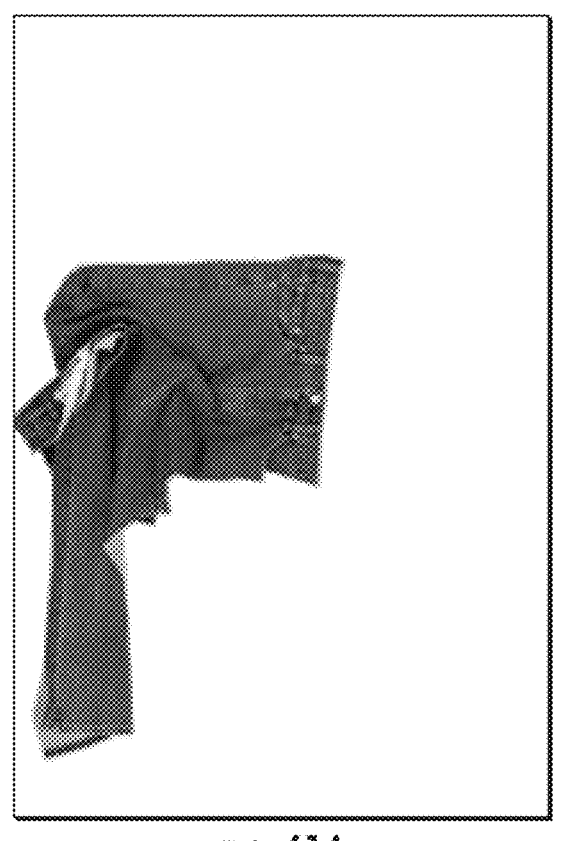
FIGS. 61A-61K show photographs of cut garment pieces and corresponding extracted neutral digital pattern pieces.
Figure 61B:
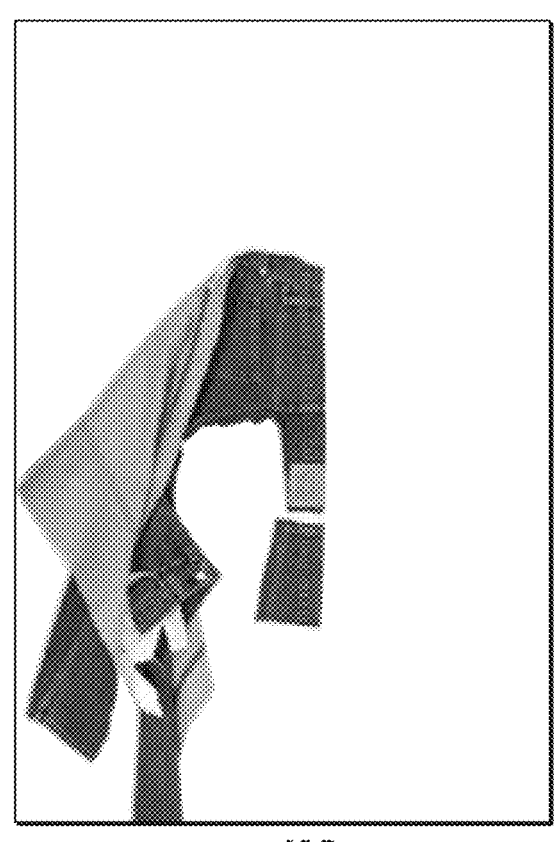
Figure 61C:

As examples, FIGS. 61A-61B show photographs of a waistband pieces on the work surface, and FIG. 88C shows the extracted neutral digital pattern piece for the waistband. The physical waistband may be cut into multiple pieces, and the photographs of the separate pieces can be digitally stitched together to create the complete extracted neutral digital waistband.

Figure 61D:
Figure 61F:
Figure 61E:
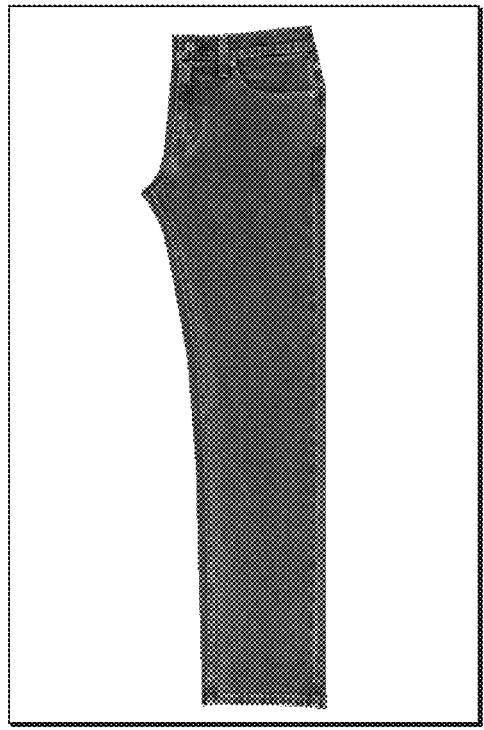
Figure 61G:
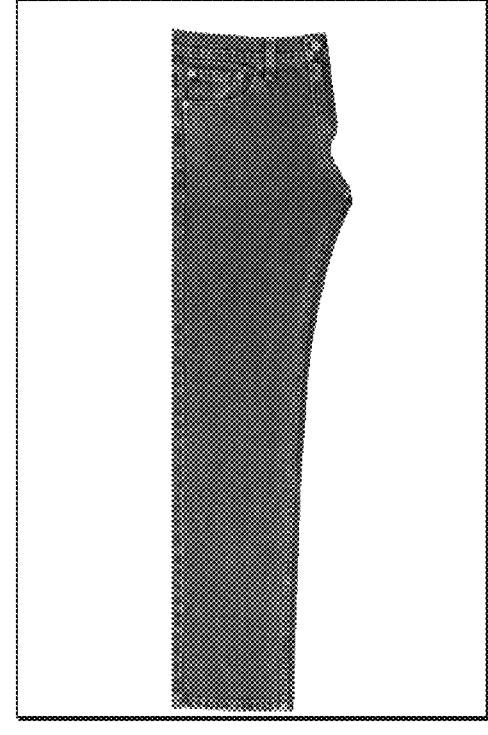

FIG. 61D shows a photograph of a left pant leg front of a pair of jeans with the background, and FIG. 61E shows the extracted neutral digital pattern piece for the left pant leg front. FIG. 61F shows a photograph of a right pant leg front of the jeans with the background, and FIG. 61G shows the extracted neutral digital pattern piece for the right pant leg front.

Figure 61H:
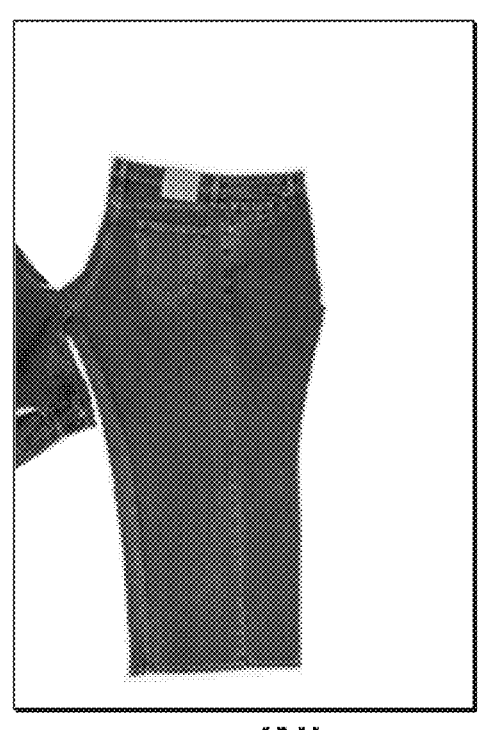
Figure 61J:
Figure 61I:
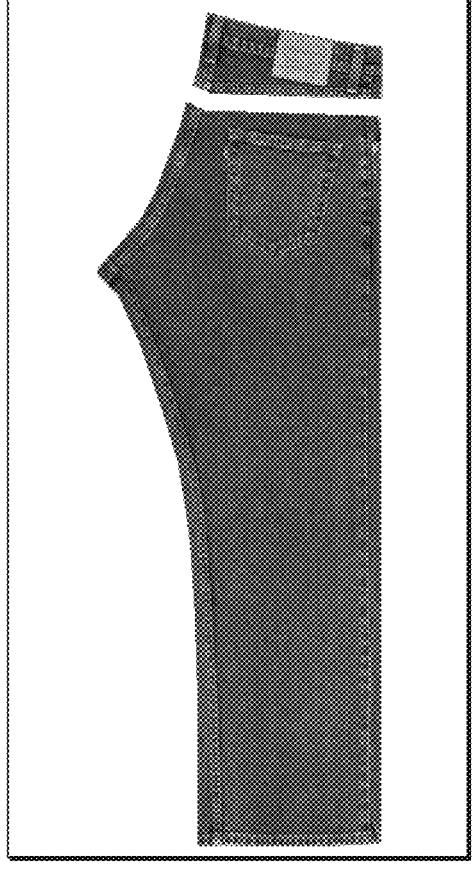
Figure 61K:
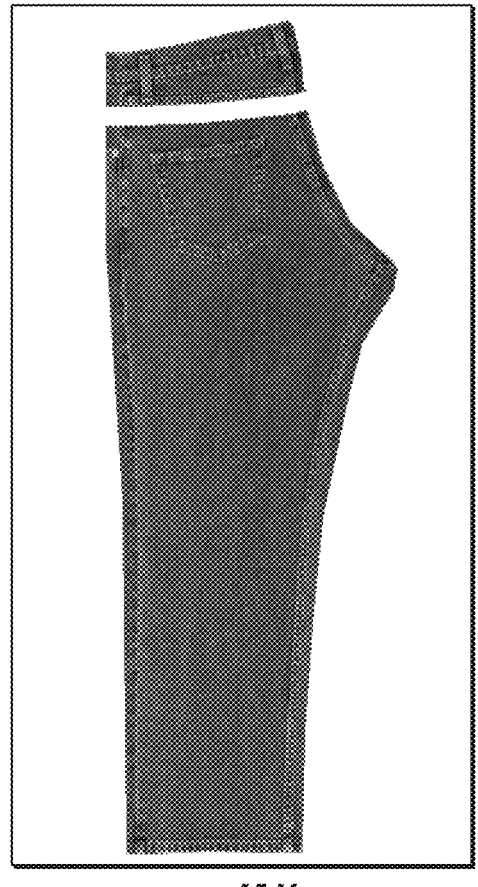

FIG. 61H shows a photograph of a right pant leg back or rear of the jeans with the background, and FIG. 61I shows the extracted neutral digital pattern piece for the right pant leg back. FIG. 61J shows a photograph of a left pant leg back or rear of the jeans with the background, and FIG. 61K shows the extracted neutral digital pattern piece for the left pant leg back.

The extracted pattern pieces are shadow neutral since the pattern pieces were photographed while flat. In contrast, for garments that are photographed or scanned while on a fit model or mannequin, the extracted pattern pieces would not be shadow neutral. The garment pieces based on curved surfaces, conforming to the shape of the fit model or mannequin. When the curved surfaces are flattened, there would be shadowing, such as wrinkles and other aberrations. So, when those nonshadow neutral extracted pattern pieces are used with a three-dimensional model to generate a preview, the preview will have an appearance that does not look natural, such as having unusual shadowing.

Figures 62A, 62B, 62C:
FIGS. 62A-62C show extracted shadow neutral pattern pieces.
Figure 62D:
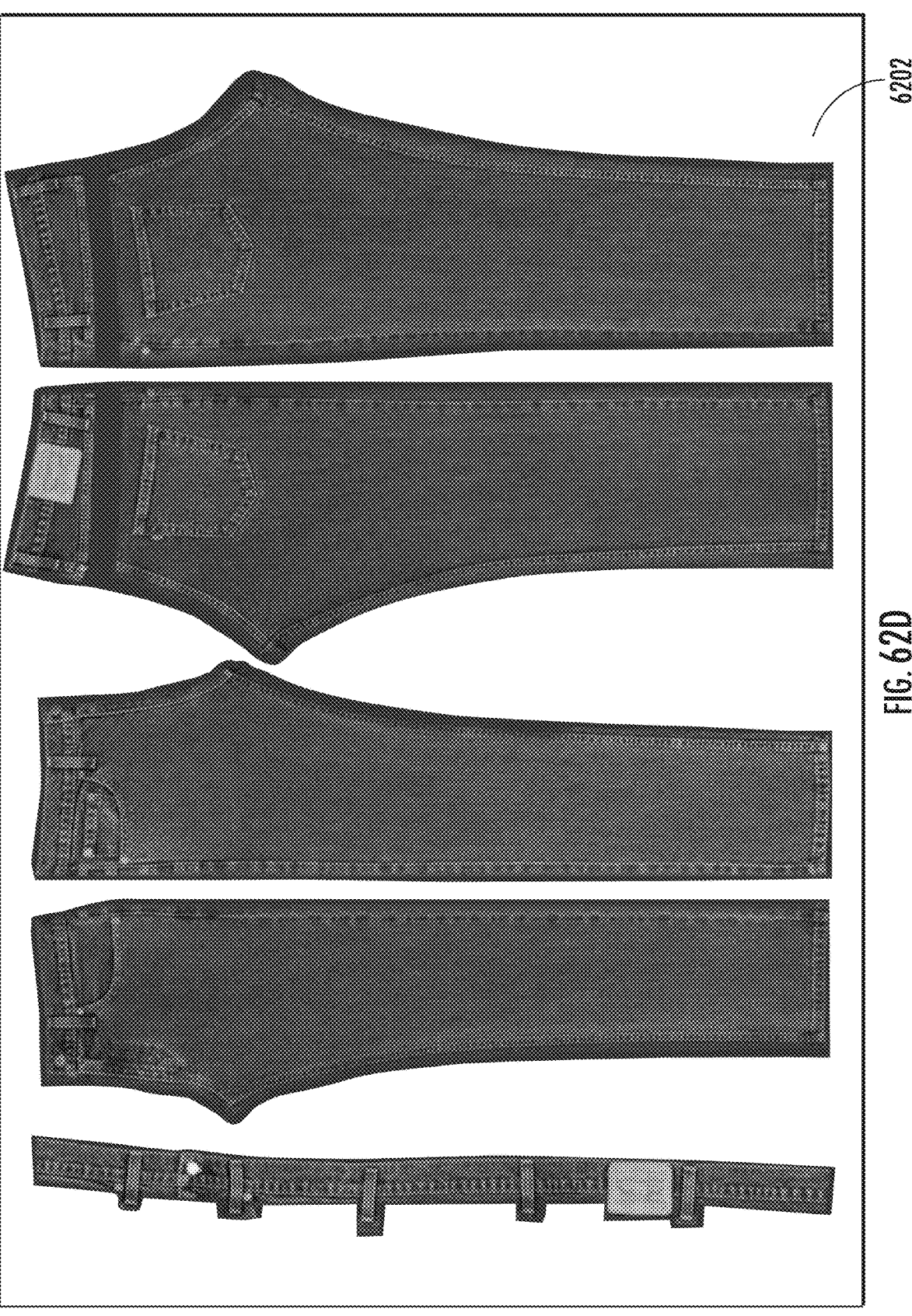
FIG. 62D shows a shadow neutral texture created using the extracted shadow neutral pattern pieces and a color layer.

A specific example of create shadow neutral texture pieces 8524 follows. FIGS. 62A-62C show the extracted shadow neutral pattern pieces. FIG. 62D shows a shadow neutral texture created using the extracted shadow neutral pattern pieces and a color layer 6202.

To create the shadow neutral texture, the extracted shadow neutral pattern pieces are combined with a color layer, which typically is a color which is close to that of a color the garment. For example, for blue jeans, the color layer used will be a similar shade of blue or indigo as on the blue jeans.

The color layer of the shadow neutral texture allows stitching together of the different neutral pattern pieces, when mapped to a three-dimensional model, such any potential gaps between the pattern pieces will appear seamless. For example, if a very different color is used for the color layer, such as white, than the jeans color, then gaps that do not exactly align may show this color (e.g., white line).

A specific example of map shadow neutral texture to three-dimensional (3D) model 5830 follows. FIG. 63A shows a created shadow neutral texture 6307. FIG. 63B shows a front view of a three-dimensional model, which the shadow neutral texture will be applied or mapped to. FIG. 63C shows a result of mapping the shadow neutral texture to the three-dimensional model. This figure shows the front of the garment with the form and wrinkles resulting from the mapping to the three-dimensional model. This image can be used as a three-dimensional preview image.

Similarly, FIG. 63D shows a back or rear view of the three-dimensional model, which the shadow neutral texture will be applied or mapped to. FIG. 63E shows a result of mapping the shadow neutral texture to the three-dimensional model. This figure shows the back of the garment with the form and wrinkles resulting from the mapping to the three-dimensional model. This image can be used as a three-dimensional preview image.

There are various ways to generate a three-dimensional model. One technique is to generate a three-dimensional model from a scan of a physical three-dimensional object, such as a fit model or mannequin. Another technique to create a three-dimensional model from scratch using software. Such software can allow a designer to three-dimensional model analogous to using molding a clay sculpture.

Another technique to create a three-dimensional model from software (e.g., computer aided design (CAD) or computer aided manufacturing (CAM) tool) where two-dimensional pattern pieces of a garment are converted into to three dimensions.

A specific example of apply simulated light or shadowing, or both, 8536 follows. A shadow neutral texture and three-dimensional model can be inputs to a rendering engine or software to render the preview image. Some examples of rendering engines include Google's ARCore, WebGL, and others.

With the rendering engine, an object such as the garment can be rendered or previewed with shadowing generated by the engine or software. The shadows will change based on a relative positioning of a simulated light source and object. Further, the rendering engine can change a camera position of point of view (POV) of the user, so that the preview will have the shadowing from that camera position.

In a specific implementation, a rendering engine maps the shadow neutral texture to the three-dimensional model, or preview image, and generates the preview image with shadowing based on a positioning of a simulated light source. The positioning of the light source can be changed or varied.

Figures 64A, 64B, 64C:
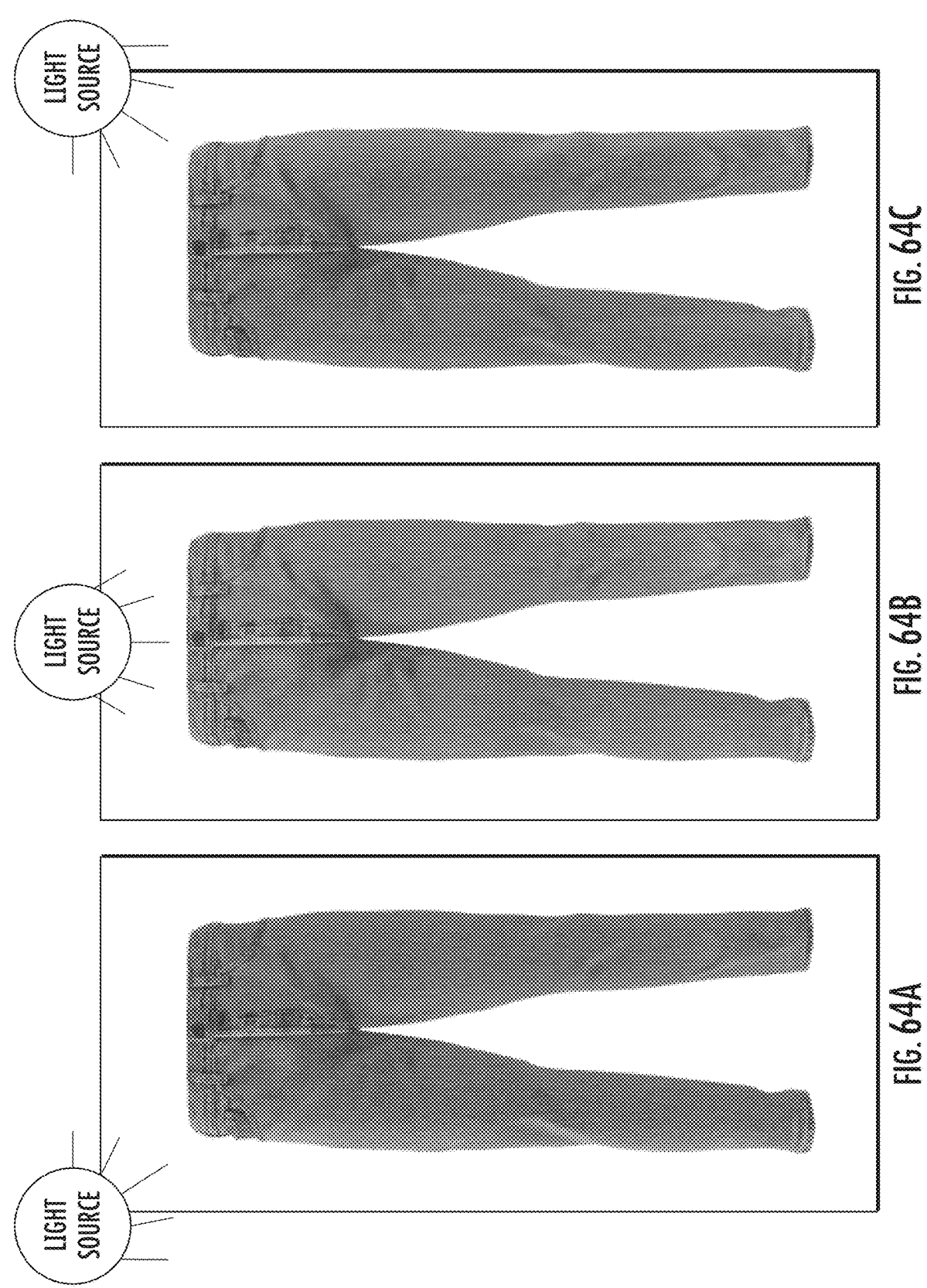
FIG. 64A shows an example of a simulated light source positioned to a right of and above the garment.
FIG. 64B shows an example of a simulated light source positioned directly above the garment.
FIG. 64C shows an example of a simulated light source positioned to a left of and above the garment.

For example, FIG. 64A shows an example of a simulated light source positioned to a right of and above the garment. FIG. 64B shows an example of a simulated light source positioned directly above (e.g., centered) the garment. FIG. 64C shows an example of a simulated light source positioned to a left of and above the garment. The shadowing, wrinkles, and contours are shown in the preview image in accordance with positioning the simulated light source. The shadows are generated by the rendering software. This is in contrast to shadows that are present garment when the photographs or scans are taken, when a shadow neutral texture creation approach is not user.

Alternatively, the user can rotate or change the positioning of the garment, and the shadowing, wrinkles, and contours will be shown in accordance with the changed positioning. This is due to the change in the relative positioning between the garment and the light source. The shadows are generated by the rendering software.

Figure 65A:
FIGS. 65A-65E show how a single three-dimensional model can be used with multiple shadow neutral texture to generate a multiple preview images.
Figure 65B:
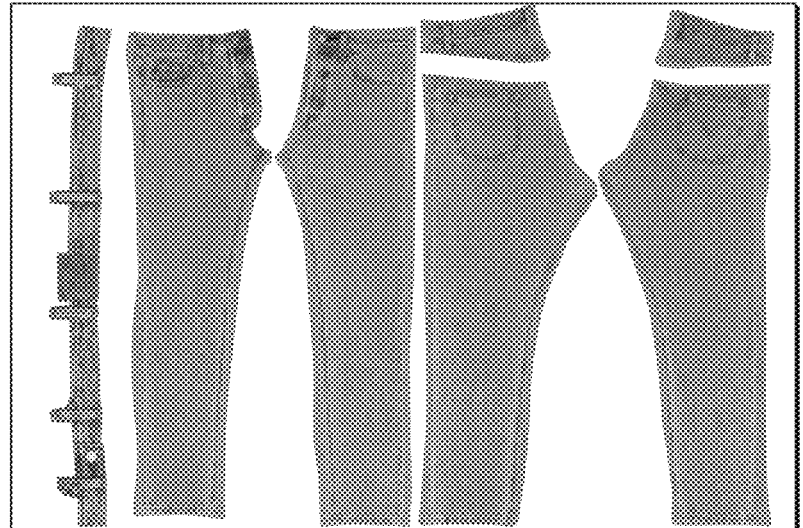
Figure 65C:
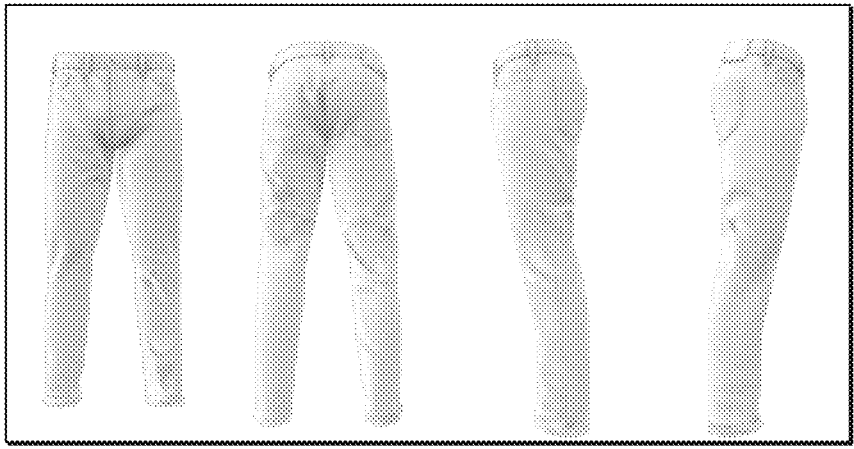

FIG. 65A shows an example of a first shadow neutral texture, which is a pair of jeans having a finish of a first shade. FIG. 65B shows an example of a second shadow neutral texture, which is a pair of jeans having a finish of a second shade. The second shade is different and lighter than the first shade. FIG. 65C shows various view of a three-dimensional model. There are front, back, left side, and right side views.

Figure 65D:
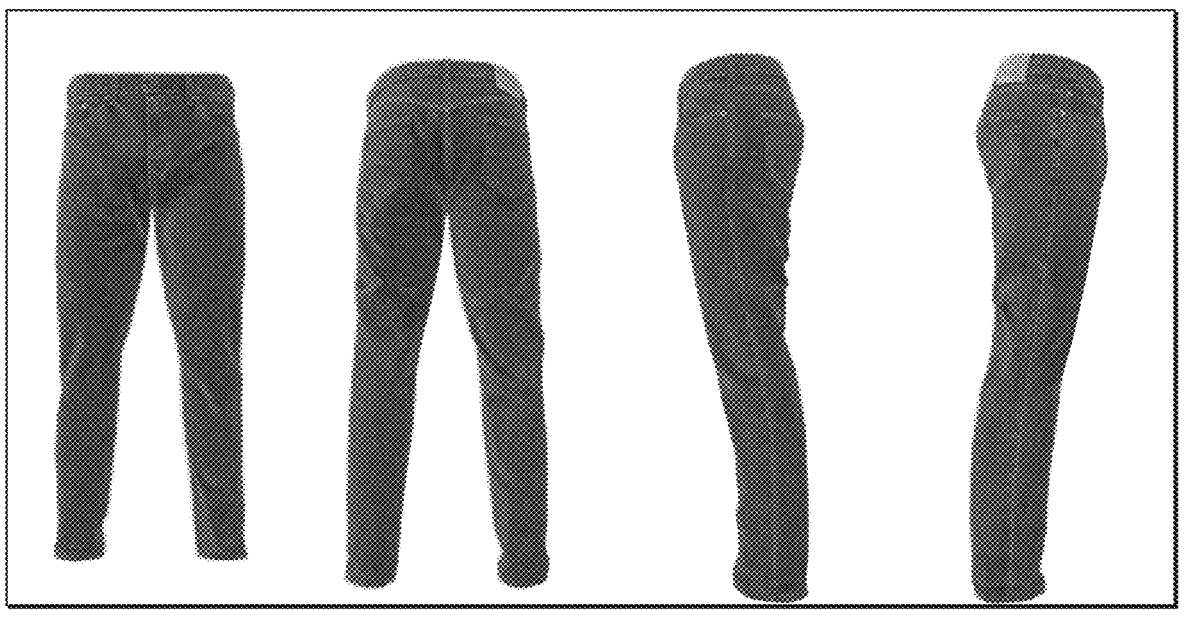
Figure 65E:
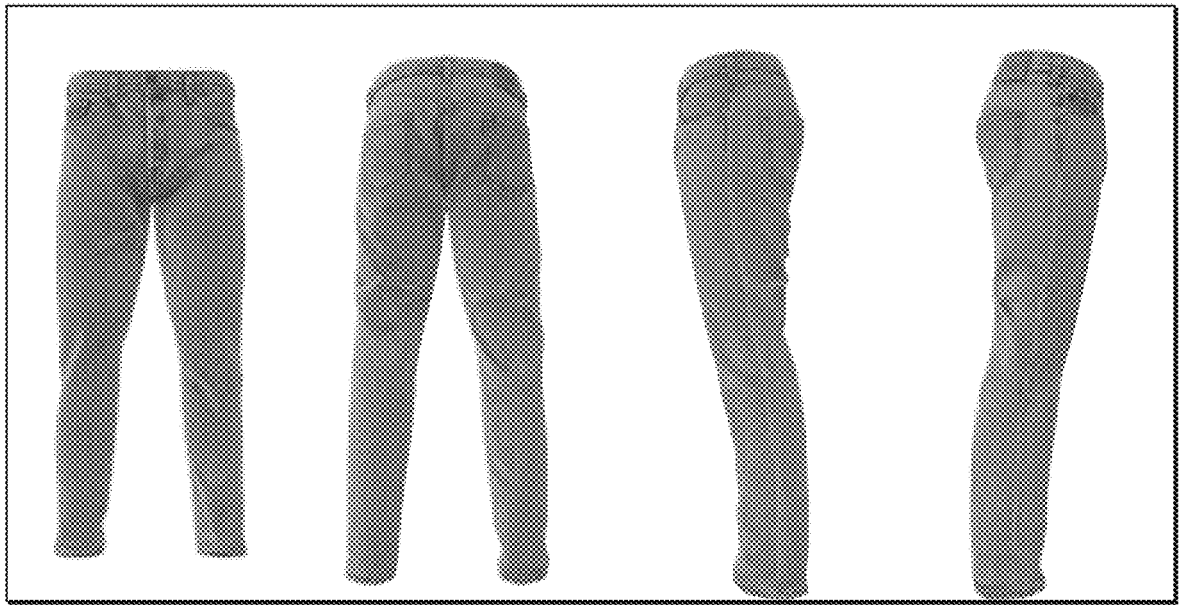

FIG. 65D shows of the first shadow neutral texture mapped to the three-dimensional model to generate a corresponding preview image. The figure shows various view of the preview image. FIG. 65E shows of the second shadow neutral texture mapped to the three-dimensional model to generate a corresponding preview image. The figure shows various view of the preview image.

FIGS. 65A-65E show how a single three-dimensional model can be used with multiple shadow neutral texture to generate a multiple preview images. This allows one three-dimensional model to be used with multiple shadow neutral textures to more easily and rapidly generate preview images with different finishes.

Furthermore, there can be multiple three-dimensional models, such as a first three-dimensional model and a second three-dimensional model. The different three-dimensional models may represent different fits or styles. Then a single shadow neutral texture can be mapped to the first three-dimensional model to generate a corresponding preview image. And the single shadow neutral texture can be mapped to the second three-dimensional model to generate a corresponding preview image.

This allows generating multiple previews from a single shadow neutral texture. For example, a first preview may be for a first fit or style in the finish of the shadow neutral texture. And a second preview may be for a second fit or style in the same finish. This technique allows for more a single shadow neutral texture to be used to more easily and rapidly generate preview images of different models, where models can represent different fits (e.g., Levi's 501, 502, 504, 505, 511, 512, 514, 541, 311, 710, or 711) or styles (e.g., skinny, boot cut, wide leg, straight, relaxed, super skinny, slim, tapered, athletic, boyfriend, wedgie, and others). The creation of three-dimensional preview images for apparel products, such as a pair of jeans, is described in U.S. patent application 62/774,127, filed Nov. 30, 2018; 62/877, 830, filed Jul. 23, 2019; and Ser. Nos. 16/937,556 and 16/937,560, filed Jul. 23, 2020. These applications are incorporated by reference.

Further, This application incorporates by reference U.S. patent applications 62/715,788, filed Aug. 7, 2018, 62/774, 127, filed Nov. 30, 2018, Ser. No. 16/535,058, filed Aug. 7, 2019, issued as U.S. Pat. No. 10,883,223 on Jan. 5, 2021, and Ser. No. 16/701,095, filed Dec. 2, 2019.

Three-dimensional preview image of garment may be rendered by a tablet computer of the system. In an implementation, the three-dimensional preview that is rendered by the tablet computer is not a photograph. The three-dimensional preview that rendered by the tablet computer is not a real-time camera view or video feed from a camera. To generate the three-dimensional preview rendering, the tablet computer selects a shadow neutral texture (described above) that corresponds to a selected shade that is selected from the preview tool and applies the shadow neutral texture to a three-dimensional model (described above).

Figures 66, 67:
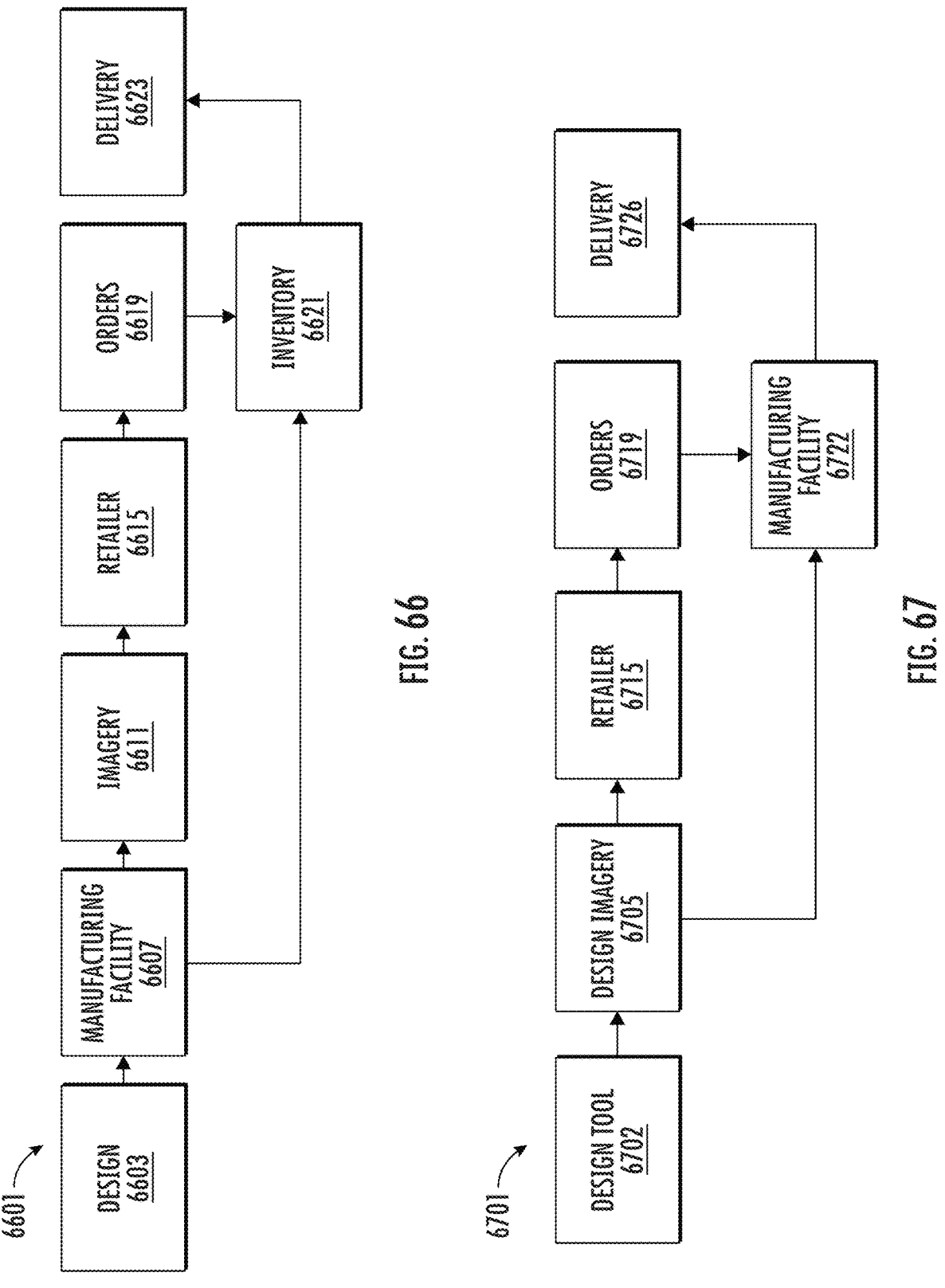
FIG. 66 shows a process flow for the manufacture of apparel such as jeans, where the garments are finished using a laser.
FIG. 67 shows another process flow for the manufacture of apparel such as jeans using laser, where the garments are made on demand based on generated imagery.

FIG. 66 shows a process flow 6601 for the manufacture of apparel such as jeans, where the garments are finished using a laser. In this flow, a designer designs (6603) one or more garment designs using software tools, such as the digital design tool described above. From the design tool, information on creating the design (e.g., laser input file) are sent to the manufacturing facility (6607). Samples of the garment are manufactured using laser finishing. The samples are inspected, and after they approved and accepted as being a finalized design, photographs or other imagery (6611) of the finalized design are created.

The buyers or retailers (6615) make purchases based on the samples or imagery, or a combination. For online sales, the imagery is placed in the retailer's online sales site, where customers can make orders (6619). Optionally, a number of garments of the finalized design can be made and stored in inventory (6621). To fulfill the orders, the garments of the finalized design are shipped and delivered (6623) to the customers from inventory or directly from the manufacturer (if an inventory is not being kept or inventory is out of stock).

FIG. 67 shows another process flow 6701 for the manufacture of apparel such as jeans, where the garments are finished using a laser. In this flow, a designer using a digital design tool (6702) to design one or more garment designs. After design, samples of the garment are not manufactured as in flow 6601. Rather, the design from the digital design tool is used to create design imagery (6705). The imagery can be, for example, three-dimensional images or two-dimensional images. The digital design tool can generate the imagery or the imagery maybe generated using another tool that takes input from the digital design tool.

The imagery is sent to the buyer or retailer (6715), where the imagery can be placed on the online site for ordering (6719). For example, the images sent to the retailer via e-mail, uploaded to the online site, or otherwise electronically transmitted to the retailer. The retailer can already start taking orders even though the designed apparel item has not yet been manufactured, or reviewed or handled physically by the designer.

The imagery and design information (e.g., laser input file) are also sent to the manufacturing facility (6722), where the garment design is manufactured using laser finishing. Based on the imagery, the manufacturing facility will adjust parameters, as needed, at the manufacturing facility to ensure the garment has an appearance similar or consistent with the imagery from design. The manufacturing facility can receive information about orders, and manufacture on demand. This will avoid manufacturing unnecessary product or creating excess inventory. The ordered products (e.g., jeans having a particular finishing patter in a selected size) can be delivered (6726) to the customer who made the order. The delivery can be direct from the manufacturing facility (or fulfillment center) that has the ordered garment. The manufacturing facility and fulfillment center may be same facility.

A flow of design tool and how textures are generated is as follows. See also discussion above for FIGS. 19-26. This flow of the design tool can be used in conjunction of with flow 6701.

1. The design tool executes on a computer, such as a tablet (e.g., Apple iPad Pro tablet), laptop, or desktop. On the screen of the computer, the user is presented a menu of bases. The user selects a base (e.g., garment or jeans). Selection may be via a touch screen interface.

The base is displayed on the screen and represented by an image of a specific resolution. Some examples of resolutions of the base image can be 1024 by 1024 pixels, 2048 by 2048 pixels, 4096 by 4096 pixels, 1920 by 1080 pixels (HD or high definition resolution), 3840 by 2160 pixels (4K resolution) or other resolutions. The greater the resolution, the greater the clarity the images will be displayed on the screen. Also, the greater the resolution, the more the user will be able to zoom into the image and the image will not become pixilated or blocky in appearance.

The user will be able to zoom in the image and see a magnified view of designed or selected portions of the image. For example, the zoom-in or magnification level can be specified as a percentage, which indicates the image is being viewed at a certain percentage of the actual size. Some percentages for zoom-in or the magnification level can be 100, 120, 140, 150, 180, 200, 240, 260, 280, 300, 320, 360, 400, 500, or 1000 percent or other value. The user will also be able to zoom out of the image and see an expanded view of designed or selected portions of the image. For example, the zoom-out level can be specified as a percentage, such as 100, 90, 80, 75, 70, 66, 60, 50, 40, 33 30, or 20 percent or other value. On a touch screen interface, the user can select the zoom level by using a pinch-in or pinch-out gesture with two fingers. Or the zoom level can be selected from a menu of zoom level values, or the user can enter a specific zoom numerical value the user (e.g., 133, 92, 38, 42, 17, or other input number directly input).

Also, the resolution of the base may be greater than or less than the resolution of the display. The base image can be scaled (e.g., upscaled or downscaled), as desired or needed, to fit within the screen window.

2. Using the base image, a base image HSL adjusted image or layer is created. The base image HSL adjusted image may have been previously created, such as when the base image was created and added as a menu item to the design tool.

The base image HSL adjusted image is a lightened image relative to the base image. This lightened image can be referred to as a lightened base image, base image HSL adjusted image, or adjustment layer. To create the lightened base image, the base image can be image filtered or transformed by image operations, such that a saturation level or brightness level of the lightened base image is less than that of the base image.

For example, in an implementation, a saturation level of the lightened base image is reduced relative to the base image. In an implementation, a brightness level of the lightened base image is reduced relative to the base image. In an implementation, the saturation level and the brightness level of the lightened base image are reduced relative to the base image.

3. On the screen of the computer, the user is presented a menu of finishing options. For example, the user selects a wear pattern, art pattern, logo pattern, or other finishing pattern that will be created by a laser on a garment. See discussion above with respect to FIG. 20 for creating a laser pattern mask from the laser input file.

4. The base image, lightened base image, and laser pattern mask are combined to create a preview image of the design that was created by the user. See discussion above with respect to FIGS. 23-24. If there are not further aspects of the design (e.g., damage, postwash bleach, tint, or overdye), this preview image of the base image, lightened base image, and laser pattern mask can be used to generate the two-dimensional (2D) or three-dimensional (3D) imagery for the design. The flow will proceed to step 7 below. If there are further aspects of the design (e.g., damage, postwash bleach, tint, or overdye), then additional processing of the image is performed to obtain the final preview image.

5. Damages. Damage or damages assets include, holes, emerging holes, cuts, fraying, and shredding that will be formed on the garment by the laser. Adding damages to the design is optional. If the user does not want to add damage, proceed to step 6. If the user wants to add damage, via the design tool, the type of damage can be selected from a menu and then placed or positioned on the image result of the preview step (e.g., base image, lightened base image, and laser pattern mask), and displayed to the user. The damage or a set of damages can be prepositioned for the garment in a set positioning. For example, see the screen in FIG. 49 that show three levels of damage, none, worn, and damaged. Or the user may be permitted to select a damage asset, and place and reposition the damage as desired. If there are not further aspects of the design, the flow will proceed to step 7 below.

6. Postwash Bleach, Tint, or Overdye. Each of these, or any combination, would occur after laser finishing and is optional. Postwash bleach is a used after laser finishing to lighten the finish. Postwash bleach can be performed by adding bleach or another oxidation agent to a wash step that occurs after laser finishing.

Tint is a used after laser finishing to add a color cast or tint to the finish. Tint can be performed by adding a tint dye to a wash step that occurs after laser finishing. Overdye is a used after laser finishing to add a strongly saturated color onto the finish. Overdye can be performed by adding a dye to a wash step that occurs after laser finishing. Relative to tint, an overdye will involve a higher concentration of dye, so that the garment will become more deeply colored.

In the processing, overdye would occur first, then tint or overdye, as desired. In an implementation, the user would have an option to add tint or overdye, but not both. If all three options are not selected, the flow will proceed to step 7.

If postwash bleach is selected, then the image from the previous processing in steps 4 and 5 would be further processed by the digital tool to represent that the garment has be washed using a postwash bleach. The image would be processed similarly to the base HSL adjusted image, where the hue, saturation, or lightness, or a combination, would be adjusted to lighten the image. This would then become the preview image.

If tint or overdye are selected, then the image from the previous processing in steps 4 and 5 (and any postwash bleach) would be further processed to add the tint or overdye to the image. The image would be proceed similar to that above in FIG. 19 for a solid tint layer. A solid color adjustment layer as appropriate for (i) a tint dye or (ii) an overdye is created or generated. The tint dye is typically less saturated as compared to an overdye. The image will be combined with the solid color adjustment layer, and the resulting image would be used as the preview image.

7. With the design tool, the user or designer has created and finalized a garment design and has a final photorealistic preview image or preview image set. This preview image of the base image, lightened base image, and laser pattern mask can be used to generate the two-dimensional (2D) or three-dimensional (3D) imagery for the design.

As described in the flow 6701, this imagery would be design imagery 6705 that is sent to retailer 6715 and manufacturing facility or factory 6722 (e.g., laser finishing facility). For example, the retailer may receive three-dimensional imagery of the design.

The three-dimensional imagery can be created as described above with respect to FIGS. 58-65E. The three-dimensional imagery can have the appearance of the design as it is being worn, such as shown in FIGS. 65D and 65E (based on a three-dimensional model shown FIG. 65C). Or the three-dimensional imagery can have another three-dimensional appearance (e.g., different poses) as desired.

For example, the three-dimensional imagery can be a flat view, where the garment is stretched out, such as how a garment (e.g., jeans) would appear when a cardboard insert is inserted into it. Some individuals (e.g., designers, customers, or manufacturing facility) may prefer a three-dimensional flat view in some circumstances because the entire front face or rear face of garment, where they can more easily see the entire wear or finishing pattern, as compared to a three-dimensional worn view. In contrast, some individuals (e.g., buyers or end consumers) may prefer a three-dimensional worn view because they want to envision how the garment might look when worn.

Different types of imagery can be sent to the retailer as compared to the manufacturing facility. The retailer can be sent a first type of imagery (three dimensional or two dimensional). The manufacturing facility can be sent a second type of imagery (three dimensional or two dimensional), where the second type of imagery is different from the first type of imagery. For example, the retailer may receive the three-dimensional worn view imagery, while the manufacturing facility may receive the three-dimensional flat view imagery.

The three-dimensional worn view imagery can help a consumer at the retailer's online site (e.g., Web selection and ordering site) decide whether to buy a garment. The three-dimensional flat view imagery can help operators at the manufacturing facility manufacture the garment as intended by the designer. Operators can use the flat view can help align or position certain features, such as wear or finishing pattern, damage assets, and others, more easily on a base template.

Further, imagery sent to the recipients (e.g., retailer or manufacturing facility) can be in the form or a three-dimensional image file or video file, which can be viewed using an appropriate viewer. The user will be able to view the file and change a perspective (e.g., rotate, zoom in, zoom out, or change a point of view) when viewing the design. The imagery sent may include static images (e.g., JPG or TIFF file). These static images may be snapshots or captures of various specific views of the three-dimensional images, such as front perspective view, back perspective view, front view, back view, rotated view, and so forth. Further the static images can be based on the two-dimensional preview images. The imagery can include three-dimensional imagery of various types or poses or two-dimensional imagery, or any combination.

5. At the retailer's site, consumers can select sizing and make orders 6719. Those orders 6719 are transmitted or submitted to manufacturing facility 6722. At the manufacturing facility the ordered garments are manufactured (e.g., laser finished according to the consumer's order and the design imagery from the designer). Then the order is sent from the manufacturing facility to the consumer for delivery 6726.

In an implementation, the manufacturing facility may manufacture some of the more popular garments in popular sizes before the order has been made. These garments would be stored in an inventory. An inventory is optional and not shown in flow 6701. And when an order for a garment is received that is in inventory, then the garment form inventory will be sent to the consumer. This may save some time, such as in situations where there is a backlog or when many orders are being requested at the same. Then, at a later time (e.g., when there are fewer orders or the backlog has been worked down), the manufacturing facility can make the garment again to replenish the inventory.

Figure 69:
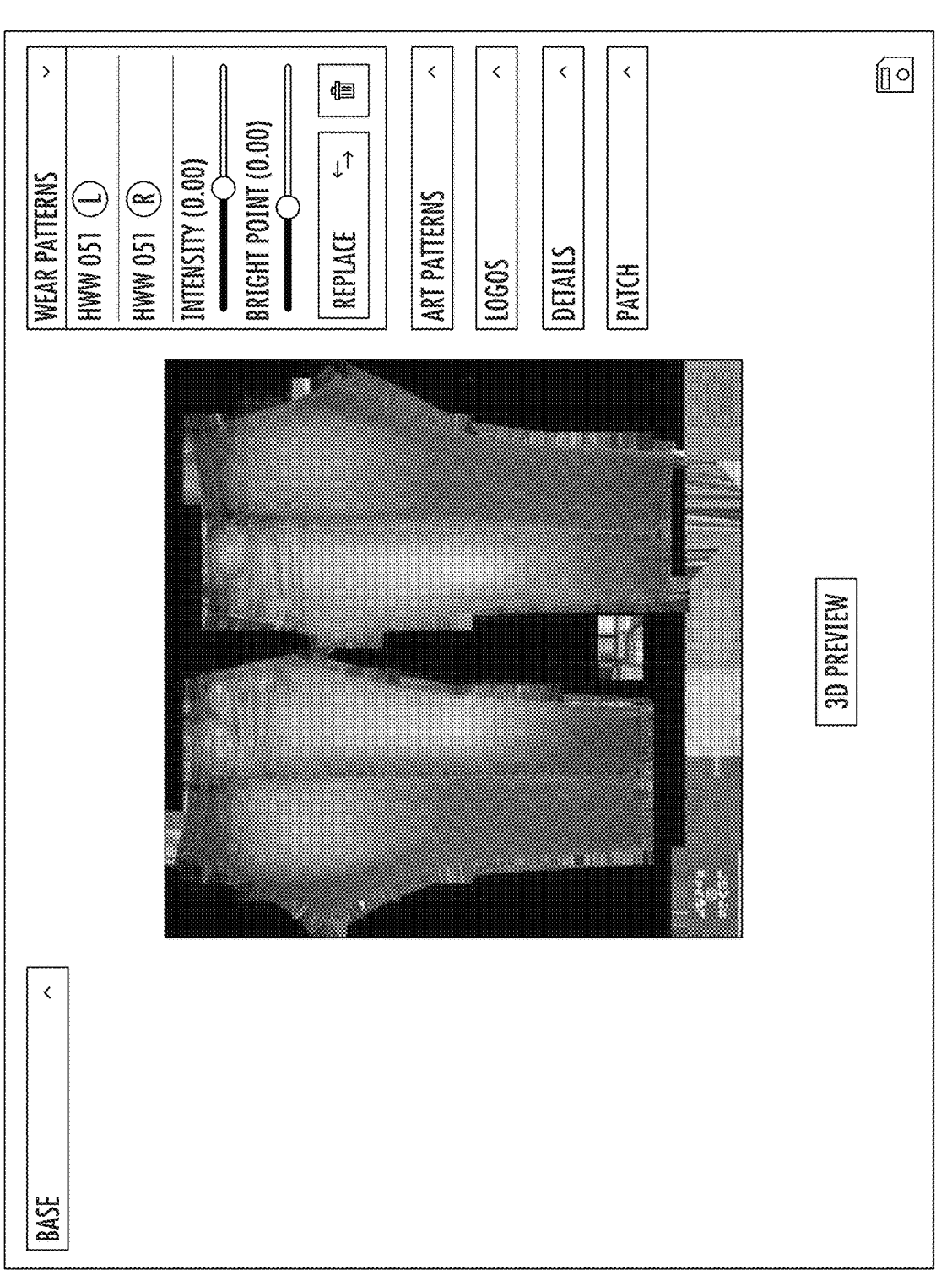
FIGS. 69-70 show a color map that can be modified to create digital finish using various options.
Figure 70:
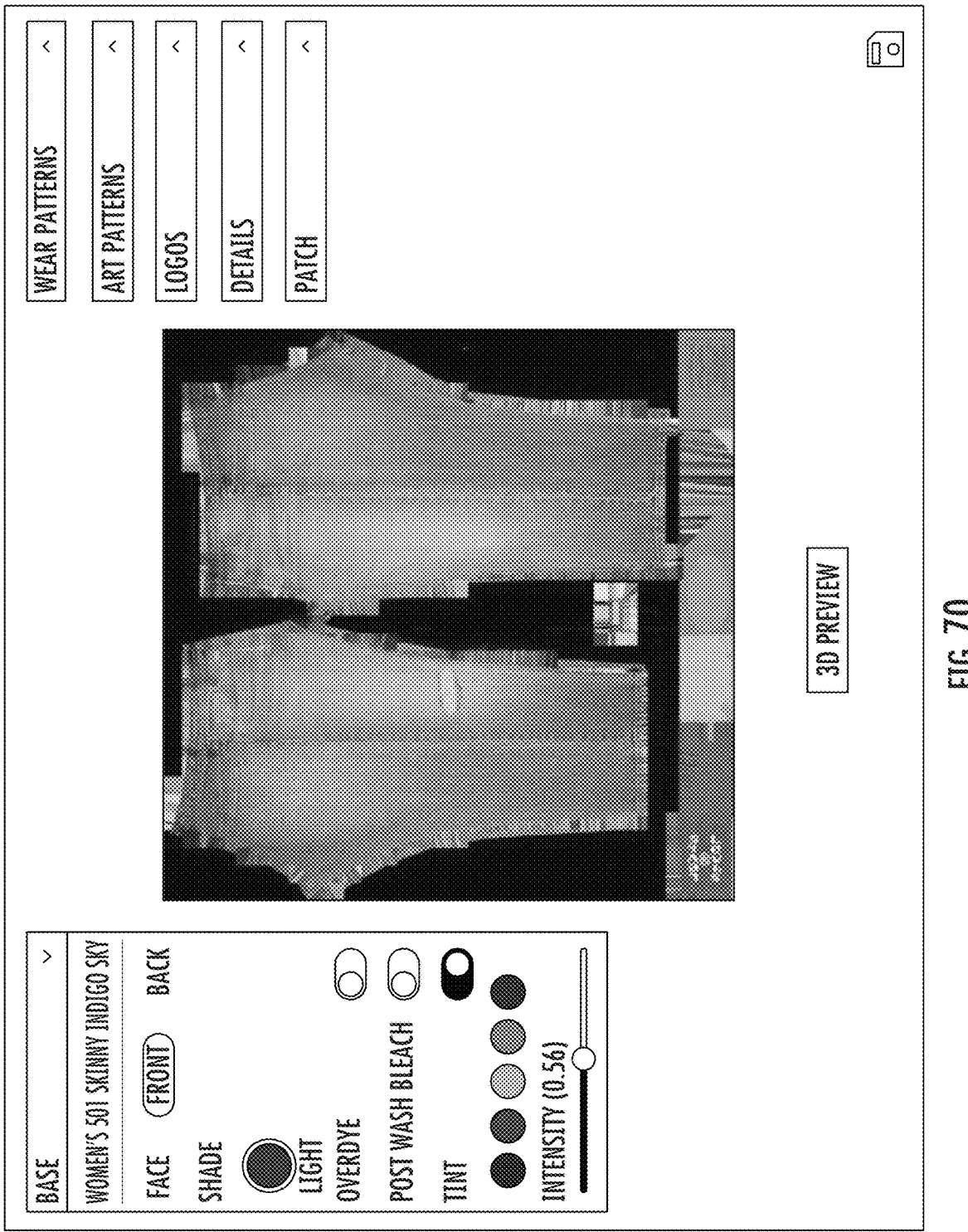

FIGS. 68-78 shows screens from a digital design tool that a designer or user can use to design garments for the flows described above. FIG. 68 shows an initial screen of a digital design tool. The user selects digital base fit fabric or BFF. A digital BFF is a three-dimensional model representing a specific fit Geometry mapped to a texture image (i.e., color map) representing a fabric and shade. For example, in FIG. 17, a BFF referred to as "Indigo Sky" has been selected. This BFF is for a women's 501 skinny fit in a light shade. fabric FIGS. 69-70 show a color map is modified to create digital finish using the following adjustments: (1) apply laser pattern, (2) apply damage and distress, (3) adjust shade, and add tint or overdye.

The color map is a preview image of the base fit fabric in a disassembled form, where the garment (e.g., pants) has been cut apart to show left and right portions. Later, after the design work is completed, the portions will be stitched back together digitally to form the complete image, three dimensional or two dimensional. See discussion above on the shadow neutral pattern pieces which are from a deconstructed garment. The color map is representative of a deconstructed garment, with left and right portions, where the waistband is attached.

Figure 71:
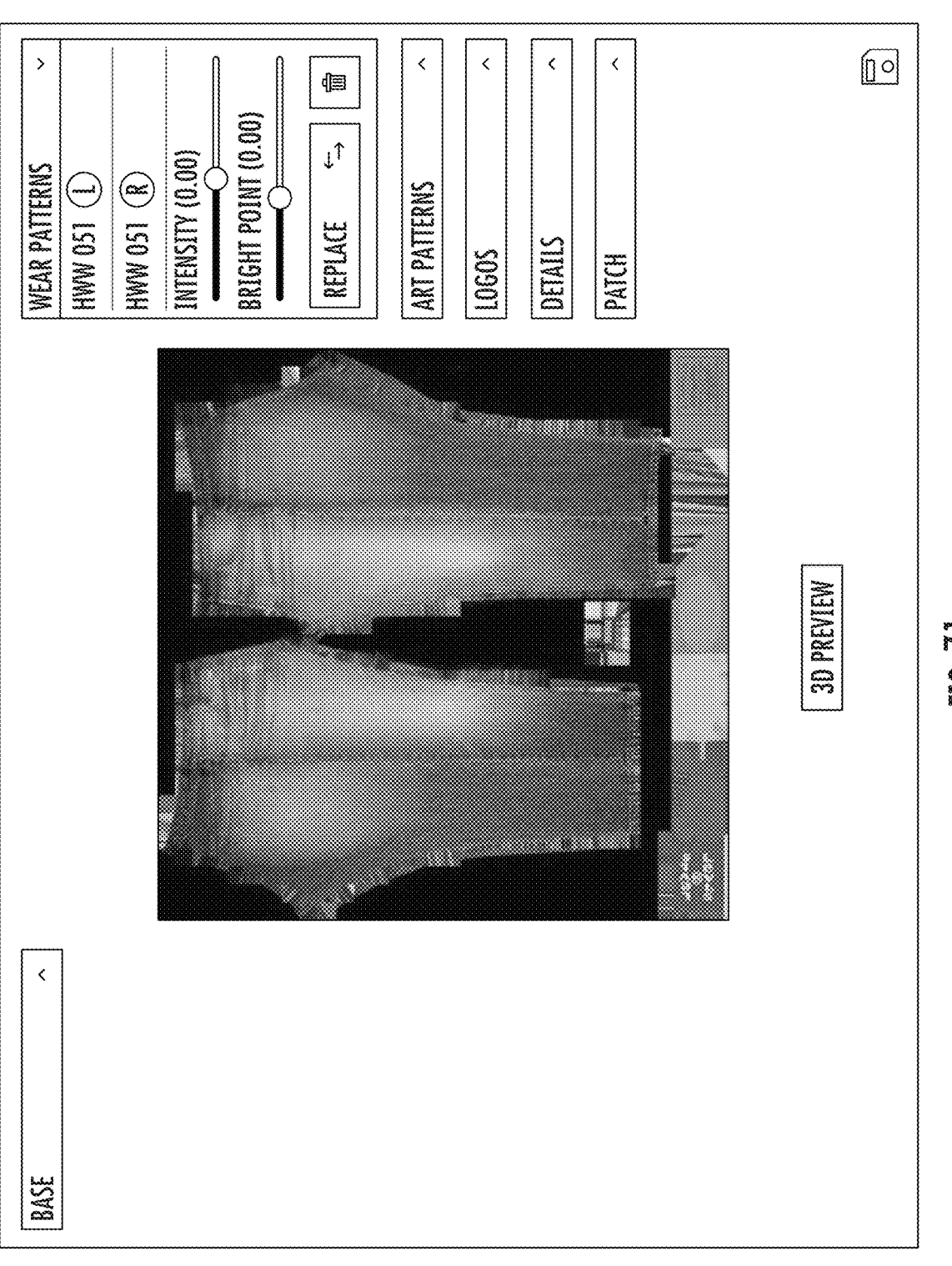
FIG. 71 shows a screen where the user can select and position a wear pattern.
Figure 72:
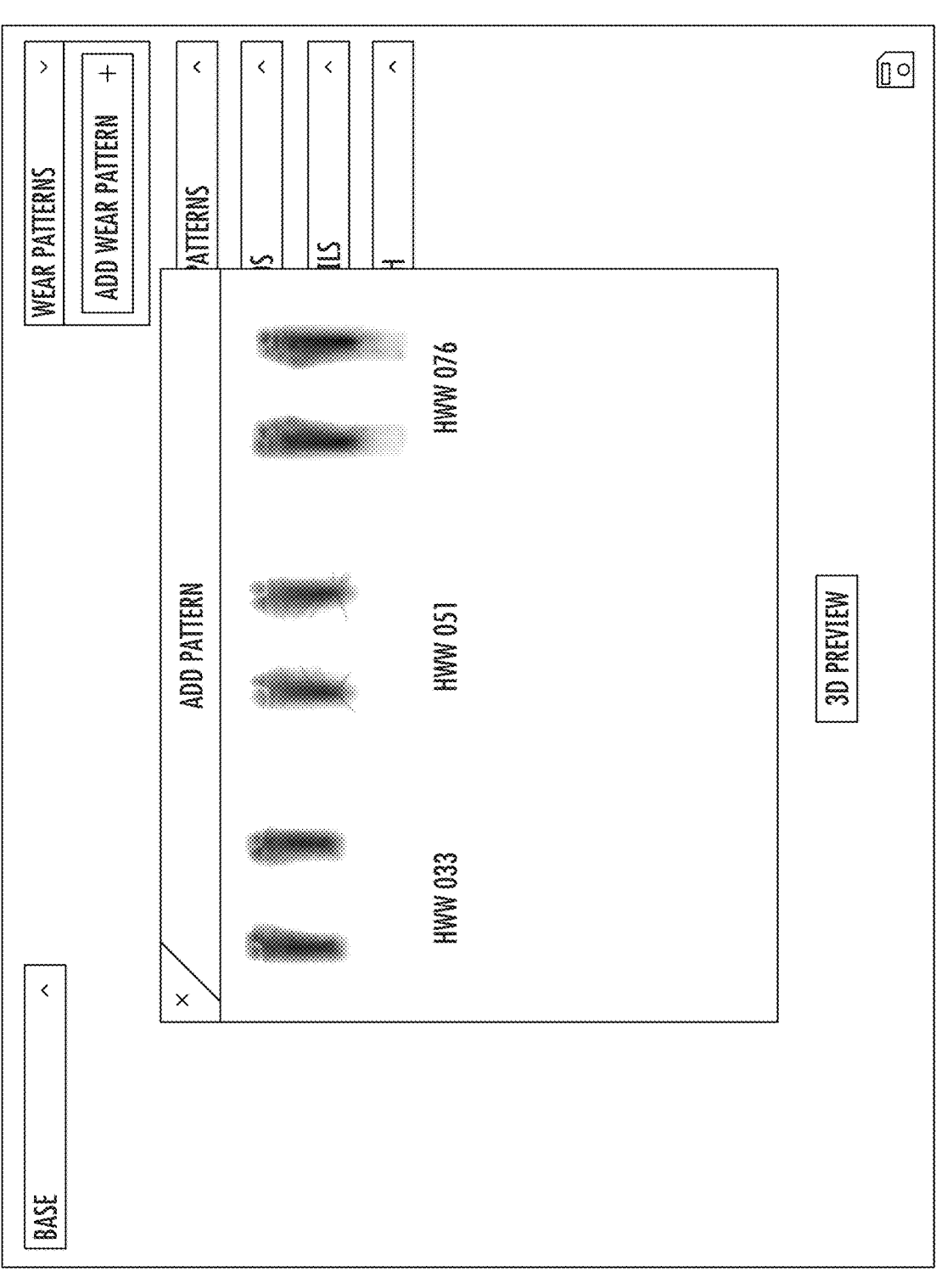
Figure 73:
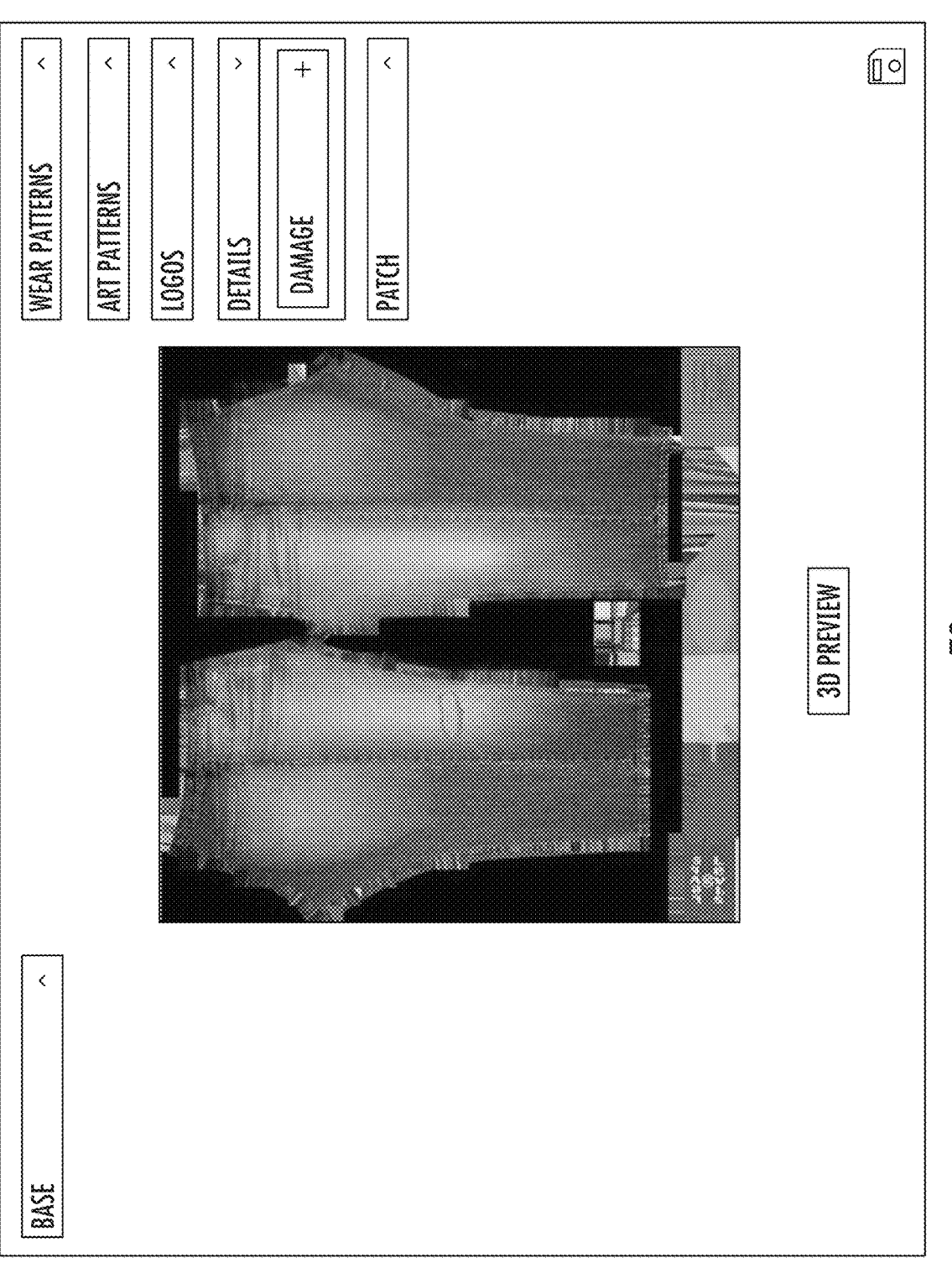
FIG. 73 shows screen with an option for the user can select and add damage.
Figure 74:
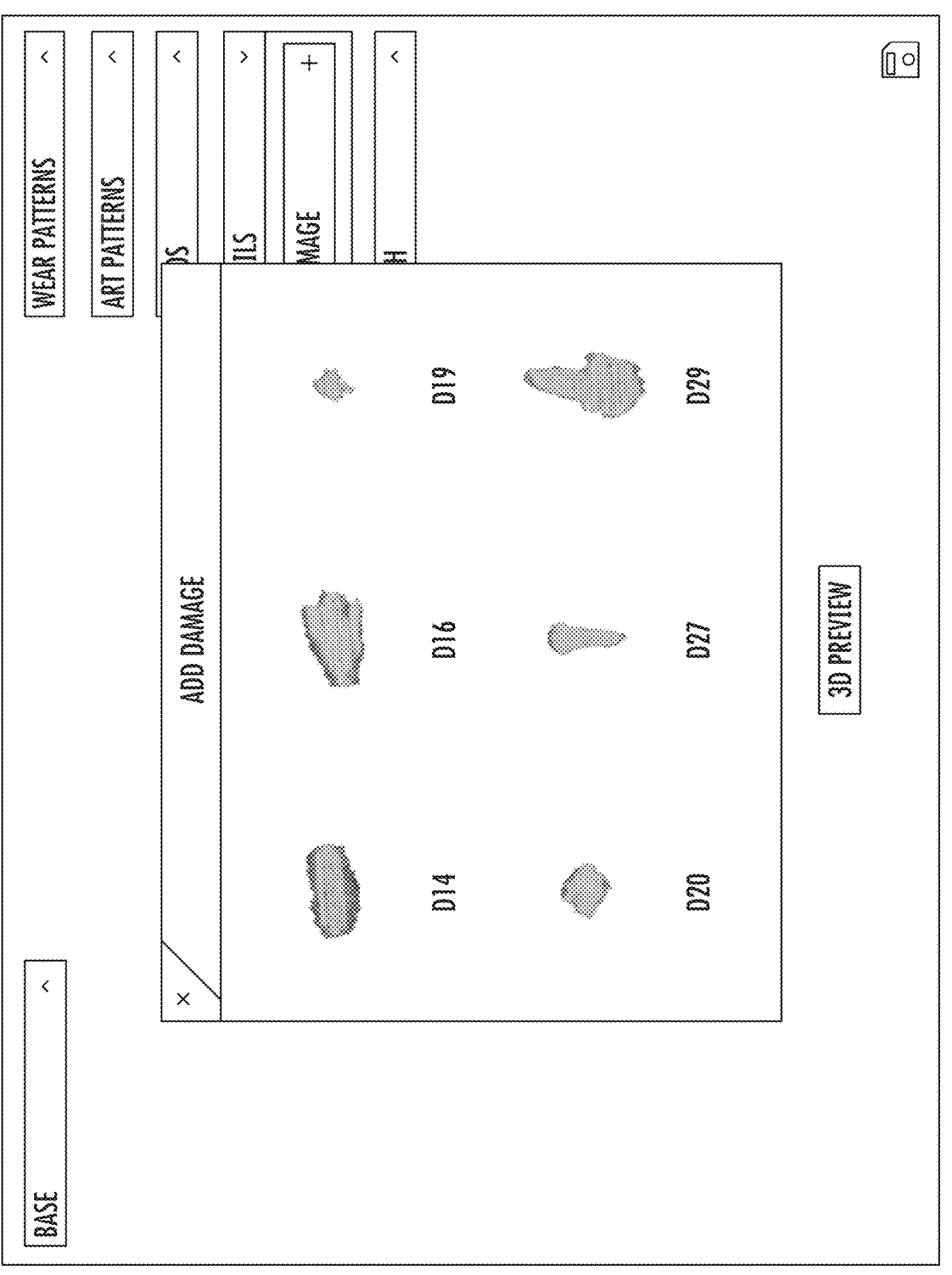

FIGS. 71-72 show screens where the user can select and position a wear pattern. FIG. 72 shows some wear patterns the user can select from. The wear patterns are applied to the image as described above. A laser pattern file is used to mask a hue saturation adjustment layer (e.g., HSL layer) of the color map. In the screen of FIG. 71, the pattern can be adjusted with two sliders: (1) bright point, which adjusts the underlying color map towards white (e.g., color value 255); and (2) intensity, which adjusts the contrast of the mask FIGS. 73-74 show screens where the user can select and add damage. With the user interface, the user can add damage and distress. FIG. 73 shows a damage menu option. FIG. 74 shows some damage assets the user can select from.

For the preview image, damage and distress can be applied as discussed above. Further, for three-dimensional image rendering, an additional normal map layer may be used. Specifically, damage is added by overlaying an image of a damage asset with a transparent background on the color layer. A normal map is generated from the damage image and placed on a normal map of the garment in the same scale, rotation, and position.

Figure 75:
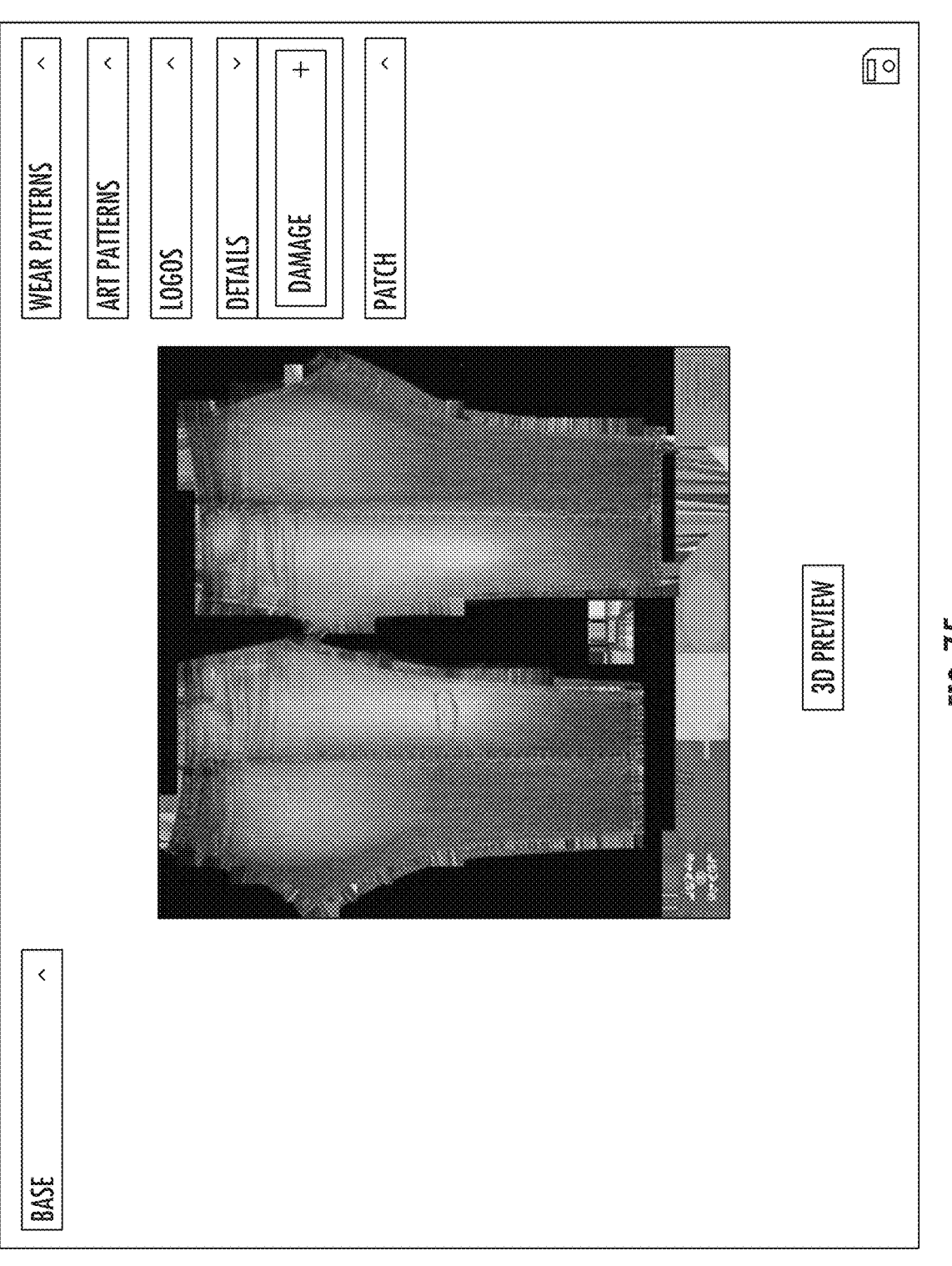
FIGS. 75-76 show screens where the user can select and adjust a base shade by postwash bleach.
Figure 76:
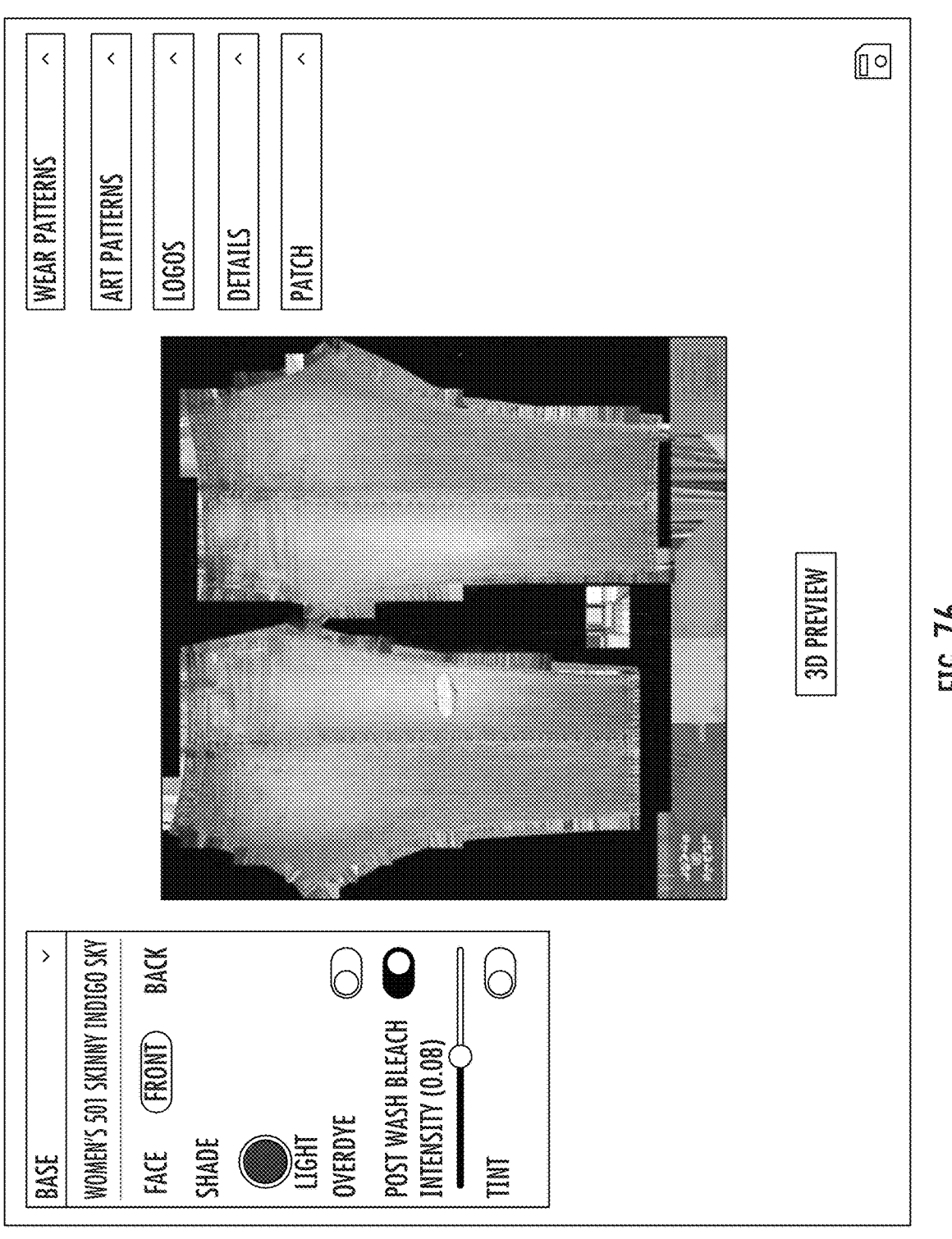

FIGS. 75-76 show screens where the user can select and adjust the base shade by postwash bleach. FIG. 76 shows a toggle to turn on or off a postwash bleach option. The user can adjust an intensity of the postwash bleach by a slider.

The user can adjust the base shade by postwash bleach, turning on the option and then adjusting the slider to achieve the desired lightness appearance. After postwash bleach is selected, the garment in the preview in FIG. 76 has a lighter appearance than the garment in FIG. 75 before postwash bleach is selected or enabled.

To generate the preview image, the base shade is adjusted according to a similar method as described above for generating a preview image. The base is modified by a HSL (Hue Saturation Luminance) adjustment layer, where the hue and saturation are kept the same, but the luminance is modified to be lighter.

Figure 77:
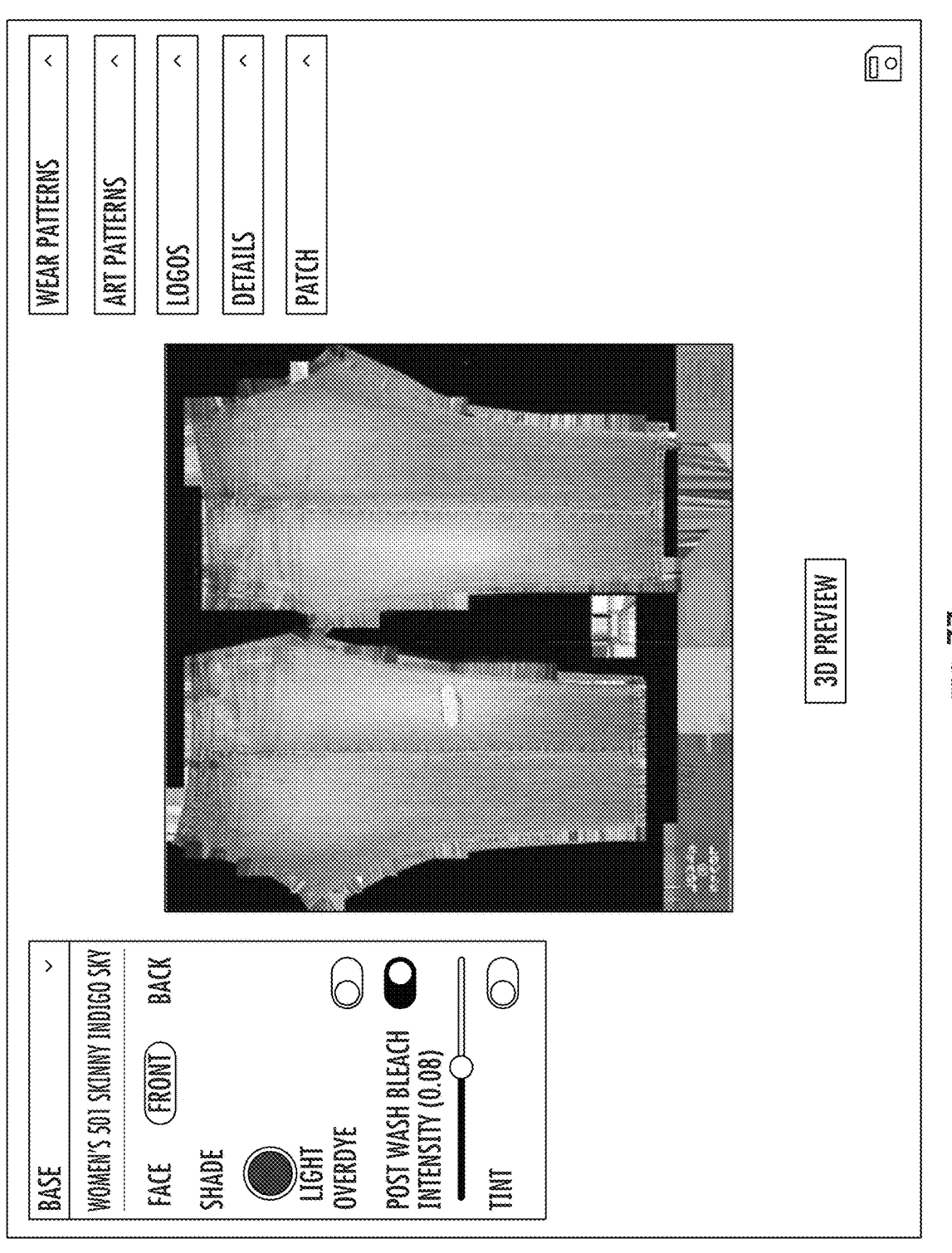
FIGS. 77-78 shows screens where the user can select and adjust the finish by the use of tint or overdye.
Figure 78:
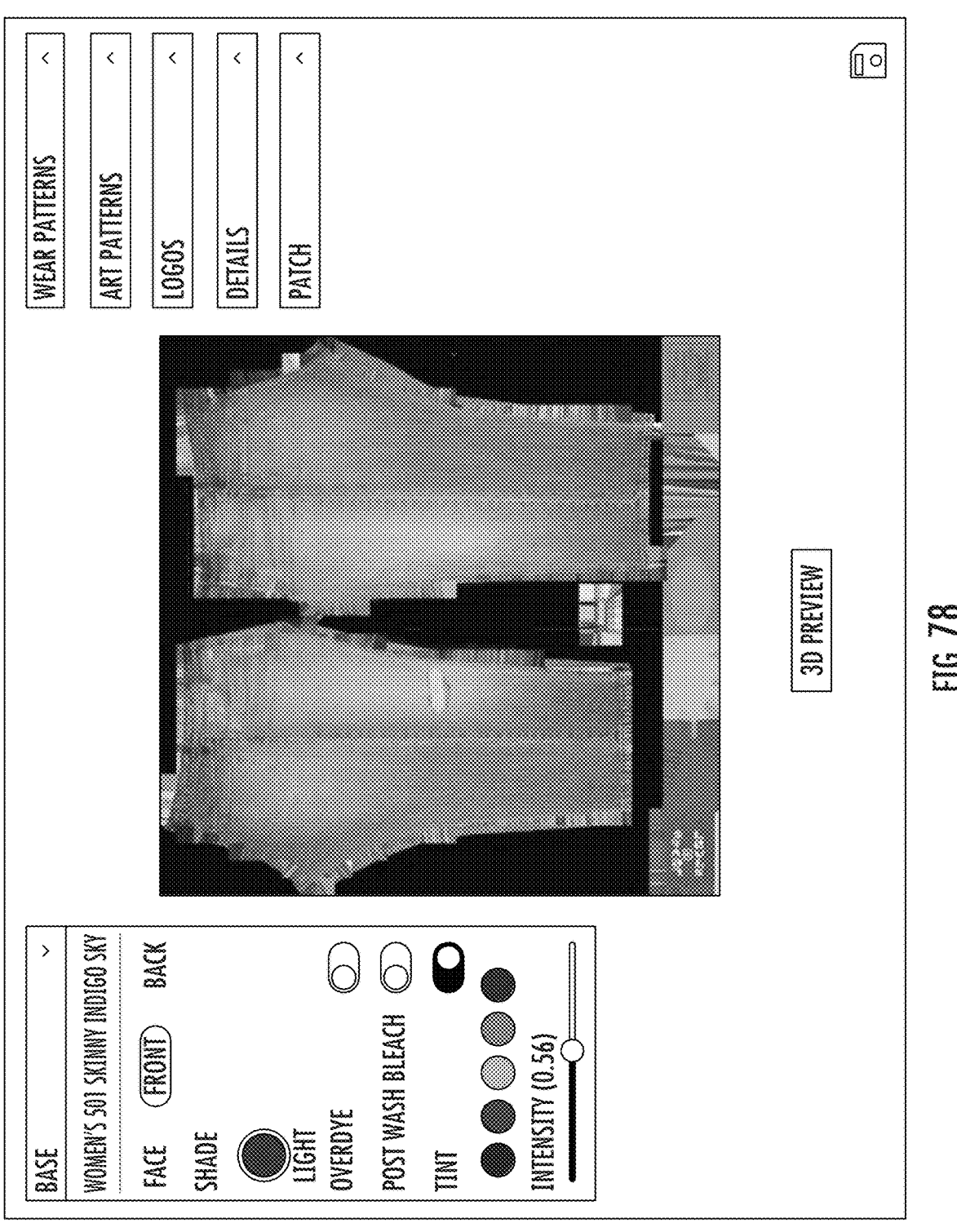

FIGS. 77-78 shows screens where the user can select and adjust the finish by the use of tint and overdye. FIG. 77 shows overdye and tint options, where both are not selected. FIG. 78 shows the tint option has been selected, and a menu of tint colors from which the user can select. The user can adjust an intensity of the tint by a slider. For overdye, the options and selection would be similar to tint: enable overdye, select overdye color from menu, and adjust overdye intensity via a slider.

The user can select and adjust tint and overdye. For generate the preview image, tint and overdye are added as described above. In brief, tint (or overdye) is added by blending a solid fill layer into the color map using a multiply blend mode. An intensity of tint (or overdye) is controlled by adjusting an opacity of the solid fill layer.

Figure 79:
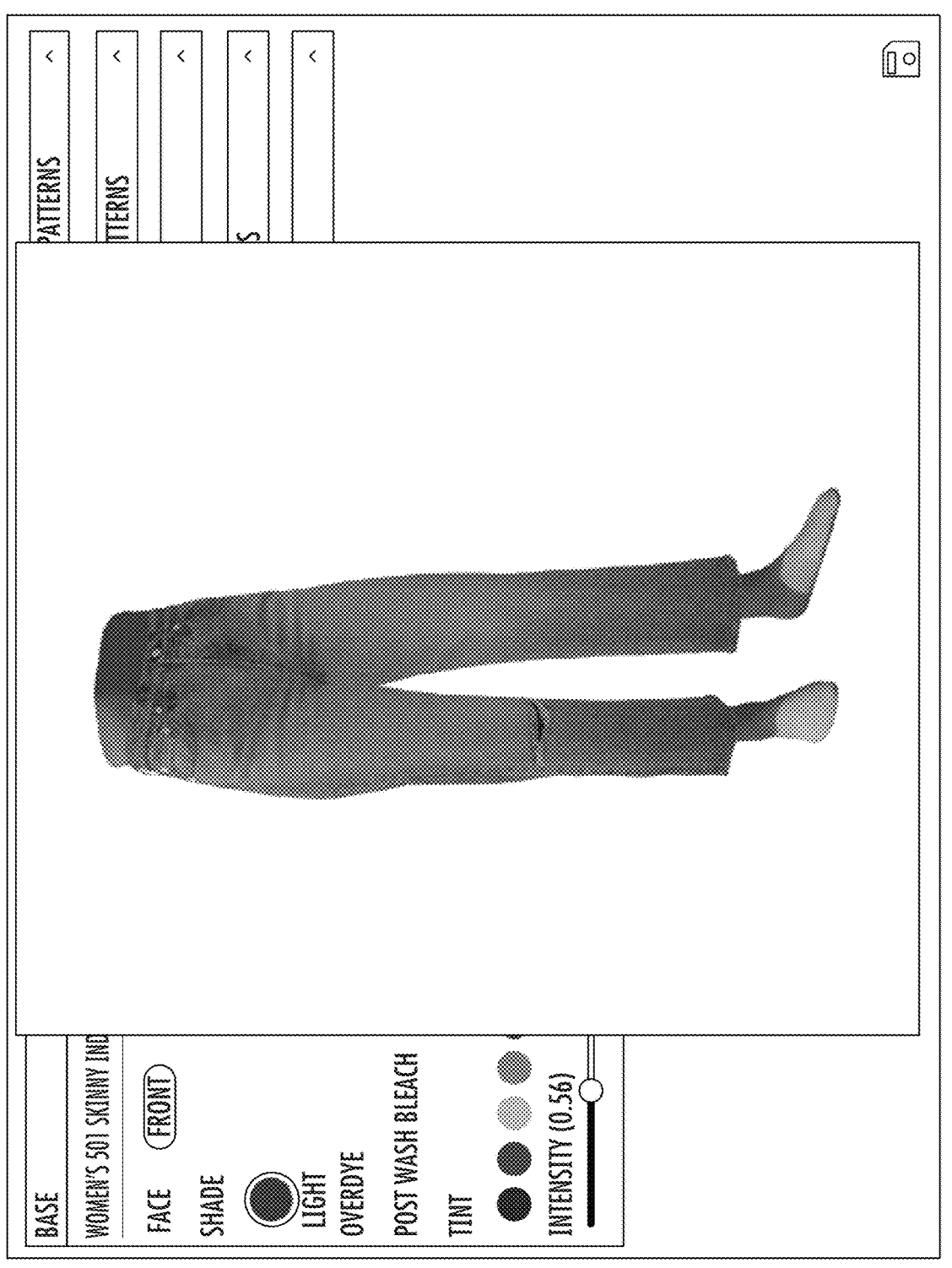
FIG. 79 shows screen with a three-dimensional preview of a garment

FIG. 79 shows a three-dimensional preview of a garment. In the interface of the digital design tool, there is a "3D preview" button (e.g., see FIG. 77) which the user can select. Upon selecting this button, the user will be presented a three-dimensional preview such as shown in FIG. 79.

With the three-dimension preview option, the user can preview the finish in 3D. Adjustment layers are flattened into one single image and applied to 3D model to create the preview. The 3D preview image is a photorealistic rendering of how the garment will appear after manufacture.

Using three-dimensional modeling, the color map (rather than a two-dimensional image layer) is mapped to a three-dimensional model. This model can be a three-dimensional flat model or a three-dimension pose or on-body model.

Figure 81:
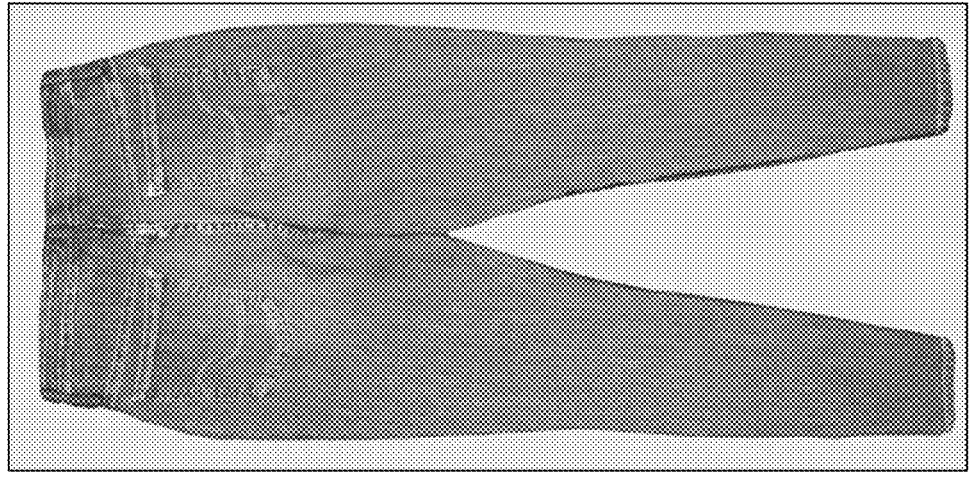
FIGS. 80-81 show examples of three-dimensional flat imagery, generated by mapping a color map onto a three-dimensional flat model.
Figure 80:
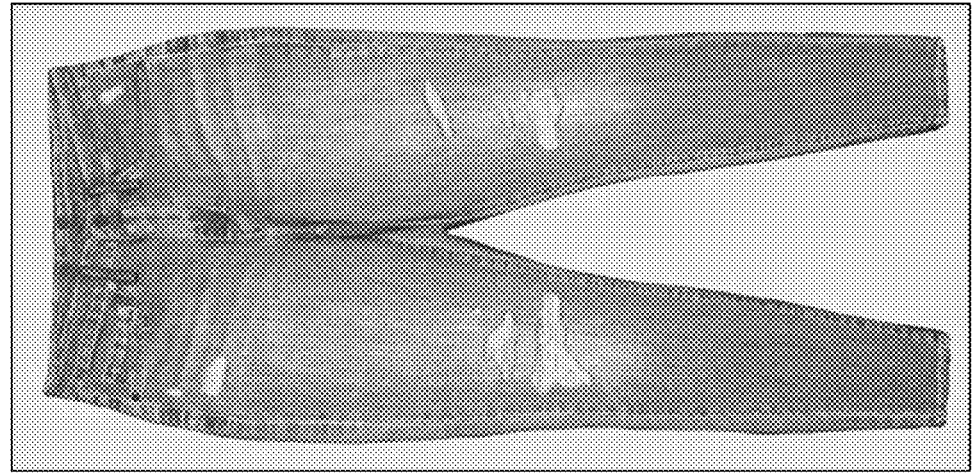

FIGS. 80-81 show examples of three-dimensional flat imagery, generated by mapping a color map onto a three-dimensional flat model. FIG. 80 shows a front flat view of a pair of jeans. FIG. 81 shows a back flat view of the jeans.

Figure 82:
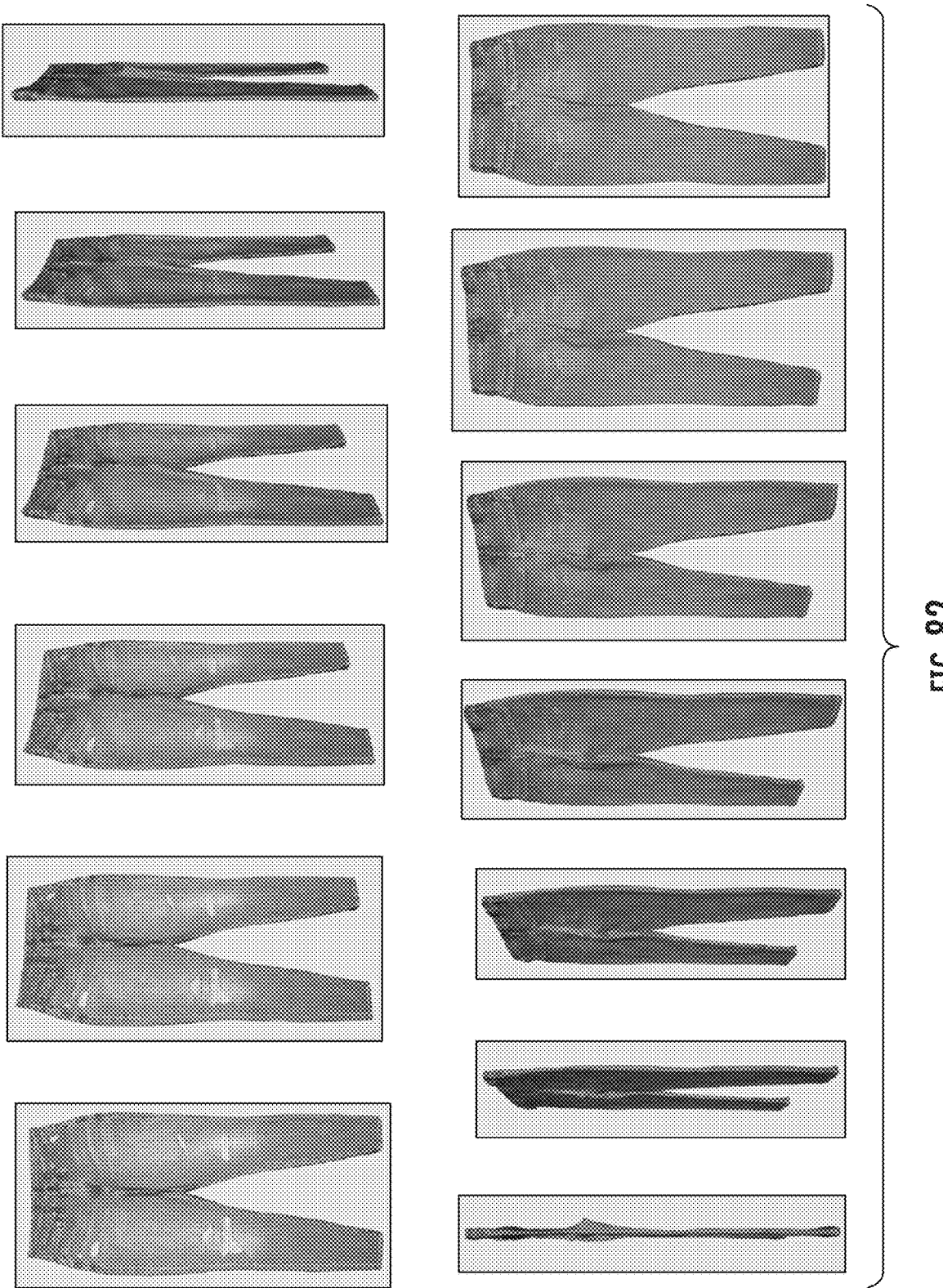
FIG. 82 shows sample images of three-dimensional flat imagery at various rotation angles.

FIG. 82 shows sample images of three-dimensional flat imagery at various rotation angles.

Figure 83:
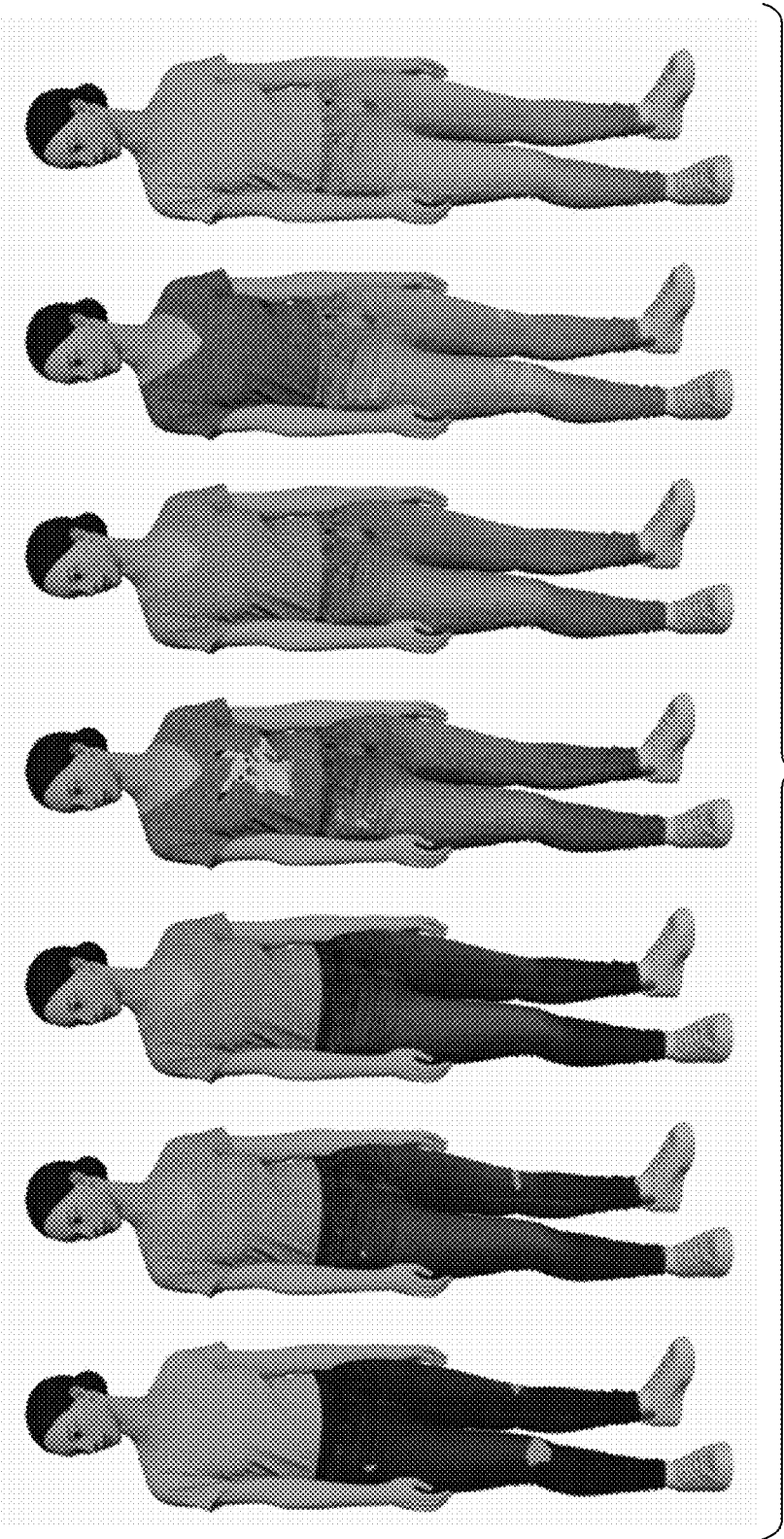
FIG. 83 shows examples of three-dimensional imagery in an as-worn pose, generated by mapping a color map onto a three-dimensional pose or on-body model.

FIG. 83 shows examples of three-dimensional imagery in a as-worn pose, generated by mapping a color map onto a three-dimensional pose or on-body model.

Figure 84:
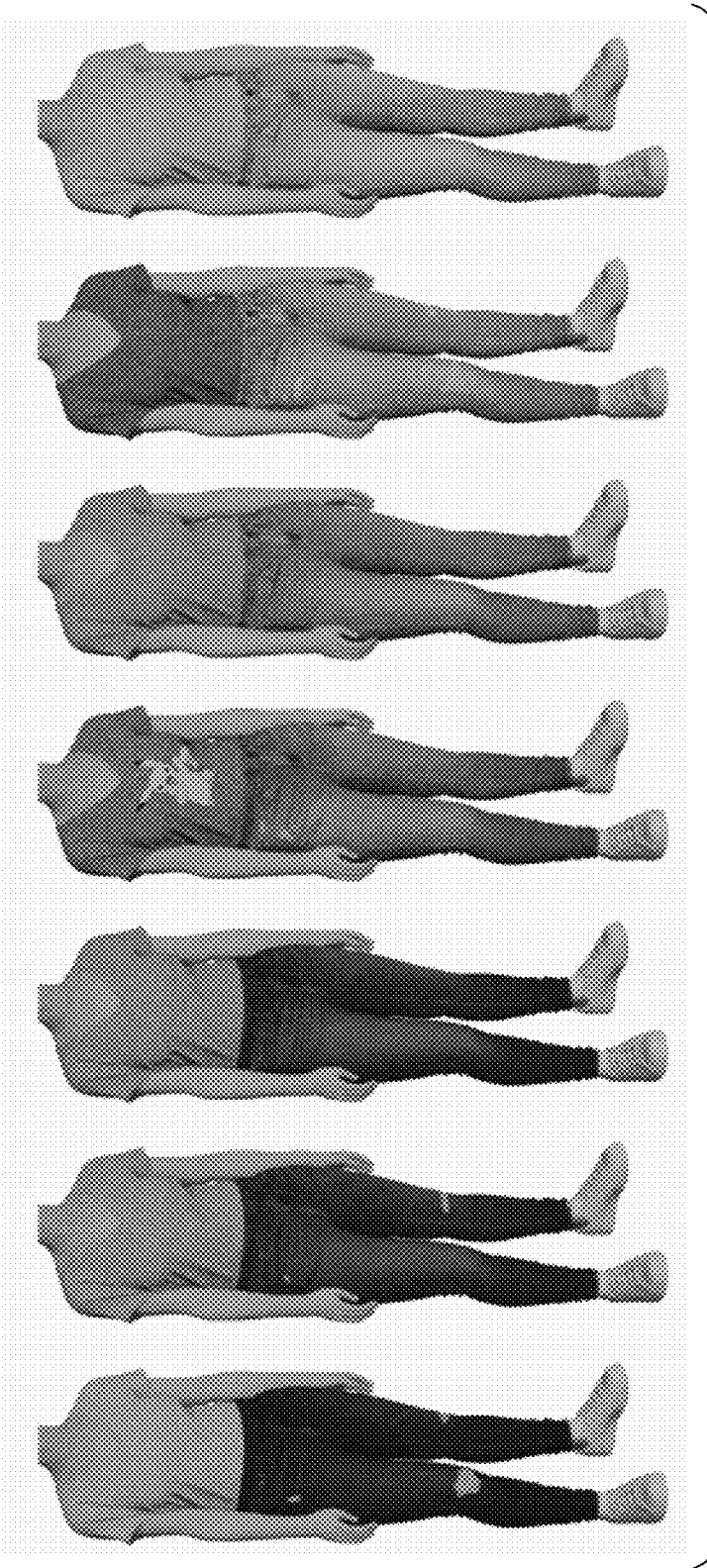
FIG. 84 shows examples of three-dimensional imagery in an as-worn pose, where the head of the model has been removed.

FIG. 84 shows examples of three-dimensional imagery in an as-worn pose, where the head of the model has been removed.

Preview imagery of the design generated using a three-dimensional flat model can be used by a manufacturing facility for created a physical garment that corresponds to the design. Preview imagery of the design generated using a three-dimensional pose or on-body model can be used by retailers to show the garment as it would appear when worn by a person. The pose imagery can be used on a retailer's Web site to show the garment (e.g., thumbnail, full-size, and zoom-in or zoom-out views), and customers can order the garment based on the pose imagery.

After orders are received (e.g., based on the pose imagery), the manufacturer can send the orders to the manufacturing facility to create or make physical garment (e.g., based on the flat imagery) that corresponds to the ordered item. The product (e.g., garment) being ordered does not need to be manufactured in advance of the order being made, but can be made on demand. This approach can completely eliminate the need for keeping an inventory of or item or product, or will reduce the amount of inventory or stock made in advance.

In an implementation, a method includes: providing a garment design tool that shows a three-dimensional preview image of a garment design (e.g., a pair of jeans) on a screen (e.g., computer screen, tablet screen, LCD monitor, OLED monitor, flat panel display, or other) as customized by a user with a finishing pattern (e.g., wear pattern with whiskers, damage assets, and other); in the garment design tool, providing an option for the user to select a garment base and upon the user's selection, showing in the screen a first preview image of the selected garment template (e.g., base template according to wash recipe such a dark, medium, or light templates); in the garment design tool, providing an option for the user to select a finishing pattern from a two or more finishing patterns and upon the user's selection, showing on the screen a second preview image of the selected garment template with the selected finishing pattern, where each finishing pattern is associated with a digital input file (e.g., laser input file); combining a digital input file associated with the selected finishing pattern with a image of the selected garment template to generate a combined image; and generating the three-dimensional preview image of the garment design comprising texture mapping the combined image on a first three-dimensional model to obtain the first three-dimensional model with textures.

The combined image can be generated by: generating an adjusted base image from the image of the selected garment template without the selected finishing pattern; generating a pattern mask based on the digital input file associated with the selected finishing pattern; for a pixel at a pixel location of the combined image, obtaining a first contribution for the pixel location of the combined image by combining a first value for a pixel corresponding to the pixel location for the pattern mask and a pixel corresponding to the pixel location for the image of the selected garment template without the selected finishing pattern; for the pixel at the pixel location of the combined image, obtaining a second contribution at the pixel location for the combined image by combining a second value for a pixel corresponding to the pixel location for the pattern mask and a pixel corresponding to the pixel location for the adjusted base image; combining the first contribution and second contribution to obtain a color value for a pixel at the pixel location for the second preview image; and using the color value for the pixel at the pixel location in the combined image.

In various implementations, the garment design tool can be a standalone application such as a mobile app for use on a mobile device such as a smartphone or tablet, or a desktop app for use on a computer. Further the garment design tool can accessible via a Web browser or be a Web-based app that executes via a Web browser interface.

Texture mapping is a method for specifying high frequency detail, surface texture, or color information on a computer-generated graphic or three-dimensional model. Texture mapping can be referred to diffuse mapping. A method can map pixels from a texture to a three-dimensional surface (wrapping the image around the object). Also, a method can include multipass rendering, multitexturing, mipmaps, and more complex mappings such as height mapping, bump mapping, normal mapping, displacement mapping, reflection mapping, specular mapping, occlusion mapping, and many other variations. The result of texture mapping is a result that is photorealistic or near-photorealistic. With texture mapping, a two-dimensional image is mapped on a three-dimensional model (e.g., surface or surfaces without textures) to obtain that three-dimensional model with the textures (e.g., surface or surfaces with textures from the two-dimensional image).

The texture mapping can be performed by using a three-dimensional modeling process such as UV mapping, which involves projecting a two-dimensional image (e.g., color map) to a three-dimensional model (e.g., flat model, or pose or on-body model) for texture mapping. U and V refer to the axes of the two-dimensional texture. The polygons that make up a three-dimensional are painted with color and other surface attributes from an image (e.g., color map). The resulting can be called a UV texture map. The UV mapping process involves assigning pixels in the image to surface mappings on the polygon. This can be done by copying a triangular piece of the image map and pasting it onto a triangle on the object. When rendering the UV texture map, the UV texture coordinates are used to determine how the three-dimensional surface is painted.

The texture mapping can be by using a projection mapping. This uses any pair of the model's X, Y, and Z coordinates or any transformation of the position. The projection mapping maps into a texture space, rather than a geometric space as in UV mapping above. The texture mapping may be performed by other techniques of texture mapping.

The three-dimensional model (e.g., first three-dimensional model) can be an on-body or pose model, which would be a model in a pose where the garment is worn on a person's body. There may be multiple poses, and if so, there would be multiple on-body or pose models (e.g., first pose model, second pose model, and so forth). The pose models are useful for customers or buyers of an apparel item or product. The on-body or pose model can show the garment product in an appearance when this garment is worn by a person.

Various techniques can be used to generate an on-body pose model. Augmented reality (AR) can integrate or place computer-generated information such as virtual garment over the actual body of a user in their real environment in real time using camera. Human body recognition, detection, and tracking integrated with augmented reality enables the user to interact with the virtual garment through body movements. Body skeleton based joint positions and measurements are obtained and virtual garments are superimposed on the body by detecting the user's skeleton based joint positions in real time.

The three-dimensional model can also be a flat model. As discussed above, this can be used by a manufacturing facility to process or make the garment. The flat model shows the garment as it would appear when laying flat. The finishing pattern and any damages are typically more clearly shown using a flat model rather than a pose or on-body model.

To create an on-body model or pose model (e.g., smartphone camera, webcam, or digital camera) may be used. This camera can detect augmented reality human body recognition and tracking. From this human body recognition input, human body measurements can be made. This human body recognition input can be used to determine human body skeleton and joint positions. There is a garment model, where garment measurements and points are made.

Using the (i) human body measurements, (ii) human body skeleton and joint positions, and (iii) garment measurements and points, the garment is superimposed on a human body model (e.g., motion capture and pose estimate). This is used for the rendering, such as augmented reality or virtual reality rendering). The rendering interacts with human body motion tracking.

Further, in addition to the flat model, or images of the flat model with textures (e.g., a front view of the flat model and a back view of the flat model) the digital input file can be sent to the manufacturing facility. For laser finishing, the digital input file can be a laser input file. And the laser input file can be used by the laser to form the laser finishing pattern onto the garment (e.g., jeans or other). Personnel at the manufacturing facility can view the flat model or images of the flat model to ensure the finished product matches more closely to the design as contemplated by the designer or artist when using the garment design tool.

From the three-dimensional model, two-dimension images can be captured. For example, from the pose model, various two-dimensional pose images can be generated or captured at various rotation angles of the pose model (with textures or applied texture mapping). Some examples of rotation angles include 0, 30, 60, 90, 120, 150, 180, 210, 240, 270, 300, 330, and 360 degrees. Also, the perspective can be changed, such as the zoom in or zoom out, or the eye perspective can be offset. And an image of the model with textures can be captured with any combination of rotation angle, zoom factor, or perspective.

Two-dimensional images or imagery (e.g., pose images based on a pose model with mapped textures) may be delivered to an online store or seller (e.g., retailer). The images would be made available for customers to see at an online shopping site. Then a customer can order a product from the online shopping site based on the two-dimensional images (e.g., even before the product has been made). After one or more orders, a request can be sent to a manufacturing facility to make the product. Then, products can be manufacture using an on-demand manufacturing technique. No inventory or less inventory will be stored before a product is made available for sale. For example, the online sales imagery (e.g., pose or on-body model images) may be sent to an online retailer before the design imagery (e.g., flat model images) are sent to the manufacturing facility.

In an implementation, a first model is an on-body model or pose model and a second model is a flat model. Generally the on-body model or pose model is used by an online shopping site while the flat model is used by manufacturing.

In various implementations, the garment design tool provides a two-dimensional preview image of the garment base template and a wear or finishing pattern as a merged or combined image. Then tool can generate a three-dimensional rendering of this garment by using texture mapping of the merged or combined image on a three-dimensional model (e.g., on-body or pose model or flat model). The result is the three-dimensional model with textures from the combined image.

The combined image can be a color map, which includes images of the garment panels (e.g., deconstructed, separated, or detached garment panels). For example, the color map can include a first deconstructed or separated garment section (or piece or assembly) include a right front leg panel and a right back leg panel. The color map can include a second deconstructed or separated garment section include a left front leg panel and a left back leg panel.

Referring to FIG. 73 as an example for a jeans design, for the first deconstructed or separated garment section (e.g., right side), the outside seams of the right front leg panel and a right back leg panel would remain joined or sewn together, while the inside seams and of the panels would be separated, from a crotch point to a bottom hem of the jeans. Similar the right-side of the jeans would be separately similar on a back side. The second deconstructed or separated garment section (e.g., left side) would be similar to the first section. The first and second deconstructed or separated garment sections can be shown in the same screen or window to the user.

The color map with separated garment sections is in contrast to the three-dimensional model with textures (based on the color map). The separated garment sections are places on the three-dimensional model and joined together. There are not gaps between the panels pieces or sections. For example, in a on-body or pose model view (e.g., FIGS. 79, 83, and 84), the garment design is shown as worn by a person, where all the panels are completely assembled ping and joining or connecting of the sections of the textures together. FIGS. 80-82 show a rendering for the flat model view.

After the garment design is complete, this design can be sent to the manufacturing facility as, for example, the flat model with textures representing the design or imagery of the flat model with textures. The manufacturing facility can use the flat model with textures or imagery and the digital input file to make the garment design using a laser. The digital input file can be a laser input file.

Or the manufacturing facility may be a traditional finishing processing facility (e.g., using chemical and abrasion for finishing), this facility can make the garment design based on the flat model with textures or related imagery. The same garment design may be produced by facilities having laser capabilities (e.g., by use of the digital input file or laser input file), and by facilities without laser capabilities (e.g., where the digital input would not be input to a laser).

A garment manufacturer may have both laser-capable processing facilities and traditional processing facilities (which do not have laser machines). The same garment design can be manufactured in one or both facilities from the same garment design as specified by the three-dimensional model (e.g., flat model) with textures. Then the garment manufacturer can increase the available production to manufacture a particular garment design. The three-dimension model with textures (of the garment design) or related imagery would be a single specification of the garment design that would be used by both types of facilities. This would ensure consistent garment design results by types of facilities.

Below is a flow of image filters and image composition for a digital design tool as described above. In a specific implementation, textures are generated as follows in table B.

TABLE B

```
base.image = 4096 × 4096 base pattern
base.lightenedImage = base.image * SaturationBrightnessFilter(saturation: −0.15,
brightness: 0.25)
Step 1. Generate Pattern
For each wear, art, logo pattern:
a. Combine the pattern layers using a DarkenBlend filter, taking the darkest pixels.
b. Apply a PatternFilter using the bright point and a clamp between 0 and −0.5.
c. Invert the pattern since it appears white on the jeans but black in the UI, making the former
black pixels white and the former white pixels transparent.
d. Apply intensity filter using CIColorMatrix
Combine all patterns into one image using a MaximumFilter, taking the darkest values of
each pixel color component.
Step 2. Apply Mask
Use BlendWithAlphaMask along with the pattern from step 1, base.lightenedImage as the
foreground, and base.image as the background. This generates an image somewhere between
base.image and base.lightenedImage, depending on the pattern.
Step 3. Apply Layers
Draw the detail layers (damage, patch) onto the current image. No pixel blending.
Step 4. Apply Postwash Bleach
Apply a SaturationBrightnessFilter with value between 0.0-0.15 (default 0.10).
Step 5. Apply tint or overdye
If tint, generate an image of the tint color and then use a multiplyCompose filter with the tint
image and the current image. Tint values range from 0-0.5 (default 0.05).
If overdye, generate a gray image (RGB 0, 0, 0, alpha = intensity) and apply an
alphaMaskFilter between base.image and the gray image and then multiplyBlend this with
base.image. This has the effect of multiplying and darkening each pixel in the base with some
percent of itself.
Step 6. Crop
Crop as needed.
``` together. This is in contrast to the separate sections of the color map. The rendering process includes the texture map- Table C presents a list of filters that can be used in generating the preview image of the digital design tool

TABLE C

Pattern: Apply the bright point using CIToneCurve and CIColorMap, clamping between 0 and −0.5.
DarkenBlend: Creates composite images by choosing the darker samples from either the source image or the background.
Invert: Inverts the colors in an image.
MaskToAlpha: Converts a grayscale image to a white image that is masked by alpha.
BlendWithAlphaMask: Uses alpha values from a mask to interpolate between an image and the background.
MaskBlend: Uses values from a grayscale mask to interpolate between an image and the background.
Maximum: Take the maximum (lightest) RGB values for every pixel
ColorClamp: Modifies color values to keep them within a specified range. At each pixel, color component values less than those in inputMinComponents will be increased to match those in inputMinComponents, and color component values greater than those in inputMaxComponents will be decreased to match those in inputMaxComponents.
Alpha/ColorMatrix: Multiplies source color values and adds a bias factor to each color component.
MultiplyCompose: Given two images, produce a third that is the result of multiplying each RGB sub-pixel with its counterpail. Since the subpixel values range from 0-1, this generally produces a darker image than either of the two source images.
MultiplyBlend: Multiplies the input image samples with the background image samples.
SaturationBrightness: Adjust the saturation and brightness of an image.

For the image filters, some ranges of the parameters can be as follows. For Postwash bleach, the range can be from 0.0 to 0.15, where a default is 0.10. For Tint, the range can be from 0.0 to 0.50, where a default is 0.05. For Overdye, the range can be from 0.0 to 0.90, where a default is 0.50. For Brightpoint, the range can be from −0.50 to 0.70, where a default is 0.50. For Intensity, the range can be from −1.00 to 1.00, where a default is 1.00.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a garment design tool that shows a three-dimensional preview image of a garment design on a screen as customized by a user with a finishing pattern;
in the garment design tool, providing an option for the user to select a garment base and upon the user's selection, showing on the screen a first preview image of a selected garment template;
in the garment design tool, providing an option for the user to select a finishing pattern from a two or more finishing patterns and upon the user's selection, showing on the screen a second preview image of the selected garment template with the selected finishing pattern, wherein each finishing pattern is associated with a digital input file;
combining a digital input file associated with the selected finishing pattern with an image of the selected garment template to generate a combined image,
wherein the combined image is a color map, and the color map comprises a first deconstructed garment section comprising at least one fabric panel, and a second deconstructed garment section comprising at least one fabric panel, and the combined image is generated by generating an adjusted base image from the image of the selected garment template without the selected finishing pattern,
generating a pattern mask based on the digital input file associated with the selected finishing pattern,
for a pixel at a pixel location of the combined image, obtaining a first contribution for the pixel location of the combined image by combining a first value for a pixel corresponding to the pixel location for the pattern mask and a pixel corresponding to the pixel location for the image of the selected garment template without the selected finishing pattern,
for the pixel at the pixel location of the combined image, obtaining a second contribution at the pixel location for the combined image by combining a second value for a pixel corresponding to the pixel location for the pattern mask and a pixel corresponding to the pixel location for the adjusted base image,
combining the first contribution and the second contribution to obtain a color value for a pixel at the pixel location for the second preview image, and
using the color value for the pixel at the pixel location in the combined image; and
generating the three-dimensional preview image of the garment design comprising texture mapping the combined image on a first three-dimensional model to obtain the first three-dimensional model with textures, and
mapping the color value for the pixel at the pixel location in the combined image from U and V coordinates of the combined image to X, Y, and Z coordinates of the first three-dimensional model.

2. The method of claim 1 wherein the second preview image is a two-dimensional image.

3. The method of claim 1 wherein the combined image is a two-dimensional image.

4. The method of claim 1 wherein the texture mapping comprises at least one of UV mapping or projection mapping.

5. The method of claim 1 wherein the combined image is a color map, and the color map comprises garment panels.

6. The method of claim 1 wherein the garment design is for a pair of jeans, and the first deconstructed garment section comprises a right front leg panel and a right back leg panel, and the second deconstructed garment section comprises a left front leg panel and a left back leg panel.

7. The method of claim 1 wherein the first three-dimensional model comprises a flat model.

8. The method of claim 1 wherein the first three-dimensional model comprises a pose model, and the method comprises:

generating a plurality of two-dimensional pose images from a three-dimensional pose model with textures based on the combined image, wherein each of the two-dimensional pose images is taken from the pose model with textures at a different rotation angle or a different perspective view point, or any combination.

9. The method of claim 8 comprising:

presenting the two-dimensional pose images at an online shopping site, wherein a customer can order a product from the online shopping site based on the two-dimensional pose images before the product has been made.

10. The method of claim 9 comprising:

after the product has been ordered by the customer, sending a request to a manufacturing facility to make the product.

11. The method of claim 1 wherein each finishing pattern is associated with a digital input file to be used by a laser to produce that finishing pattern onto a garment.

12. The method of claim 1 wherein the digital input file is a laser input file.

13. The method of claim 1 comprising:

allowing the user to rotate the three-dimensional preview image of the garment design.

14. The method of claim 1 wherein the selected finishing pattern comprises damage assets.

15. The method of claim 1 wherein the selected finishing pattern is a wear pattern.

16. A method comprising:

providing a garment design tool that shows a three-dimensional preview image of a garment design on a screen as customized by a user with a finishing pattern;

in the garment design tool, providing an option for the user to select a garment base and upon the user's selection, showing on the screen a first preview image of a selected garment template;

in the garment design tool, providing an option for the user to select a finishing pattern from a two or more finishing patterns and upon the user's selection, showing on the screen a second preview image of the selected garment template with the selected finishing pattern, wherein each finishing pattern is associated with a digital input file;

combining a digital input file associated with the selected finishing pattern with an image of the selected garment template to generate a combined image, wherein the combined image is a color map, and the color map comprises a first deconstructed garment section comprising at least one fabric panel, and a second deconstructed garment section comprising at least one fabric panel, and the combined image is generated by generating an adjusted base image from the image of the selected garment template without the selected finishing pattern, generating a pattern mask based on the digital input file associated with the selected finishing pattern, for a pixel at a pixel location of the combined image, obtaining a first contribution for the pixel location of the combined image by combining a first value for a pixel corresponding to the pixel location for the pattern mask and a pixel corresponding to the pixel location for the image of the selected garment template without the selected finishing pattern, for the pixel at the pixel location of the combined image, obtaining a second contribution at the pixel location for the combined image by combining a second value for a pixel corresponding to the pixel location for the pattern mask and a pixel corresponding to the pixel location for the adjusted base image, combining the first contribution and second contribution to obtain a color value for a pixel at the pixel location for the second preview image, and using the color value for the pixel at the pixel location in the combined image; and generating the three-dimensional preview image of the garment design comprising texture mapping the combined image on a first three-dimensional model to obtain the first three-dimensional model with textures, and mapping the color value for the pixel at the pixel location in the combined image from U and V coordinates of the combined image to X, Y, and Z coordinates of the first three-dimensional model, wherein the first three-dimensional model comprises a pose model, and the method comprises:

performing a texture mapping of the combined image onto a second three-dimensional model to obtain the second three-dimensional model with textures, wherein the second three-dimensional model comprises a flat model;

showing two-dimensional pose images at a retail online shopping site, wherein a customer can order a product from the retail online shopping site based on the two-dimensional pose images before the product has been made;

after the product has been ordered by the customer, sending a request to a manufacturing facility to make the product, wherein the manufacturing facility makes the product using a process based on the second three-dimensional model with textures or imagery of the second three-dimensional model with textures.

17. The method of claim 16 comprising:

generating a plurality of two-dimensional flat images comprising a front flat view and a back flat view, from the flat model with the combined image applied as a texture map, wherein the manufacturing facility makes the product using a process based on the two-dimensional flat images from the flat model with textures.

18. The method of claim 17 wherein the garment design is for a pair of jeans, and the first deconstructed garment section comprises a right front leg panel and a right back leg panel, and the second deconstructed garment section comprises a left front leg panel and a left back leg panel, and the front flat view of the flat model with textures comprises a view of the right front leg panel and left front leg panel, and the back flat view comprises a view of the right back leg panel and left back leg panel.

19. The method of claim 16 wherein the process of the manufacturing facility comprises using a laser creating the selected finishing pattern on a garment.

20. The method of claim 16 wherein the process of the manufacturing facility comprises using chemicals and abrasion to create the selected finishing pattern on a garment.

\* \* \* \* \*